US009346687B1

(12) United States Patent  
Matthews et al.

(10) Patent No.: US 9,346,687 B1  
(45) Date of Patent: *May 24, 2016

(54) WATER PURIFYING DRINK SYSTEM AND METHOD

(75) Inventors: Dan Richard Matthews, Gilbert, AZ (US); Kurt Kuhlmann, Santa Clara, CA (US)

(73) Assignee: MERIDIAN DESIGN, INC., Gilbert, AZ (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/555,039

(22) Filed: Jul. 20, 2012

Related U.S. Application Data

(63) Continuation of application No. 13/424,235, filed on Mar. 19, 2012, now Pat. No. 8,872,130, which is a continuation-in-part of application No. 12/717,758, filed on Mar. 4, 2010, now Pat. No. 8,137,538.

(51) Int. Cl.
*C02F 1/32* (2006.01)
*A61L 2/10* (2006.01)

(52) U.S. Cl.
CPC ...................................... *C02F 1/325* (2013.01)

(58) Field of Classification Search
CPC ............ C02F 1/00; C02F 1/001; C02F 1/002; C02F 1/30; C02F 1/32; C02F 1/325; A61L 2/08; A61L 2/10
USPC ................... 250/428–432 R, 453.11–455.11; 210/748.1
See application file for complete search history.

(56) References Cited

U.S. PATENT DOCUMENTS

| | | |
|---|---|---|
| 1,190,609 A | 7/1916 | Von Recklinghausen |
| 1,898,365 A | 2/1933 | Harding |
| 1,965,947 A | 7/1934 | Prouty |
| 2,338,387 A | 1/1944 | Whitman |
| 2,470,806 A | 5/1949 | Del Cueto |
| 2,669,661 A | 2/1954 | Riddiford et al. |
| 3,500,041 A | 3/1970 | Kassing |
| 3,843,521 A | 10/1974 | Zeff |
| 3,906,236 A | 9/1975 | Callahan |

(Continued)

FOREIGN PATENT DOCUMENTS

| | | |
|---|---|---|
| AU | 199859637 B2 | 1/2001 |
| CA | 2279860 C | 7/2007 |

(Continued)

OTHER PUBLICATIONS

International Search Reprot for PCT/US2005/009155 dated Jul. 7, 2005.

(Continued)

*Primary Examiner* — Nicole Ippolito
*Assistant Examiner* — David E Smith
(74) *Attorney, Agent, or Firm* — Parsons Behle & Latimer

(57) ABSTRACT

A water purification system is described herein. The water purification system comprises a container configured to hold a liquid; an ultraviolet light source configured to irradiate liquid within the container; a reflector configured to reflect light from the ultraviolet light source into the container; a trough adaptor having a first end and a second end and configured to channel a liquid from the first end to the second end while exposing the liquid to light from the ultraviolet light source; and wherein the reflector is configured to reflect light from the ultraviolet light source both onto the trough adaptor and into the container.

24 Claims, 28 Drawing Sheets

(56) References Cited

U.S. PATENT DOCUMENTS

| | | | |
|---|---|---|---|
| 3,970,856 A | 7/1976 | Mahaffey et al. | |
| 4,066,551 A | 1/1978 | Stern | |
| 4,101,777 A | 7/1978 | Reid | |
| 4,184,076 A | 1/1980 | Kosnoff | |
| 4,274,970 A | 6/1981 | Beitzel | |
| 4,276,256 A | 6/1981 | Karamian | |
| 4,280,912 A | 7/1981 | Berry, III et al. | |
| 4,296,328 A | 10/1981 | Regan | |
| 4,390,432 A | 6/1983 | Takeguchi et al. | |
| 4,416,854 A | 11/1983 | Nielsen | |
| 4,559,478 A | 12/1985 | Fuller et al. | |
| 4,676,896 A | 6/1987 | Norton | |
| 4,752,401 A | 6/1988 | Bodenstein | |
| 4,755,292 A * | 7/1988 | Merriam | C02F 1/325 210/192 |
| 4,762,613 A | 8/1988 | Snowball | |
| 4,790,946 A | 12/1988 | Jansen | |
| 4,849,100 A | 7/1989 | Papandrea | |
| 4,857,204 A | 8/1989 | Joklik | |
| 4,902,411 A | 2/1990 | Lin | |
| 4,912,375 A | 3/1990 | Deglon et al. | |
| 4,971,687 A | 11/1990 | Anderson | |
| 4,981,651 A | 1/1991 | Horng | |
| 4,992,169 A | 2/1991 | Izumiya | |
| 5,106,495 A | 4/1992 | Hughes | |
| 5,173,269 A | 12/1992 | Mon et al. | |
| 5,208,461 A | 5/1993 | Tipton | |
| 5,266,215 A | 11/1993 | Engelhard | |
| 5,393,419 A | 2/1995 | Tiede et al. | |
| 5,445,729 A | 8/1995 | Monroe et al. | |
| 5,484,538 A | 1/1996 | Woodward | |
| 5,597,482 A | 1/1997 | Melyon | |
| 5,628,895 A | 5/1997 | Zucholl | |
| 5,780,860 A | 7/1998 | Gadgil et al. | |
| 5,843,309 A | 12/1998 | Mancil | |
| 5,845,504 A | 12/1998 | LeBleu | |
| 5,900,212 A | 5/1999 | Maiden et al. | |
| 5,919,422 A | 7/1999 | Yamanaka et al. | |
| 6,042,720 A * | 3/2000 | Reber | C02F 1/325 210/243 |
| 6,110,424 A | 8/2000 | Maiden et al. | |
| 6,144,175 A | 11/2000 | Parra | |
| 6,264,836 B1 * | 7/2001 | Lantis | 210/188 |
| 6,436,299 B1 | 8/2002 | Baarman et al. | |
| 6,451,202 B1 | 9/2002 | Kuennen et al. | |
| 6,468,420 B1 | 10/2002 | Kunkel | |
| 6,514,405 B1 | 2/2003 | Lifschitz | |
| 6,579,495 B1 | 6/2003 | Maiden | |
| 6,589,490 B1 | 7/2003 | Parra | |
| 6,726,839 B2 | 4/2004 | Taylor, Jr. | |
| 6,764,888 B2 | 7/2004 | Khan et al. | |
| 6,767,453 B2 | 7/2004 | Lifschitz | |
| 6,861,652 B2 | 3/2005 | Wismeth | |
| 6,909,101 B2 | 6/2005 | Nishioka | |
| 6,943,377 B2 | 9/2005 | Gaska et al. | |
| 7,002,161 B2 | 2/2006 | Greene | |
| 7,081,225 B1 | 7/2006 | Hollander | |
| 7,306,716 B2 * | 12/2007 | Baarman | 210/143 |
| 7,361,904 B2 | 4/2008 | Cassassuce et al. | |
| 7,390,417 B2 | 6/2008 | Kuhlmann et al. | |
| 7,550,089 B2 | 6/2009 | Kuhlmann et al. | |
| 7,641,790 B2 | 1/2010 | Maiden | |
| 7,713,483 B2 | 5/2010 | Maiden | |
| 7,741,806 B2 | 6/2010 | Kuhlmann et al. | |
| 2002/0131906 A1 | 9/2002 | Wismeth | |
| 2002/0144955 A1 * | 10/2002 | Barak et al. | 210/748 |
| 2005/0118054 A1 * | 6/2005 | Lentz et al. | 422/3 |
| 2005/0189290 A1 | 9/2005 | Maiden | |
| 2005/0258108 A1 * | 11/2005 | Sanford | 210/748 |
| 2006/0011526 A1 * | 1/2006 | Baarman et al. | 210/143 |
| 2006/0099449 A1 * | 5/2006 | Amano et al. | 428/690 |
| 2006/0163169 A1 * | 7/2006 | Eckhardt | C02F 1/002 210/748.11 |
| 2008/0210608 A1 * | 9/2008 | Abe et al. | 210/96.1 |
| 2000/0237233 | 10/2008 | Choi et al. | |
| 2009/0084734 A1 * | 4/2009 | Yencho | 210/741 |
| 2009/0205972 A1 | 8/2009 | Kuhlmann et al. | |
| 2010/0044582 A1 * | 2/2010 | Cooper et al. | 250/455.11 |
| 2020/0044582 | 2/2010 | Cooper et al. | |
| 2011/0038754 A1 * | 2/2011 | James | 422/24 |
| 2011/0174993 A1 * | 7/2011 | Blain | 250/492.1 |
| 2012/0006995 A1 * | 1/2012 | Greuel | C02F 1/325 250/373 |

FOREIGN PATENT DOCUMENTS

| | | |
|---|---|---|
| CN | 1113040 C | 7/2003 |
| DE | 4228860 A1 | 3/1994 |
| DE | 19911443 A1 | 9/2000 |
| DE | 69834105 T2 | 1/2007 |
| EP | 0966401 B1 | 4/2006 |
| ES | 2262222 | 11/2006 |
| GB | 2301272 A | 11/1996 |
| JP | 02003892 | 1/1990 |
| JP | 02006892 | 1/1990 |
| JP | 08033887 | 2/1996 |
| JP | 08066678 | 3/1996 |
| JP | 08117742 | 5/1996 |
| JP | 11155932 | 6/1999 |
| JP | 2001347265 A | 12/2001 |
| TR | 199901784 T2 | 10/1999 |
| WO | WO9738272 | 10/1997 |
| WO | WO9832700 | 7/1998 |
| WO | WO0009449 | 2/2000 |
| WO | WO0212127 A2 | 2/2002 |
| WO | WO2004028290 A1 | 4/2004 |
| WO | WO2005090241 A1 | 9/2005 |

OTHER PUBLICATIONS

Ultra Violet Sterilization for Water; http://www.envirodoc.com/uv-sterilization-water.htm; Mar. 1, 2005.
UV Water Purifiers by American Air and Water; http://www.americanairandwater.com/water/w_prods.htm; Mar. 1, 2005.
Steri-Pen (Steripen) Ultraviolet Water Purifier, Portable Water Puffer; http://store.yahoo.com/campingsurvivale/stulwapupowa.html; Mar. 1, 2005.
"Finally, Germicidal UV LEDS for the Rest of Us!" LED Development Blog, Nov. 29, 2007; http://leddev.wordpress.com/?s=UVC.
Mcdonald, Joann "Deep UV LEDs Research Major Milestone in Water Purification," CompoundSemi News, Mar. 15, 2005 downloaded on or about Oct. 31, 2007 from www.solidstatelighting.net.
PlexiGlass Sunactive XT Clear 24770 Product Description, Degussa AG, Apr. 2002.
Sensor Electronic Technology, Inc, list of 2005-2006 articles, downloaded on or about Oct. 31, 2007 from www.set.com.
"SET seeks deep UV led market penetration," Jan. 7, 2005, downloaded on or about Oct. 31, 2007 from www.compoundsemiconductor.net.
"SET wins contracts for AIN resarch;" Wide Bandgap News; Mar. 2004, p. 13; downloaded on or about Oct. 31, 2007 from www.compoundsemiconductor.net.
Gaska,R.,Et sl., "Solid-State Ultraviolet Light Sources," IEEE Sensors Councel Newsletter No. 6; Jan. 2008; downloaded on or about Aug. 8, 2008 from www.ewh.ieee.org/tc/sensors/newsletters/number6/newsletter6.htm.
"UV Rays Used to Purify Water," New Products & Services, The Nikkei Weekly, Feb. 7, 1994.

* cited by examiner

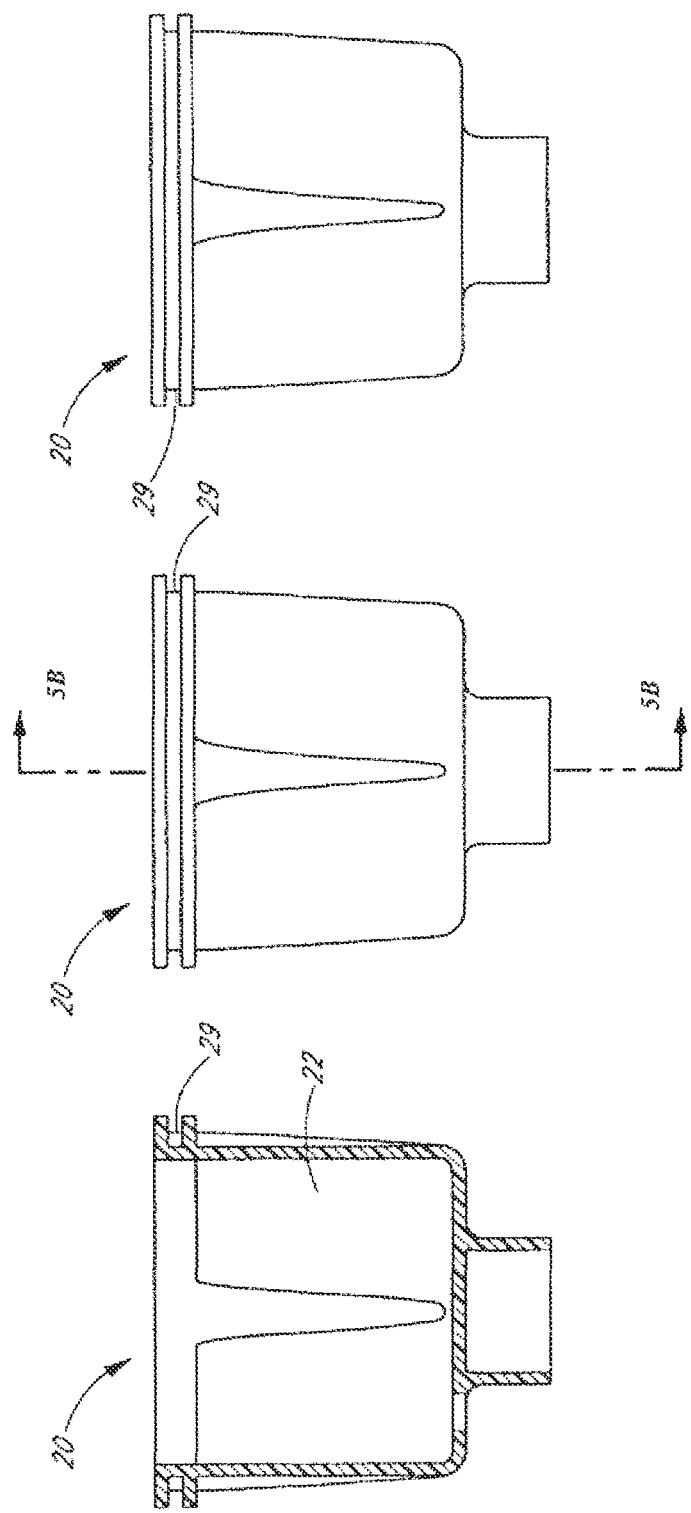

WATER PURIFYING DRINK SYSTEM AND METHOD

CROSS-REFERENCE TO RELATED APPLICATIONS

This application claims the benefit of and is a continuation of U.S. Non-Provisional application Ser. No. 13/424,235, titled UVC Water Purifier System and Method, filed on Mar. 19, 2012; which is a continuation-in-part of U.S. Non-Provisional application Ser. No. 12/717,758, titled UV Water Purification Spigot, filed on Mar. 4, 2010; and also is related to the following: U.S. Non-Provisional application Ser. No. 13/006,193, titled Water Purifying Drink Containers, filed on Jan. 13, 2011; U.S. Pat. No. 7,550,089, titled Floating Ultraviolet Water Purification Device, filed on Aug. 10, 2006; U.S. Pat. No. 7,390,417, titled Portable Ultraviolet Water Purification System, 10 filed on Dec. 3, 2004; and U.S. Provisional Application No. 60/554,665, titled Portable Ultraviolet Water Purification System, filed on Mar. 19, 2004; and, all of which are hereby incorporated by reference in their entirety.

BACKGROUND

This invention relates to water purification and more particularly to an apparatus for subjecting fluids to ultraviolet (UV) light. The apparatus may be used for water sterilization and is intended for point-of-use on demand application. The invention relates generally to devices and methods for disinfecting water and, more particularly, to a portable, low-cost system for disinfecting water using ultraviolet light. This disclosure relates generally to devices and methods for disinfecting water and, more particularly, to a portable, low-cost system for disinfecting water using ultraviolet light.

In both urban and rural areas of developing countries, the main limitation for ensuring good quality drinking water to the population is the absence of what developed countries call "tap water".

Urban areas of developing countries do not have access to continuous flow of water in their potable distribution system; instead, urban households receive only a few hours of water per day, and not every day. As a result, buildings in urban areas are equipped with storage tanks that are filled whenever there is flow in the municipal water pipes. Those tanks can be roof tanks or underground cisterns. They range in volume between 200 and 1000 gallons storage capacity. Therefore, in developing countries, opening a faucet means receiving water from a tank where water has been stagnant for a few days, possibly silted and contaminated with bacterial growth.

Consequently, most urban households in developing countries do not drink water from their faucets, they use it solely for washing, bathing, and sometimes cooking. For drinking, urban families purchase "purified water", typically sold in 5 gallon jugs that cost around 1 dollar. The 5 gallon jugs are heavy and cumbersome and require some kind of dispenser for serving the water. Typical dispensers are either plastic or ceramic large-mouth containers, and 5-gal jugs are flipped 180 degrees on those containers so as to rest neck-down. The dispensers are equipped with a regular plastic spigot to conveniently serve water. From a study conducted in 2009 in a medium-size city of Mexico, namely La Paz, Baja California Sur, it was determined that 95% of the 150 urban families interviewed were using 5-gal purified water jugs and dispensers in their households for drinking water. In the same study, water quality tests were conducted to measure concentration of bacteria, i.e. total coliform and fecal coliform bacteria, in both unopened 5-gal jugs and household dispensers. It was found that there was zero bacterial contamination in the 5-gal jug samples. However 26% of these spigoted dispensers had total coliform bacteria and 11% had fecal coliform bacteria in their drinking water.

Dispensers therefore seem to promote recontamination of the water. Sources of recontamination include typical handling and transport of jugs. Purified water jugs are oftentimes delivered at the back of pick-up trucks, by a person carrying it on his shoulder to the house and placing it onto the spigoted dispenser. Dust and fumes during transport and unwashed hands while handling 5-gal jugs are therefore likely pathways for bacteria to reach the inside of the drinking water dispensers.

Having examined the water situation in urban areas of developing countries, it can easily be imagined how the problem is magnified in rural areas. There are no faucets and no water distribution infrastructure in most rural communities of the developing world. Water is carried from the wells or springs to the house in buckets or other containers. In the best scenario, there might be a hose or pipe conducting water by gravity from a spring or tank to communal faucets. In a study conducted in 2005 in Baja California Sur with the National Water Commission of Mexico, samples of 500 water sources in rural communities and determined that 42% of them had fecal contamination. In the same study, samples were taken from 500 household water containers and found that 54% had fecal contamination. Household containers are indeed generally more contaminated than water sources in rural communities. Providing a "safe" water source is therefore not enough since rural families have no "tap water" and will continue to store water in unsafe containers. In another study of 30 existing water filters installed by aid agencies and non-profit organizations, it was found that 36% of water filters had total coliform bacterial contamination in the stored filtered water, one of the filters actually having had a higher bacterial concentration in the filtered water compared to the source water. This can be explained by lack of maintenance and cleaning of the filter, poor hygienic conditions in the households such as dirt floors and dusty homes, handling of filters with unwashed hands, and presence of animals in the households (for example, a chicken sitting on top of a bucket water purifier).

From the foregoing description of the water situation in developing countries it can be concluded that safe drinking water can only be provided at the point-of-use. But that is not enough, because point-of-use water filters, if they involve storage of the filtered water, can themselves become contaminated. Safe drinking water therefore requires not merely point-of-use purification, but actually no-storage instantaneous point-of-use purification. This is the main motivation beyond the here-presented invention.

Prior point-of-use water purification devices for developing countries typically involve storing filtered water within the device, such as the various types of ceramic pot filters and ceramic candle filters (Potters-For-Peace, Katadyn) which are prone to recontamination of the filtered water, especially if adequate maintenance is not provided to the filter after a few months of use. The germicidal chemicals used in ceramic filters, typically iodine or silver, are lost after a year of use, but users have no way to know when replacement of the ceramic element is necessary, they therefore continue using their device for many years. This leads to the filter being a source of contamination instead of a means of sterilization, as was observed during the aforementioned water sampling campaign, where filtered water had sometimes more bacteria than the source water.

Boiling is another typical means of sterilizing water, but the boiled pot of water left standing in the kitchen is used by family members throughout the day, and water is retrieved from the pot by dipping cups which leads to quick recontamination of the boiled water. A simple experiment was conducted in a rural household of Mexico to measure the recontamination time for boiled water: at 10 am, a pot of water was boiled and a sample was taken to ensure it had zero bacterial contamination; samples were then taken every 30 min, and it was observed that recontamination by bacteria occurred at the fourth sample, i.e. at 11:30 am. Only one hour and 30 minutes was necessary to recontaminate boiled water left standing in a kitchen in a typical rural household scenario.

Chlorine or iodine drops are another means of sterilizing water in developing countries. Chemical disinfection is difficult to implement at the household level, since rural families strongly reject the taste of those disinfectants described as unhealthy to ingest. Short shelf life of those disinfectants require frequent buying which is oftentimes impossible for isolated communities, who prefer to spend the few dollars of their monthly budget on food and other items.

Other devices have employed ultraviolet light to sterilize water for use in developing countries, such as the UV water purification system described in U.S. Pat. No. 7,361,904 and the UV water disinfector described in U.S. Pat. No. 5,780,860. The former presents a major problem observed during monitoring of 1,500 units installed in rural Mexico between 2006 and 2008. The disinfection chamber is prone to silting since fine sediments contained in water accumulate over time and grow to a thick "mud-type" layer. Water passing in the bottom chamber is therefore not sterilized properly by UV radiation source since bacteria can easily hide in between mud particles before reaching the outlet where the user obtains water. Observation of the use of the aforementioned UV water purification system led to the conclusion that a water sterilization device intended for developing countries cannot rely on maintenance performed by a user, since many users will not clean or maintain their water sterilization device, at least not as expected by the inventor of the device. The UV water disinfector described in U.S. Pat. No. 5,780,860 is another sterilization device intended for use in developing countries at the village scale. The major issue with village-scale sterilization devices is recontamination of the water during transport and storage. Villagers will walk a certain distance to the location of the sterilization system to obtain water, or will have someone deliver sterilized water to their homes. But if sterilized water is transported or stored in unclean containers, or if water is retrieved by dipping cups where hands can come in contact with sterilized water, there is a significant risk of recontamination within a few hours of obtaining sterilized water.

Other devices using ultraviolet light to sterilize water have been invented for use in modern homes of developed nations. The UV water purifying devices described in U.S. Pat. Nos. 6,909,101; 5,843,309; and 4,280,912 are faucet-type UV sterilizing systems. These devices are specifically manufactured for developed country household plumbing systems and would not be easily adapted to rural households in the developing world. These devices also have elongated conduits between the UV radiation source and the water outlet which can promote growth of bacteria between each use. Droplets of water remaining in the conduit between the UV sterilizing chamber and the water orifice can promote bacterial growth which would not be sterilized by subsequent uses of the device. Other UV sterilizing devices are counter-top water purification devices such as those described in U.S. Pat. Nos. 6,451,202; 6,726,839 and 5,445,729 involving multiple steps of filtering and sterilizing with a UV radiation source prior to dispensing at a spigot. Those units are complicated and costly, typically in the hundreds of dollars, and they are therefore neither affordable nor easily serviceable by families in developing countries. The counter-top units pose the same problem as the faucet-type ultraviolet systems described above, because they also possess an elongated conduit between the UV sterilization chamber and the water outlet which creates a potential recontamination hotspot that is not easily accessible for cleaning between each use.

The present invention is a simple, compact, affordable, maintenance-free and recontamination free ultraviolet purification spigot that resolves many of the challenges observed in other water purification devices intended for developing countries. By placing the UV light immediately adjacent to the outlet orifice of the water, there is no recontamination risk along conduits or in storage units and the user is able to sterilize just the amount that is needed, be it a glass of water to drink or a pot of water to bath a child. The small size of the device is an essential characteristic of this invention which will greatly enhance its distribution potential in rural areas of developing nations as hardware stores in villages or county capitals will be able to carry this device in their inventory among other similar-sized items such as bulbs, batteries, and flashlights. This will eliminate the need for humanitarian-type distribution schemes by governments, aid agencies or non-profit organizations which are generally one-time campaigns that do not establish distribution channels for long-term supply of replacement parts. As a final note, the present invention provides a great opportunity for creating a national water solidarity campaign between urban and rural areas. Such a campaign can be conceived such that, for every UV spigot sold in urban markets, one UV spigot can be subsidized for a rural family.

Every day, an estimated 3,000 to 6,000 die worldwide due to infections from waterborne bacteria. Death typically results from acute dehydration, malnutrition, or other related complications. The majority of victims are young children and older people that live in economically impoverished countries. In these regions, contaminated surface water sources and poorly functioning municipal water distribution systems lead to the transmission of waterborne bacterial diseases. Although the problem is particularly bad in impoverished countries, population groups in developed countries, such as residents in remote rural areas of the United States with poor water treatment and delivery systems, are also at risk. In addition, campers and hikers who do not have access to treated water also commonly fall victim to waterborne bacterial infections.

Conventional centralized water treatment and distribution systems can be very expensive and take years to complete. Furthermore, it is often impractical to provide centralized water treatment in sparsely populated areas. Therefore, to provide the at risk groups with potable water requires innovative practical solutions such as, for example, point-of-use disinfection. In one disinfection method, ultraviolet ("UV") radiation having wavelengths in the range of 200 to 300 nm may be used to kill disease-carrying microorganisms in water. UV radiation has been found to deactivate a broad spectrum of pathogenic contaminates from amoebic sized microorganisms to bacteria, algae and viruses. Water purification by ultraviolet radiation provides numerous advantages over other currently available water treatment methods. For example, UV water purification systems do not require chemicals nor do they require expensive filters.

Existing UV water purification systems are often large installed flow-through systems serving a large number of people. However, in recent years, a number of smaller portable UV water purification systems have become available for use by individuals. Portable UV water purification systems use fluorescent tubes for emitting UV light into the water. A quartz cover is typically provided around the fluorescent tube to protect the light source from mechanical shock and to electrically insulate the light source from the water being disinfected. Quartz covers are commonly used because it has been found that quartz is transparent at germicidal UV wavelengths, such as, around 254 nm. However, quartz covers are very expensive and thereby substantially increase the manufacturing cost.

Existing UV water purification systems also include electronic circuitry for driving the fluorescent tube. The circuitry is typically configured to drive the fluorescent tube using a "cold-cathode" striking method. In this method, a high voltage (e.g., 400-500V RMS) is applied to the anode and cathode terminals of the fluorescent tube. The voltage must be high enough to produce ionization with the anode and cathode terminals at room temperature (i.e., hence "cold-cathode"). In one common cold-cathode striking method, an H-bridge driven, capacitively tuned, step up transformer circuit is used to drive the fluorescent tube with an AC power input. Unfortunately, this type of electronic circuitry is expensive to manufacture, thereby driving up manufacturing costs and making the system prohibitively expensive for many applications. As a result, UV water purification systems and, more particularly, portable UV systems have not met with great commercial success.

Due to the complexity and high costs associated with existing UV water purification systems, an urgent need exists for an improved water purification system that requires fewer components and is easily affordable to large segments of the population. It is desirable that such a system be rugged in construction and easily transportable for disinfecting drinking water in regions wherein water purification is not available. It is also desirable that such a device be lightweight, compact and easy to use. The present invention addresses these needs.

Every day, thousands die worldwide due to infections from waterborne bacteria and viruses. Death typically results from acute dehydration, malnutrition, or other related complications. The majority of victims are young children or elderly people that live in economically impoverished countries. In these regions, contaminated surface water sources and poorly functioning municipal water distribution systems lead to the transmission of waterborne bacterial and viral diseases. Although the problem is particularly bad in impoverished countries, population groups in developed countries, such as residents in remote rural areas of the United States with poor water treatment and delivery systems, are also at risk. In addition, campers and hikers who do not have access to treated water also commonly fall victim to waterborne bacterial and viral infections.

Conventional centralized water treatment and distribution systems can be very expensive and take years to construct. Furthermore, it is often impractical to provide centralized water treatment in sparsely populated areas. Therefore, providing at-risk groups with potable water requires innovative practical solutions such as, for example, point-of-use disinfection. In one disinfection method, ultraviolet ("UV") radiation having wavelengths in the range of 200 to 300 nm are used to kill disease-carrying microorganisms in water. UV radiation has been found to deactivate a broad spectrum of pathogenic contaminates from amoebic-sized microorganisms to bacteria, algae and viruses. Water purification by ultraviolet radiation provides numerous advantages over other currently available water treatment methods. For example, UV water purification systems do not require chemicals nor do they require expensive filters.

Existing UV water purification systems are often large installed flow-through systems serving a large number of people. However, in recent years, a number of smaller portable UV water purification systems have become available for use by individuals. Portable UV water purification systems use fluorescent tubes for emitting UV light into the water. A quartz cover is often provided around the fluorescent tube to protect the light source from mechanical shock and to electrically insulate the light source from the water being disinfected. Quartz covers are commonly used because it has been found that quartz is transparent at germicidal UV wavelengths, such as, around 254 nm.

Existing portable UV water purification systems also include electronic circuitry for driving the fluorescent lamp. These devices and their circuits are often heavy and include multiple batteries in order to power the device and as such will sink if released into the liquid being treated. Furthermore, they must be affixed to the containers of liquid they are treating or otherwise held in place therein. As a result many containers are not viable candidates for treatment with such a device. Finally, point-of-use devices are generally small and cannot reach into the depths of a large container, limiting their usefulness to small storage and drinking containers.

Due to the costs associated with existing UV water purification systems, a need exists for an improved water purification system that requires fewer components and is easily affordable to large segments of the population. It is desirable that such a system be rugged in construction and easily transportable for disinfecting drinking water in regions where water purification is not readily available. It is also desirable that such a device be lightweight, compact, and easy to use. The present invention addresses these needs.

SUMMARY

It is an aspect of the present invention to be able to inactivate all viruses, bacteria and parasites from untreated water in minimal exposure time to UV radiation.

It is another aspect of the present invention to expose the untreated water to UV radiation at the point of delivery to preclude the build-up of viral, bacterial and parasitic contamination in the dispenser and such contaminants from entering the dispensed water.

It is yet another aspect of the present invention that a water purifier employing a UV radiation source inside a spigot to germicidally treat water in a chamber adjacent to outlet orifice is provided and is especially suited for point of use on demand supply of purified water in urban and rural areas of developing countries.

It is a feature of the present invention that the UV radiation is supplied adjacent to the point of delivery of the water from the dispenser.

It is another feature of the present invention that the treated water is dispensed through a spigot that houses the UV radiation source.

It is still another feature of the present invention that a control valve selectively controls the flow of untreated water from the inlet of the spigot attached to any suitable container to the ultraviolet treatment chamber and that the control valve activates a switch that supplies electricity to the UV radiation source so that the ultraviolet bulb outputs germicidal light only when the spigot is in use and water flows around it to the outlet orifice.

It is a further feature of the present invention that it can be connected to either 110 VAC, 220 VAC or 12 VDC power source by means of transformer and ballast circuitry to supply the adequate starting and running voltage to the UV bulb.

It is yet another feature of the present invention that the UV radiation source is a filament-type ultraviolet lamp which allows the lamp to illuminate immediately when electrical contact is made.

It is an advantage of the present invention that the dispensed water is purified in about a second exposure time to the UV radiation source.

It is another advantage of the present invention that contaminants in the reservoir or water delivery device are eliminated via the UV radiation prior to exiting the spigot at the point of use.

It is yet another advantage of the present invention that the circuitry can be housed at a location distant from the device, optimally in a wall adapter unit at the electrical outlet.

It is a further advantage of the present invention that the compact filament-type ultraviolet bulb employed in this device allows for a low starting and running voltage, respectively around 14V and 10V, which is a standard safe voltage for household appliances coming in contact with water such as coffee makers and blenders.

It is still another advantage of the present invention that it is low-cost, maintenance-free and will only require easy replacement of the complete spigot unit every few years when the ultraviolet bulb burns out as easily noticed by user thanks to a viewing window on spigot.

Preferred embodiments of the present invention provide an improved portable UV water purification system. In one preferred embodiment, the container has a capacity of about one liter and is configured to be easily transported and protects the UV tube from damage. Preferably, the container is further configured such that a user may drink directly from the container.

The water purification system is preferably provided with a power source, such as batteries, and electronic circuitry for controlling the radiation of UV light. A top housing may be removed to fill the container and then replaced for running a sterilization cycle. The housing may also be used to contain the power source and electronic circuitry. Other embodiments allow the user to fill the container through a resealable opening provided along the top end, such that it is not necessary to remove the housing. The electronic circuitry for driving the UV source preferably incorporates one or more of the following features in order to reduce cost: a fly-back inductor, hot-cathode striking, a uni-directional pulsed tube current, and high-frequency pulse repetition rate (e.g., approximately 50 kHz). UV tubes, which electrically are substantially identical to fluorescent tubes, are typically driven with an electronic ballast that uses a transformer, resonant tuning capacitors, and an H-bridge comprising 4 MOSFETs. By using an inductor to increase the voltage with just one MOSFET and no caps, the system cost is substantially reduced. A straight UV tube may be used without a quartz cover to further reduce costs.

In one preferred embodiment, a portable water purification system comprises a container having an opening and defining an interior volume suitable for holding a liquid. An ultraviolet light source is configured to extend at least partially into the interior volume of the container. A fly-back inductor is electrically coupled to a power supply for driving the ultraviolet light source with a sufficiently high voltage to ionize the vapor in the light source.

In one variation, a cathode end of the ultraviolet light source is grounded and the fly-back inductor provides a pulsed voltage to an anode end of the ultraviolet light source. The cathode end of the ultraviolet light source may be electrically coupled to a liquid held within in the container for providing the ground. The voltage from the fly-back inductor preferably has a pulse rate of 50 kHz or greater and a peak voltage is about 80 V. The electrical current through the ultraviolet light source is preferably uni-directional. In another variation, the portable water purification system further comprises a removable top portion for covering the opening. The ultraviolet light source is preferably coupled to the removable top portion.

In another preferred embodiment, a portable water purification system comprises a container having an opening and defining an interior volume suitable for holding a liquid. An ultraviolet light source is configured to extend into the interior volume such that at least a portion of the light source is immersed in the liquid. The ultraviolet light source has a cathode end and an anode end with the cathode end of the ultraviolet light source being grounded. An inductor is electrically coupled to the anode end of the ultraviolet light source and a field-effect transistor. The field-effect transistor controls an electrical current through the inductor. The inductor and the field-effect transistor cooperate to provide a pulsed voltage to the anode end of the ultraviolet light source for emitting ultraviolet radiation.

In one variation, a micro-controller is operatively connected to the field-effect transistor for controlling the frequency of the pulsed voltage. The functionality of the micro-controller may be implemented in software. In another variation, a ground pin is electrically coupled to the cathode end of the light source. The ground pin extends into the interior volume such that the liquid is used to ground the cathode end when the liquid is in contact with the ground pin. In yet another variation, a switch is provided for applying the pulsed voltage to the cathode end for a fixed duration before applying the pulsed voltage exclusively to the anode end. The initial application of the pulsed voltage to the cathode end provides the system with hot-cathode striking during use.

In another embodiment, a method of disinfecting water includes providing a container having an interior volume suitable for holding a liquid wherein the container has an opening. An ultraviolet light source is inserted through the opening and into the liquid. A high frequency series of voltage pulses is applied to the ultraviolet light source for ionizing vapor in the light source and emitting ultraviolet radiation using a uni-directional current.

In one variation of this method, an inductor and a field-effect transistor cooperate to form a fly-back inductor for applying the voltage pulses to the ultraviolet light source. In another variation, a micro-controller is operatively coupled to the field-effect transistor for controlling the frequency of the voltage pulses. In another variation, the micro-controller starts and stops the voltage pulses to provide a disinfection cycle. In another variation, the method further comprises sensing that the liquid is above a predetermined level before applying the voltage pulses to the ultraviolet light source. This feature prevents the system from operating when the container is not full of a liquid. In still another variation, the ultraviolet light source comprises a substantially straight tube.

The disclosed methods and devices provide improved portable UV water purification. A preferred embodiment is small and light enough to be easily transported and floated in nearly any container of liquid. Other embodiments may include other features and advantages, such as one or more switches to control starting or stopping the treatment cycle, an internal power source, indicators of system status and operation, and a small, easily grasped handle on top of the device to facilitate removal of device from liquid. Another embodiment may also be able to detect whether it is immersed in a liquid, measure how long it has been active or inactive, and control the operation of the UV light source based on these parameters. Means for recharging an internal battery power source may also be provided.

BRIEF DESCRIPTION OF THE DRAWINGS

These and other aspects, features and advantages of the invention will become apparent upon consideration of the following detailed disclosure of the invention, especially when taken in conjunction with the following drawings wherein:

FIGS. 5A through 5F illustrate various views of a top cap lid configured for attachment to the top end of the container as shown in FIG. 1;

Like reference numbers and designations in the various drawings indicate like elements.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

Figure 1:
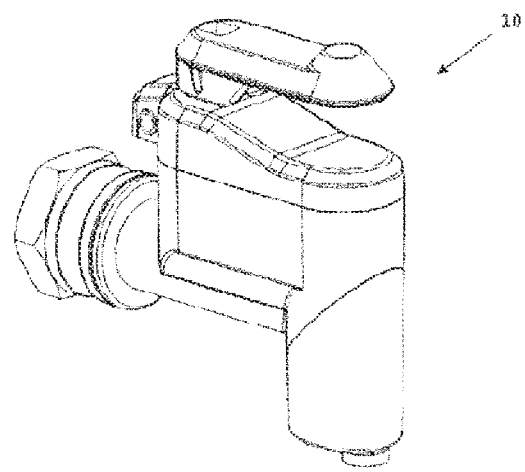
FIG. 1 is a general view of water purifying spigot unit.
Figure 2:
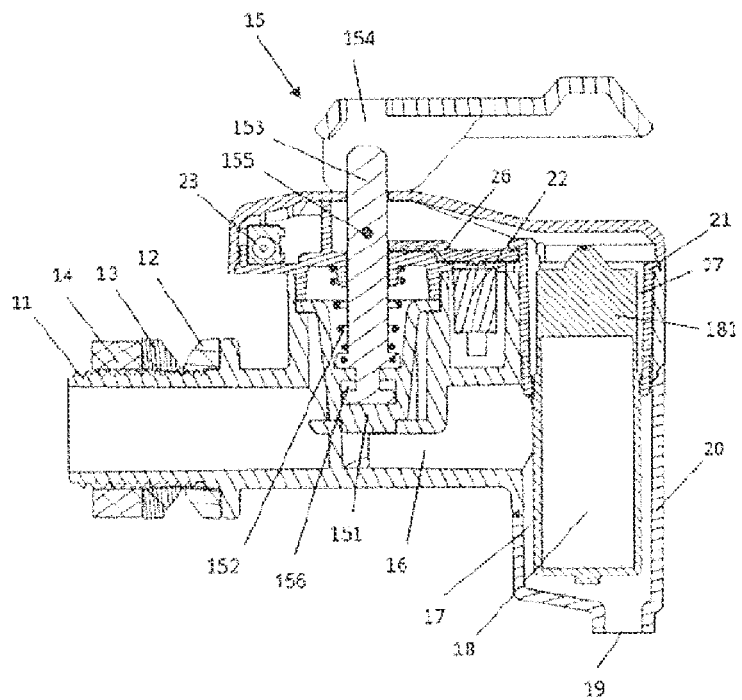
FIG. 2 is a cross-sectional view of the water purifier showing from left to right threaded attachment for spigot unit to be mounted on any suitable container, valve seal and valve mechanism and UV treatment chamber adjacent to outlet orifice for dispensing water.

The UV water purification spigot, indicated generally by the numeral 10, as seen in FIG. 1 and more specifically in FIG. 2; consists of a threaded inlet conduit 11, a valve mechanism indicated generally by the numeral 15, a disinfection chamber 17 containing an ultraviolet bulb 18 and an orifice outlet 19 through which a user gets disinfected and germicidally treated water.

The threaded inlet conduit 11 is a ¾ inch outside diameter conduit designed to be attached to any suitable container (not shown), provided such container has a matching ¾ inch hole where threaded conduit 11 can be inserted and attached safely by using the two gaskets 12 and 13.

Gasket 12 is designed to be placed on the outside wall of the container while gasket 13 is placed on the inside wall of the container. Threaded nut 14 pressures gaskets 12 and 13 to ensure spigot 10 is tightly held to container while gaskets 12 and 13 provide a secure seal to avoid water leaks from container. The untreated water flows in spigot 10 through conduit 11.

The flow of water is controlled by a valve mechanism indicated generally by numeral 15 comprising a conical rubber seal 151, a tapered spring 152 to exert pressure on conical rubber seal 151, a plunger 153 attached to a handle 154 that is activated by a user by either pushing or pulling on handle 154 to raise rubber seal 151 to let untreated water flow to entrance conduit 16. A gap 155 between plunger 153 and rubber seal 151 allows plunger 153 to raise 2 mm vertically to release pressure on lever 26 and unactivate button of microswitch 22 to turn on ultraviolet bulb 18 before engaging seal 151 which opens the flow of water to conduit 16. This built-in delayed valve opening mechanism ensures that lamp 18 is illuminated before water enters conduit 16 prior to reaching disinfection chamber 17. Prior designs allowed some water to pass out through the spigot before the lamp irradiated it. Afore-mentioned design now retains the water until the lamp is illuminated and the plunger is raised to engage the seal and release the water out through the spigot orifice.

Handle 154 can be pushed down or can be raised all the way to sit in a vertical position where it can rest without exerting pressure on it. Slight downward push on handle 154 when resting vertical returns it promptly to its horizontal position thanks to action of spring 152. Handle 154 is free to rotate horizontally around plunger 153 to any position within an approximate 180 degree radius limited by the wall of a container (both not shown) where spigot 10 is attached. When valve 15 is open, water flows to conduit 16 and enters disinfection chamber 17 where it is exposed to UV radiation emitted from germicidal bulb 18. The small diameter of disinfection chamber 17 forces untreated water to flow all around ultraviolet bulb 18 and guarantees full illumination and penetration of germicidal light into the untreated water. The distance between quartz wall of ultraviolet bulb 18 and the wall of disinfection chamber 17 is 1.5 mm. Water disinfected inside chamber 17 flows out through outlet orifice 19 where a user can obtain water by placing a cup or any container under orifice 19. Orifice 19 is a 6 mm diameter round hole.

In one embodiment, handle 154 may be configured to move in a zig-zag or "stick-shift" or other non-straight pattern. In this embodiment, a first motion may be configured to initialize a UV source, e.g., germicidal bulb 18, and a second movement may open a valve 15. The second movement could comprise a stop where the handle 154 has to "steer around" to open the valve 15, or a moment of friction like a constriction that impedes the motion of the handle 154 in a way that signals to the user a stopping point to allow the germicidal bulb 18 to turn on before further actuating the valve 15 to allow water to flow.

The collection of applications demonstrate that the UV light could be separate from the spigot and be actuated by the user with a button, or the spigot lever through a switching mechanism, or a timer or other microcontroller sensory input, or water detect.

A translucent cap 20 allows the user operating spigot 10 to visualize the ultraviolet light safely as ultraviolet rays are absorbed by plastic cap 20. Translucent cap 20 is therefore a viewing window for a user to visualize disinfection of untreated water and also detect the end of life of spigot 10 when ultraviolet bulb 18 no longer illuminates. Ultraviolet bulb 18 is held in housing 21 and epoxy is poured in gap 27 between ultraviolet lamp base 181 and housing 21 to prevent water from flowing upward when it reaches the disinfection chamber 17. Lamp base 181 has a positive and a negative pole to which electric connections are made. Electric connections run from lamp base 181 to microswitch 22 and to connector jack 23 which receives the matching connector plug 24 from the transformer ballast unit 25 at a remote location from spigot 10, preferably at the wall plug. Microswitch 22 is a normally closed switch which is activated by lever 26. When valve 15 is closed, plunger 153 is in its down position and pin 155 attached to plunger 153 pushes on lever 26 to maintain microswitch 22 in its activated position, which corresponds to its OPEN position. When user pushes or pulls on handle 154, plunger 153 raises and pin 155 no longer exerts pressure on lever 26 which releases microswitch 22 to its unactivated position, corresponding to its CLOSED position, which allows current to flow to ultraviolet bulb 18.

A suitable material for spigot 10 is ABS (acrylonitrile butadiene styrene) plastic or any suitable food-grade plastic approved by the Food and Drug Administration, preferably a plastic that does not contain BPA (Bisphenol A) chemicals that are currently facing possible ban in United States and Europe. Translucent cap 20 can be made of transparent or slightly colored translucent ABS provided the plastic composition contains a suitable FDA approved UV stabilizer such as TINUVIN or other adequate UV stabilizers to prevent degradation of cap 20 during usage of the spigot 10. Use of spigot 10 is estimated to take about 15 seconds per use to fill a glass of water and to be used between 20 and 30 times a day. The type of use of the spigot 10, i.e. for short lapses of time, but repeatedly throughout the day, will limit the degradation of plastic which usually happens during prolonged exposure to ultraviolet light.

Gaskets 12 and 13 are preferably made of flexible elastomer-type material of conical shape to provide maximum leak prevention. Seal 151 is a conical seal of any suitable flexible plastic material. Spring 152 is a tapered spring of 8.7 mm lower outside diameter, 12.7 mm upper diameter, 22.3 mm free length available commercially at Century Springs Corporation of Los Angeles, Calif. Plunger 153 is made preferably of a high resistance plastic such as reinforced acrylic or other strong and durable plastic to withstand the pulling and pushing action numerous times a day.

Microswitch 22 is a sealed pin plunger type subminiature switch rated at 125 VAC and 6 A current, or 30 VDC and 3 A, with solder terminals, available commercially from Future Electronics of Pointe-Claire, Montreal, Canada.

Germicidal bulb 18 is a filament-type, hot cathode, low pressure mercury vapor ultraviolet lamp that produces ultraviolet wavelengths around 254 nm that are lethal to pathogens such as bacteria, viruses and parasites that can be harmful to human health. As the UV radiation source, bulb 18 is available commercially from CNLight Co., Ltd of Fo Shan, China. Bulb 18 is rated at 3 W power with GTL2 standard base type, and is 17 mm in diameter, 52 mm in length where the quartz section of the bulb is 32 mm and the metal base of bulb is 20 mm. Ultraviolet bulb 18 requires a starting voltage of 12 to 14V and runs at a voltage of 10V and 0.3 A.

The transformer ballast unit 25 has two versions, a 110V/220 VAC version for use in urban areas with regular 110V AC or 220 VAC power outlet, and a 12 VDC version for use in rural areas or during disaster-relief operations where 12 VDC batteries or a 12 VDC power source are oftentimes the only power sources available. Spigot 10 has such a low power requirement that it makes it especially suitable for being powered in any remote location from a small, postcard-size, solar panel.

Connector jack 23 and matching connector plug 24 are 1.3 mm center pin, 3.5 mm outside diameter, 7.4 mm length DC jack and plug available commercially from Shogyo International Corp. of Syosset, N.Y. Transformer ballast unit 25 for either 110V/220 VAC or 12 VDC applications is commercially available from Advanced Power Solutions Inc. in Pleasanton, Calif. Spigot 10 including spigot body, cap, housing, handle, seals, gaskets, plunger, pin and lever is commercially available in plastic injection from High Performance Engineering in Colorado Springs, Colo.

In operation, a user first attaches spigot 10 to a suitable container where untreated water will be added. Containers such as buckets, 5-gal jug water dispensers, and ceramic pots are all suitable. A user then connects transformer unit 25 to an appropriate power source. The user also connects connector plug 24 to jack 23 of spigot 10. Spigot 10 is then ready to dispense disinfected and germicidally treated water at outlet 19 whenever the user activates handle 154 to turn on ultraviolet bulb 18 and open flow valve 15. When the user is done serving water, the user can stop the flow of water and turn off bulb 18 by simply returning handle 154 to its resting horizontal position.

The UV water purification spigot 10 has been tested at FDA certified laboratory CIAD (Centro de Investigacion en Alimentos y Desarrollo) in Culiacan, Sinaloa, MEXICO and found to supply 2.5 liters per minute of germicidally treated water after a less-than-a-second radiation period, effectively removing 99.9% of bacteria and viruses from the untreated water. The water purifier is thus able to inactivate all viruses, bacteria and parasites from untreated water in less-than-a-second exposure time to, or illumination by, UV radiation.

While the invention has been described above with references to specific embodiments thereof, it is apparent that many changes, modifications and variations in the materials, arrangements of parts and steps can be made without departing from the inventive concept disclosed herein. For example, any suitable FDA approved plastic material can be used to make the injection molded parts of spigot 10 such as polyethylene, polypropylene, PET or polyester, among others. Valve 15 could be a different flow control mechanism, such as a ball valve or diaphragm valve mechanism. Microswitch 22 could also be chosen from different miniature switch mechanism, such as a reed switch or mercury switch provided they are normally closed switches. Ultraviolet bulb 18 can be any 3 W ultraviolet bulb of GTL2 or GTL3 base type, either cold cathode or hot cathode, provided the dimensions of the bulb are small enough to fit in a spigot unit designed to be comparable in size to existing plastic spigots. Threaded inlet conduit 11 can be ¾ inch or ½ inch outside diameter thread or any other thread size most commonly used in container and dispenser applications in the specific country where spigot 10 will be made available. Connector jack 23 and plug 24 can be of other common dimensions for the center pin, outside diameter and length of plug provided the size of jack 23 remains small enough to be conveniently incorporated in spigot 10. Cap 20 could be of a pigmented translucent color such as translucent dark blue color to retain the ability of the user to view ultraviolet light safely, while dampening the intensity of light slightly. Outlet orifice 19 could be of any suitable shape for dispensing water, such as a rectangular or square slot provided it allows a user to conveniently obtain water in a common-size glass, cup, jar or any other water holding receptacles.

Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

Preferred embodiments of the present invention described herein provide an improved portable water purification system which uses UV light for killing disease-carrying microorganisms in water. The water purification system may be used to remove contaminants from dangerous water supplies in locations wherein water purification is not readily available. In one application, the water purification system may be used by residents living in remote or impoverished regions to treat contaminated water. In another application, campers or hikers may use the water purification system to disinfect water from lakes or streams before drinking Still further, the water purification system may be used to disinfect water around the house during emergencies, such as an earthquake or flood, wherein the tap water has become contaminated.

With reference now to the exploded view FIG. 1, for purposes of illustration, one preferred embodiment of a water purification system 10 includes, generally, a container 12, a UV light source 14, a control unit 60 and a power supply 70. In one preferred feature, the water purification system 10 is constructed such that the UV light source 14 does not require a quartz cover, thereby substantially reducing the cost of manufacture. Rather than using a quartz cover, the container 12 which holds the water is configured to provide mechanical protection against damage to the UV light source. The container may be provided as a low cost injection molded body for additional cost savings. The container is preferably made of a substantially opaque material which prevents UV light from passing through the container wall, thereby preventing user exposure to potentially harmful radiation. In one variation, an inner surface of the container may be formed with a reflective surface.

The UV light source 14 is preferably provided as a straight fluorescent tube configured to extend at least partially into the container 12 for immersion in the water. A straight tube is preferably used, rather than a more expensive "U-shaped" tube, for additional cost savings. In the illustrated embodiment, an insulating molded bulb cap 52 is provided for placement over the anode end 14A of the UV light source. The cap 52 is covered by a molded bulb cap lid 54. The cap 52 and lid 54 are configured to receive a wire sleeve 56 which carries electrical power from the control unit 60 to the anode end 14A of the UV light source 14. The cap and lid insulate the anode end of the UV light source 14 and the wire sleeve 24 from the liquid. The cap and lid also prevent electrolysis from eroding the contact on the anode end of the UV light source.

The UV light source 14 has a grounded cathode end 14B that is electrically coupled to the control unit 60. The control unit 60 is contained within a top cap lid 20, which is coupled to a battery housing 30. The top cap lid 20 and battery housing 30 form a removable top portion which is placed over the opening on the top end of the container 12. A threaded member 58 is preferably attached to the top cap lid 20 for securing the removable top portion to the container 12. In the illustrated embodiment, the top cap lid 20 and the battery housing 30 define a fully enclosed volume for housing the control unit 60 and related components. However, a variety of other assemblies may be used without departing from the scope of the invention.

Figure 5E:
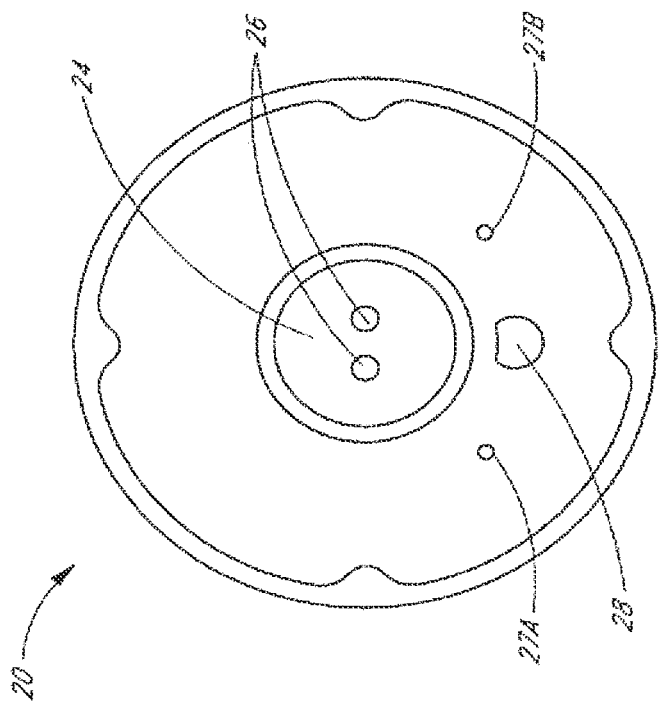
Figure 5A:
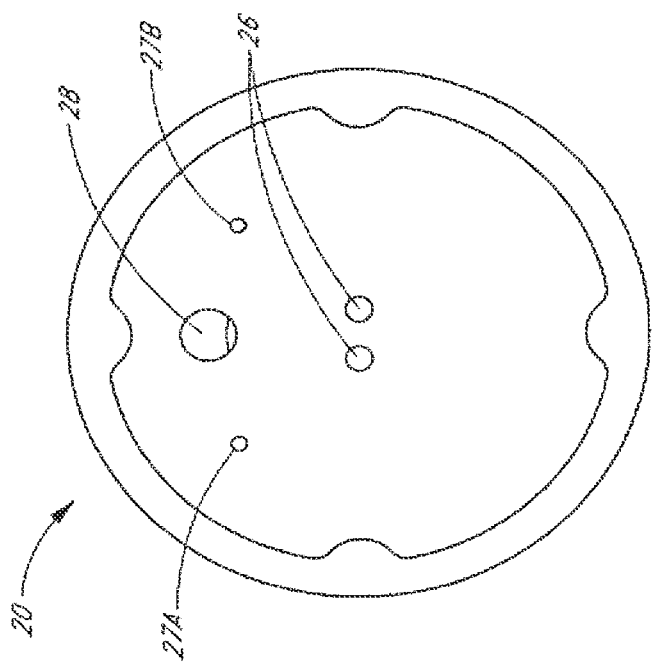
Figure 5F:
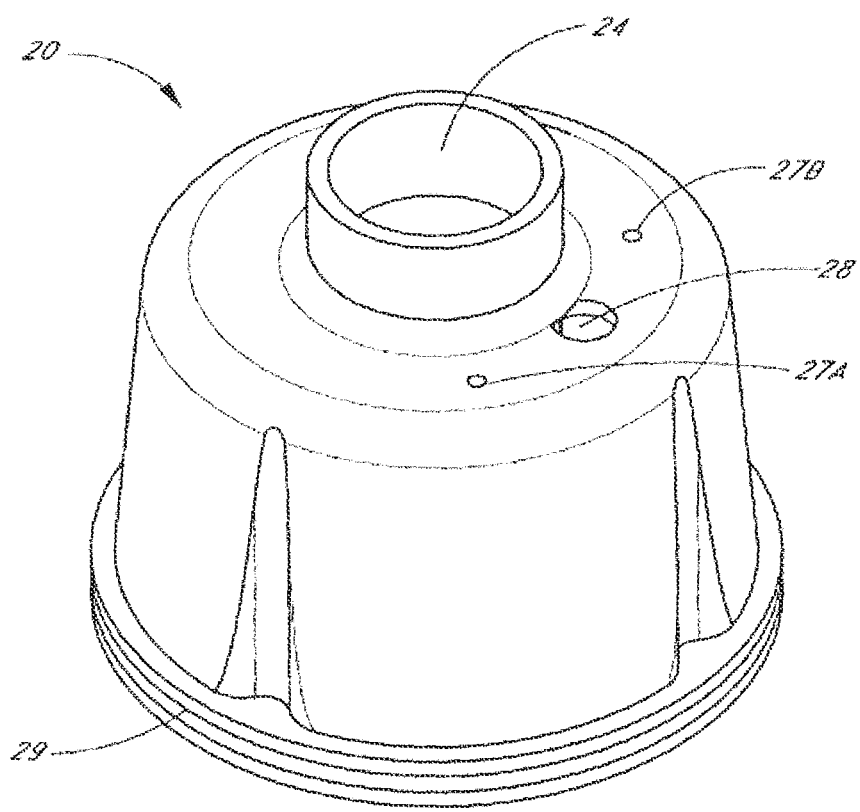

With reference now to FIGS. 2A through 2F, various views of the top cap lid 20 are provided. In preferred embodiments, the top cap lid is made of a molded plastic material. FIG. 5A is a top view looking downward into the top cap lid 20. FIG. 5B is a side cross-sectional view wherein it can be seen that the top cap lid defines an interior volume 22 for housing the components of the control unit. FIGS. 2C and 2D are first and second side views of the top cap lid. FIG. 5E is a bottom view wherein it can be seen that the bottom end is provided with a recess 24 sized for receiving the cathode end of the UV light source. Two holes 26 are formed in the bottom end of the top cap lid for receiving the contacts on the cathode end of the UV light source. The holes allow the contacts to extend through the bottom of the top cap lid to the control unit. A large side hole 28 is provided for allowing the wire sleeve to extend through the bottom of the top cap lip for providing power to the anode end of the UV light source. Two smaller side holes 27A, 27B may be provided for allowing pins to extend through the top cap lid into the liquid. In one preferred embodiment, a ground pin extends through hole 27A and a water sensor pin extends through hole 27B. FIG. 5F is a perspective view of the top cap lid. It can be seen that a lip portion 29 is provided around a top rim of the top cap lid for engagement with the threaded member.

Figure 3:
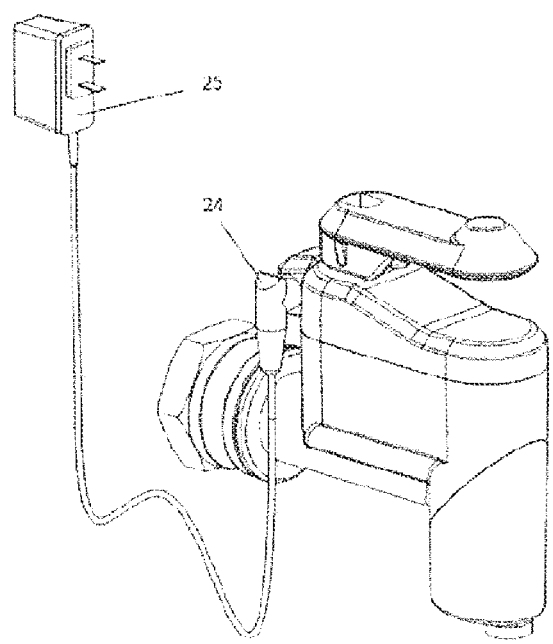
FIG. 3 is a general view of the water purification spigot unit when connected to power supply unit.
Figure 6E:
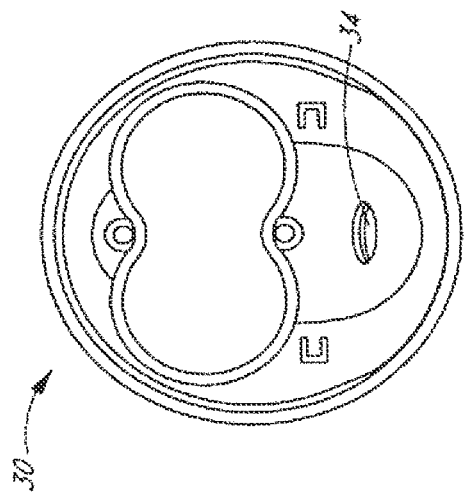
FIGS. 6A through 6F illustrate various views of a battery housing for attachment to the top cap lid.
Figure 6A:
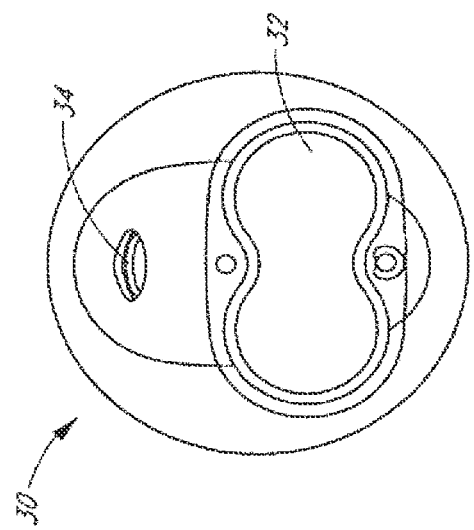
Figure 6D:
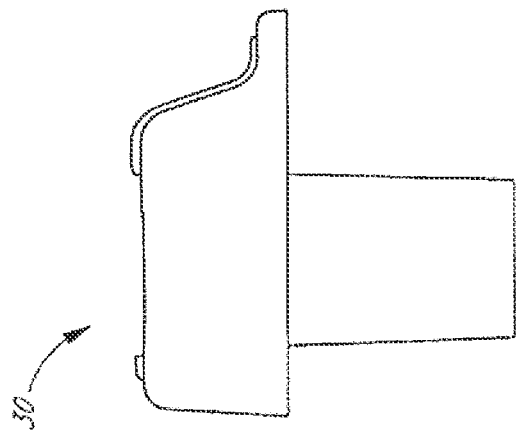
Figure 6C:
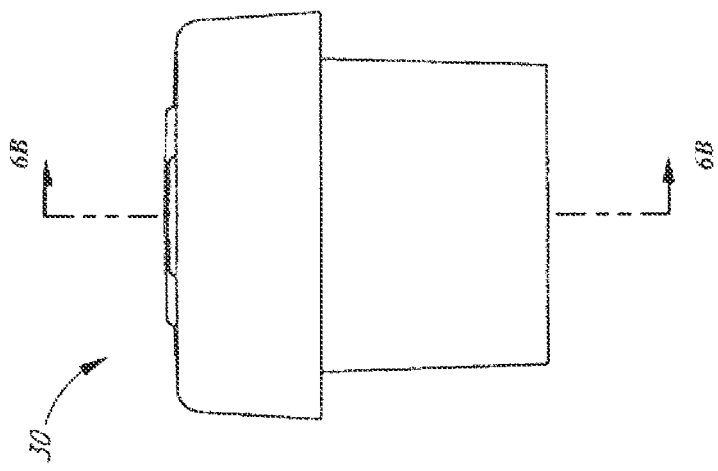
Figure 6B:
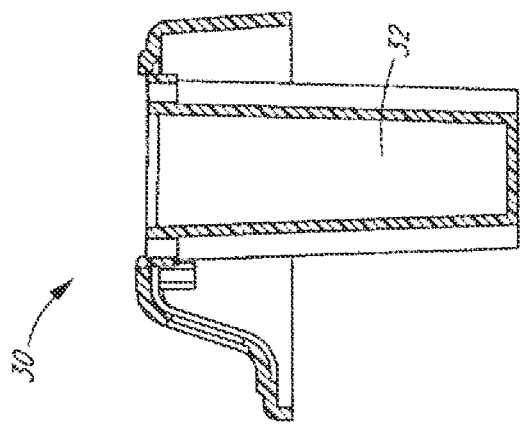
Figure 6F:
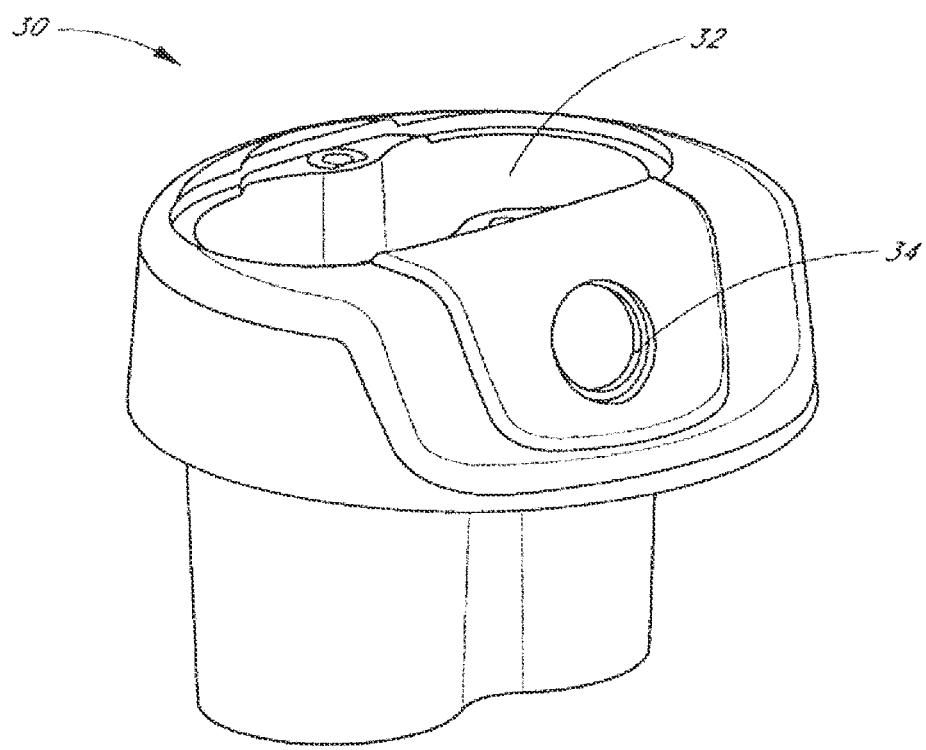

With reference now to FIGS. 3A through 3F, various views of the battery housing 30 are provided. FIG. 6A is a top view of the battery housing. It can be seen that the battery housing defines an interior chamber 32 sized for receiving two AA batteries. FIG. 6B is a side cross-sectional view of the battery housing. FIGS. 3C and 3D are first and second side views and FIG. 6E is a bottom view of the battery housing. FIG. 6F is a perspective view of the battery housing which further illustrates the chamber 32 for receiving the batteries. In addition, it can be seen that a hole 34 extends through the front face of the battery housing for receiving a mechanical button that may be used to control the operation of the water purification system.

Figure 7:
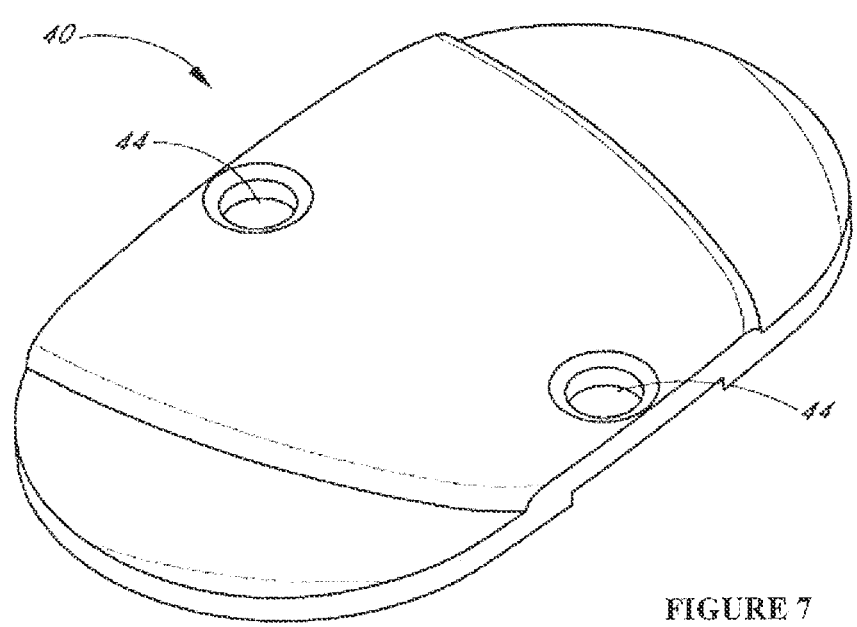
FIG. 7 is a perspective view illustrating a battery cover for attachment to a top end of the battery housing.
Figure 8:
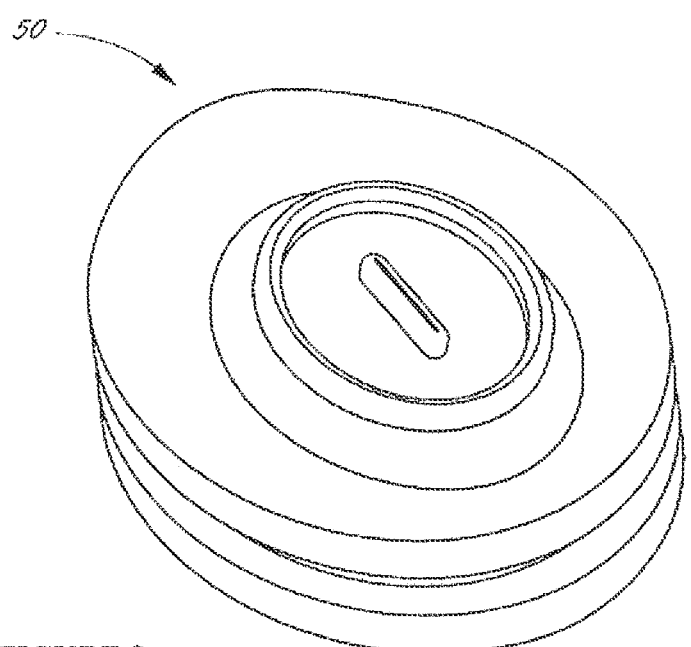
FIG. 8 is an enlarged perspective view illustrating a molded button disposed on a front end of the battery housing.

With reference now to FIG. 7, a perspective view of a battery cover 40 is provided. A first battery terminal (see element 42 of FIG. 1) is preferably disposed along an inner surface of the battery cover 34. The battery cover 40 is preferably configured with first and second holes 44 adapted for receiving mechanical fasteners, such as threaded screws, for securing the battery cover to the top end of the battery housing. With reference to FIG. 8, an enlarged view of one preferred molded button 60 for placement on the front end of the top cap lid is illustrated. The button is configured to be received within hole 34 shown in FIG. 6F.

Figure 4:
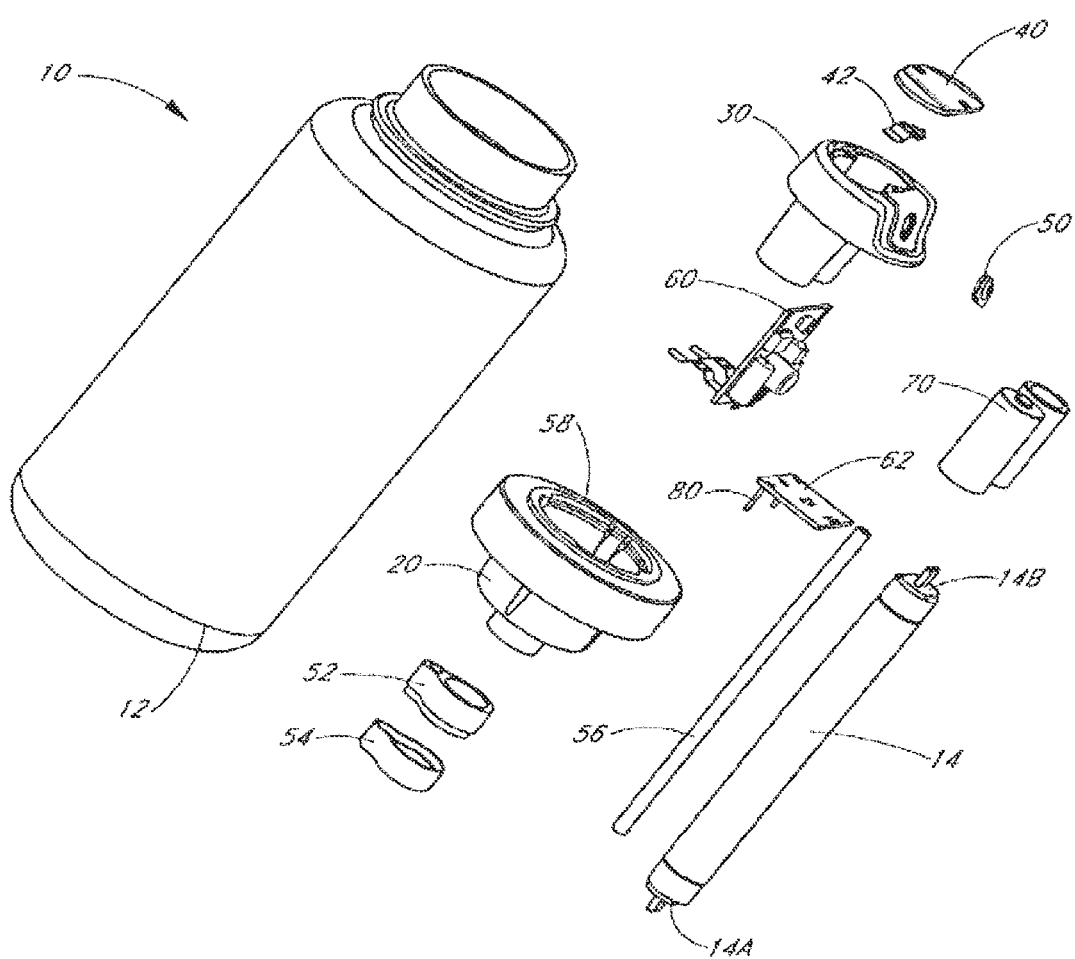
FIG. 4 is an exploded view illustrating the components of a portable UV water purification system according to one preferred embodiment.
Figure 9:
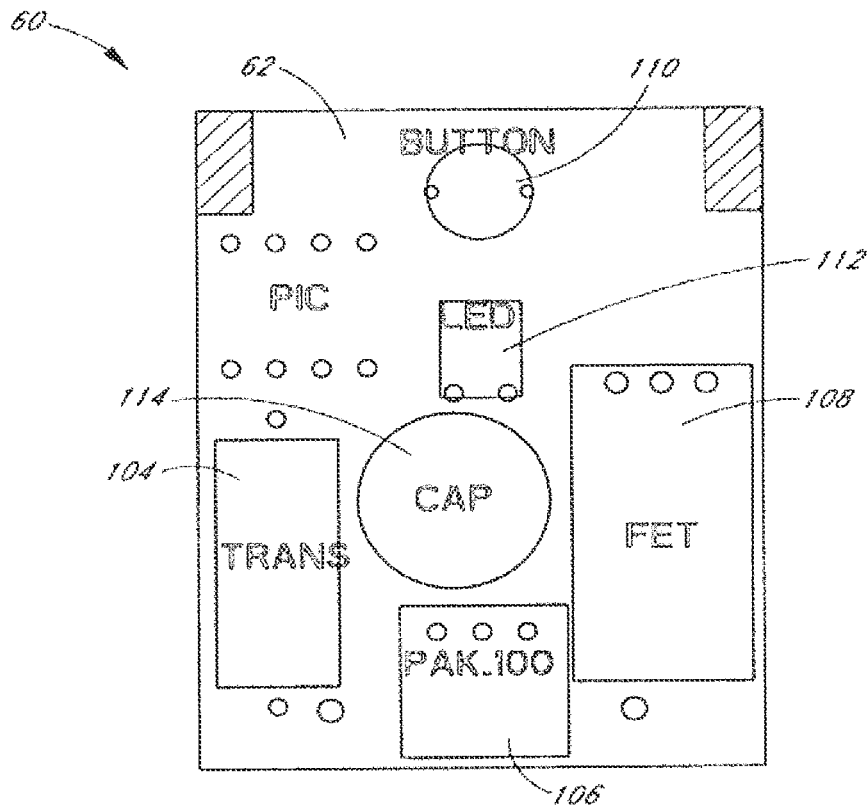
FIG. 9 is an enlarged view of a first circuit board containing electronic circuitry for driving the UV light source.
Figure 10:
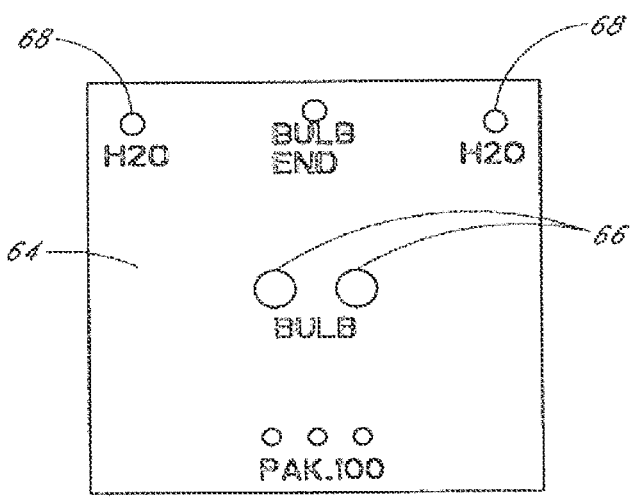
FIG. 10 is an enlarged view of a second circuit board for coupling to the UV light source.

With reference now to FIG. 9, various components of the control unit 60 are disposed on a first circuit board 62. The components on the first circuit board include, generally, an inductor 104, a micro-controller 106, a field effect transistor 108, a switch 110 and an LED 112. With reference to FIG. 10, a second circuit board 64 is illustrated which is operatively connected to the first circuit board. The second circuit board is configured with two holes 66 for receiving the contacts on the cathode end of the UV light source. The second circuit board also includes holes 68 for connection to a ground pin and/or a water sensor pin, as will be described in more detail below. Although the control unit, including first and second circuit boards, is illustrated in FIG. 4 as being located along the top end of the container, it will be appreciated that some or all of the components may be located in another location, such as along the bottom end portion of the container, without departing from the scope of the invention.

Figure 11:
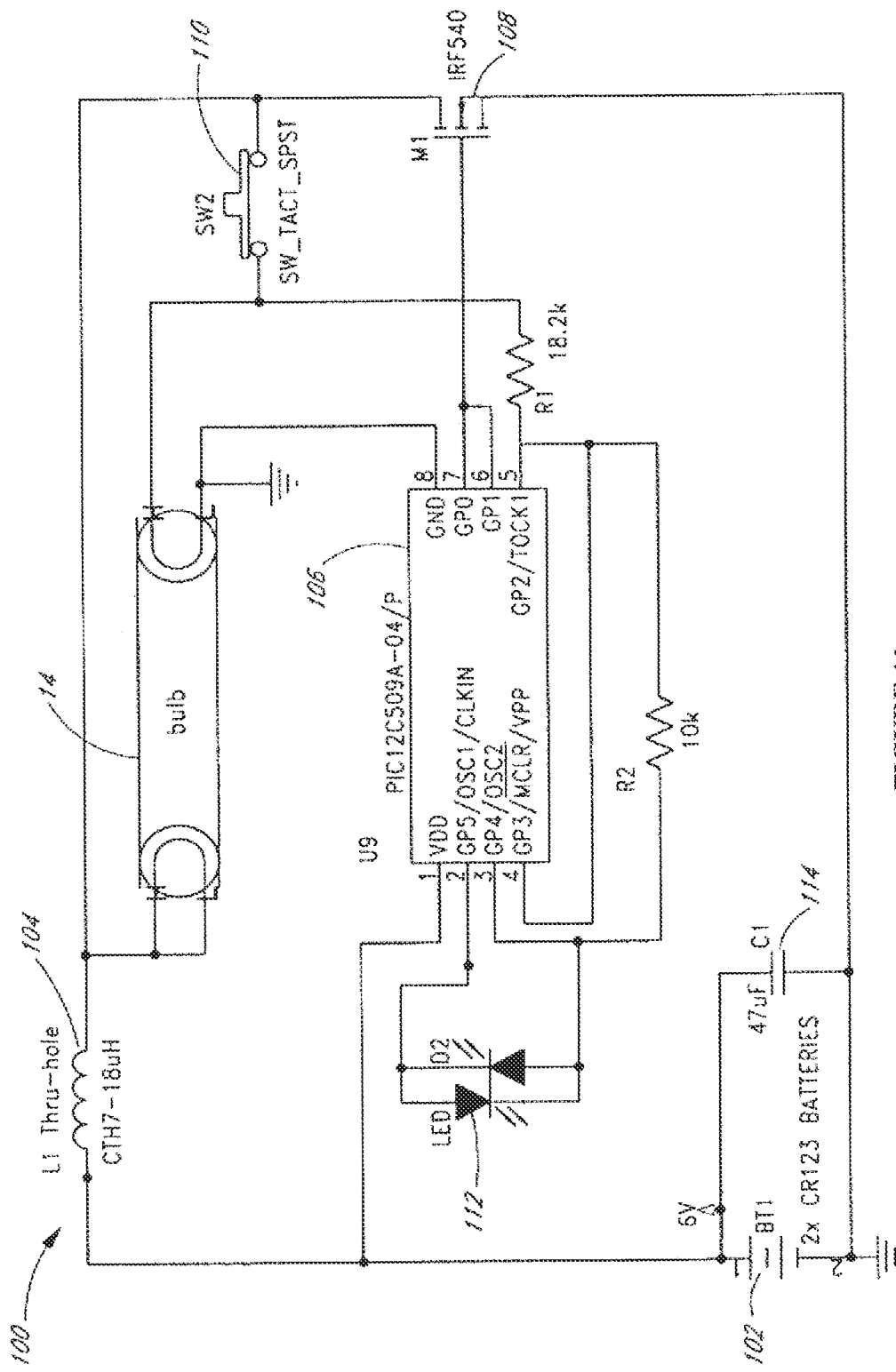
FIG. 11 is a schematic diagram illustrating a preferred circuit for driving the UV light source.

With reference now to FIG. 11, the electronic circuit 100 provided by the control unit for driving the UV light source 14 is schematically illustrated. The circuit is configured for grounding the cathode end of the UV light source while providing a sufficient voltage to the anode end for ionizing the vapor. The circuit 100 preferably includes, generally, a power supply 102, the inductor 104, the micro-controller 106, the field-effect transistor 108, and the switch 110. The power supply is preferably provided by a pair of batteries, such as two CR123 Lithium batteries, to provide a 6 VDC power source. In one important feature, the circuit preferably provides a fly-back inductor for generating a sufficiently high voltage to drive the UV light source 14. A fly-back inductor is very efficient and wastes very little power as heat, thereby providing an advantage over existing schemes utilizing less efficient and more expensive H-bridge circuits. Using the fly-back inductor, the relatively low voltage input from the power supply 102 is transformed to a much higher voltage that is capable of ionizing the vapor in the UV light source. More particularly, the fly-back inductor operates by storing energy in the inductor 104 during the power switch "on time" and transferring this energy to the output during the "off-time" in the form of a high voltage pulse, which is applied to the fluorescent tube.

With continued reference to FIG. 11, in another advantageous feature, the fly-back inductor is capable of driving the UV light source with a uni-directional pulsed tube current, rather than an AC input. To provide substantially continuous luminescence, the pulsed tube current input has a high-frequency pulse repetition rate. For example, in one preferred embodiment, the voltage has a pulse repetition rate of approximately 50 kHz or more. However, a wide range of pulse repetition rates may be used without departing from the scope of the invention. It will be appreciated by those skilled in the art that a circuit incorporating a fly-back inductor is capable of controlling and powering the UV light source with fewer and much less expensive components by utilizing a uni-directional pulsed tube current.

In yet another advantageous feature, the circuit 100 is capable of driving the UV bulb using a hot-cathode striking method. To provide hot-cathode striking, the voltage output from the fly-back inductor is used to preheat the cathode end and bulb filament before use. In one preferred embodiment, the voltage output is primarily dissipated through a heating filament on the cathode end when the switch 110 is initially depressed by the user. The produced heat effectively frees electrons from the cathode end of the UV light source. After the switch 110 is released by the user, the voltage pulses are directed exclusively to the anode end of the UV light source. Accordingly, it will be appreciated that the fly-back inductor is advantageously configured for a dual purpose such that the benefits of hot-cathode striking may be realized at little or no additional cost. Those skilled in the art will further appreciate that the use of hot-cathode striking allows for a reduction in the voltage necessary for ionization, thereby further reducing costs and increasing efficiency. For example, in preferred embodiments, the voltage necessary to ionize the mercury vapor is only about 80V peak. The reduction in voltage, along with the high repetition of pulses, allows for a reduction in size of the induction coil. The reduction in size also corresponds to a substantial reduction in cost and a safer design since electronic ballast based designs typically need to generate upwards of 400V to strike the tube.

In addition to the reduction in voltage, use of a hot-cathode striking method provides other advantages over devices using cold-cathode striking. For example, hot-cathode striking does not require a mechanism, such as a glow switch starter, to preheat the electrodes and the bulb filament before use. In another benefit, hot-cathode striking allows the UV bulb to turn on very quickly, thereby reducing the time of a disinfection cycle. In yet another benefit, the relatively low input voltage requirement substantially reduces power consumption. This is a particularly advantageous feature when the portable system is powered by batteries having a limited life.

With continued reference to FIG. 11, the operation of the circuit 100 will now be described during use for disinfecting water using the UV water purification system. Before use, the circuit is initially in "off" condition such that the circuit is open and no current flows through the inductor 104. After the container is filled with water or another liquid, the user actuates the switch 110 to begin a sterilization cycle. Switch 110 is mechanically coupled to the button (see element 50 of FIG. 8) disposed along the front end of the battery housing (see element 30 of FIG. 1). A single pole push button switch is preferably used for reducing system cost After the switch 110 is depressed, the micro-controller 106 wakes from a low power mode and begins operating the fly-back inductor. Control of the fly-back inductor is implemented in software within the micro-controller 106. Initially, the software within the micro-controller applies a voltage to (i.e., switches on) the control field-effect transistor 108, thereby closing the circuit such that a current flows from the power supply (e.g., batteries) and through the inductor 104 to ground. The field-effect transistor 108 advantageously requires very little power for operation, thereby helping to prolong the useful life of the power supply. The current is preferably allowed to flow through the inductor 104 for approximately 20 μs. However, in one preferred variation, the software can dynamically measure the current during use and adapt the drive time of the transistor 108 to achieve a particular desired current. At the end of the predetermined period (e.g., 20 μs), the software turns off the voltage input to the transistor 108, thereby interrupting the current and opening the circuit. The interruption of the current causes the field of the inductor 104 to produce a short-duration high-voltage pulse that is transmitted to the anode end of the UV light source. Due to the use of hot-striking, the pulse produced by the inductor need only be in the general range of about 80V to ionize the mercury vapor in the UV tube, thereby causing the UV light source to emit UV radiation.

The micro-controller 106 turns the voltage to the field-effect transistor 108 on and off such that pulses are repeatedly produced. As a result, the circuit 100 provides a high frequency (e.g., 50 kHz) series of voltage pulses that continuously power the UV light source during the disinfection cycle. In one example, a disinfection cycle may have a period of 60 seconds. In a preferred embodiment, the high frequency series of voltages pulses are applied to the anode end of the UV light source for powering the light source with a unidirectional current. This configuration allows for the use of a straight UV bulb which simplifies operation and reduces manufacturing costs.

In one variation, the micro-controller 106 is preferably configured to detect when the tube has been struck (i.e., confirm the light source is emitting UV radiation) by monitoring the voltage of the cathode terminal for spikes synchronous with the high voltage pulses. In another variation, the micro-controller 106 may be configured to shut down the fly-back inductor if the voltage pulses are not detected. Shutting down is desirable when pulses are not detected since no low impedance path exists for the power supply. The shutdown feature prevents the energy from being dissipated in an avalanche breakdown of the transistor 108. Similarly, if the tube is not struck, or starts but later stops, the micro-controller 106 may be configured to detect this and shut down the fly-back power supply.

In yet another variation, one or more light-emitting diodes (LED's) 112 or other indicators may be included in the circuit 100 to provide visual feedback to the user during operation. In one preferred embodiment, a visual indicator is illuminated at the completion of the sterilization cycle to indicate whether the cycle was successful. For example, if the tube and circuit are operating correctly, the cycle proceeds for a pre-selected period of time that is sufficient to be germicidal for clear liquids in the amount contained. Upon successful completion of the sterilization cycle, a green LED may be illuminated. If the sterilization cycle failed to complete for some reason, a red LED may be illuminated to alert the user that the water is not safe to drink. During use, if the user desires to terminate the cycle for any reason, the switch 110 may be pressed again during operation of the UV source. This will cause the sterilization cycle to terminate.

It will be appreciated that, using preferred embodiments of the present invention, the UV light source may be powered using only a single transistor 108 and a single inductor 104. Accordingly, the circuit 100 provides a substantial advantage over H-bridge circuit wherein numerous (e.g., four) transistors are necessary to provide a traditional and a more costly transformer. Still further, it will be appreciated that a high voltage output tuning capacitor is not required using preferred circuitry of the present invention, which further simplifies the circuit and reduces costs.

With reference again to FIG. 1, in yet another preferred variation, one or more electrically grounded pins 80 are provided for detecting the level of the water in the container. In a preferred configuration, the pins 80 are in contact with the water being sterilized only when the water level is high enough to completely immerse the UV tube. The primary purpose of the pins 80 is to help prevent unnecessary exposure to UV radiation. Furthermore, by using carefully selected values for the inductor 104 and a capacitor 114, the fly-back inductor is only capable of striking the UV light source when the return ground path for the high voltage anode pulses is enhanced by the presence of an electrically grounded liquid around the UV light source. This provides an additional level of safety which helps prevent striking the tube when the tube is not completely immersed. More particularly, when the water level is insufficient, the container does not provide contact with the grounded pins 80. In another variation, one or more pins may provide a temperature sensor. In this embodiment, the micro-controller may adjust the period of the disinfection cycle according to water temperature.

The UV water purification system provides an efficient and easy to use device for treating and transporting water. The system has a rugged construction and is small and lightweight such that the system may be easily carried to a remote location, such as during hiking or camping. The system may be manufactured at a low cost, thereby making the system affordable to persons living in impoverished areas that lack access to adequate water treatment facilities.

For enhanced disinfection of the water, one or more filters may be provided along a top opening of the container for filtering out a variety of microbes while filling the container. The filter may take a variety of forms, such as, for example, a fine fabric or a metal screen. Although preferred embodiment are described herein as using batteries to provide a power supply, a variety of alternative power sources may be used. For example, a human powered generator may be incorporated into the device or may be provided as an option that may be attachable to the device. In another alternative embodiment, a solar powered generator (e.g., photo-voltaic eels) may be used to provide a power source. These alternative power sources may be used alone or in combination with batteries. The human powered generator and the solar powered generator each has the advantage of providing a renewable power source that can be used anywhere.

Preferred embodiments of the present invention described herein provide an improved floating portable water purification device which uses UV light for killing disease-carrying microorganisms in water. The water purification device may be used to remove contaminants from dangerous water supplies in locations wherein water purification is not readily available. In one application, the water purification system may be used by residents living in remote or impoverished regions to treat contaminated water. In another application, campers or hikers may use the water purification device to disinfect water from lakes or streams before drinking Furthermore, the water purification device may be used to disinfect water around the house during emergencies, such as an earthquake or flood, wherein the tap water has become contaminated.

Figure 12:
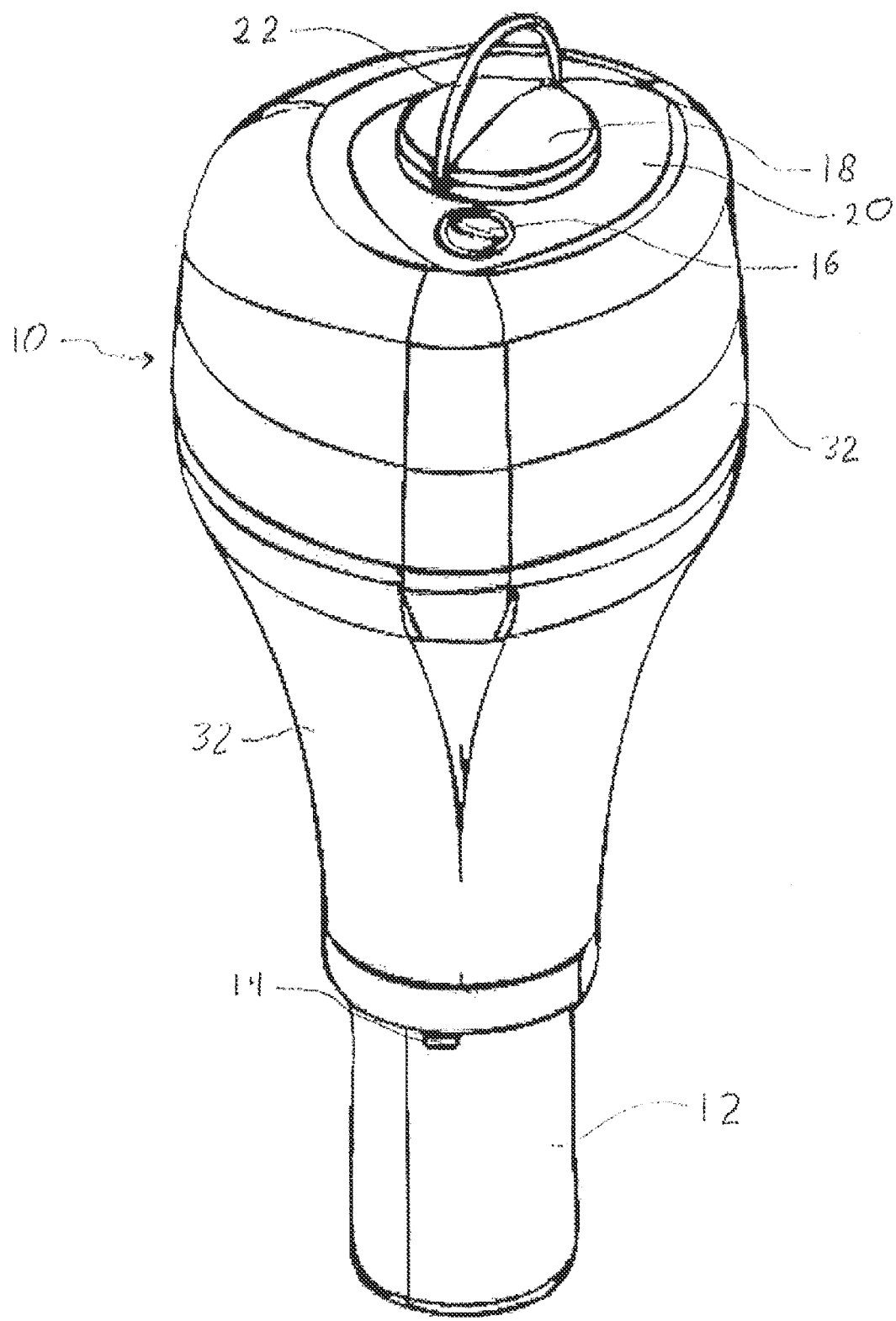
FIG. 12 is a perspective view of an embodiment of the water purification device.

With reference now to the FIG. 12, for purposes of illustration, one preferred embodiment of a water purification device includes, generally, UV light source 12, control circuit 28, power supply 26, enclosed within bulbous case 32 capable of floating in the liquid it is treating. In one preferred embodiment, the water purification system is constructed such that the UV light source does not require a quartz cover, thereby substantially reducing the cost of manufacture.

With continued reference to the FIG. 12, for purposes of illustration, one preferred embodiment of a water purification device includes a compartment shape which makes the device easy to grasp, and a handle 22.

With continued reference to the FIG. 12, for purposes of illustration, one preferred 30 embodiment of a water purification device includes a sensor 14 for detecting the presence or absence of liquid. The device may be designed such that it will not start if not immersed in the liquid to be treated, or can shut off automatically if removed from the liquid. Methods and circuits for performing this function are well known and are exemplified by the teachings of U.S. Patent Application 2005/0205480 filed on Dec. 3, 2004 by Kuhlmann et al., which is incorporated in its entirety herein by reference.

With continued reference to the FIG. 12, for purposes of illustration, one preferred embodiment of a water purification device includes one or more buttons 16. The button(s) 16 can be configured to turn the UV lamp, tube, or other source 12 on and or off directly and or configured as input to a circuit such as a micro-controller that controls the lamp output.

With continued reference to the FIG. 12, for purposes of illustration, one preferred embodiment of a water purification device includes one or more light-emitting diodes ("LED") 20 or other visible lamps. LED 20 may be colored for simple low level illumination or indication or it can be bright white type and be used for illumination secondary to the primary function of liquid treatment. LED 20 can also be used to indicate the various functions and conditions of the device including but not limited to start indication, normal cycle completion, aborted cycle completion, and low battery as well as other status conditions. More than one LED 20 can be used in combinations of colors and white to allow various combinations of indicators and illumination.

With continued reference to the FIG. 12, for purposes of illustration, one preferred embodiment of a water purification device includes a compartment cover 18 that allows access to internal components including the battery 26, circuit board, UV lamp 12 if not serviced from outside the compartment, and other internal components.

Figure 13:
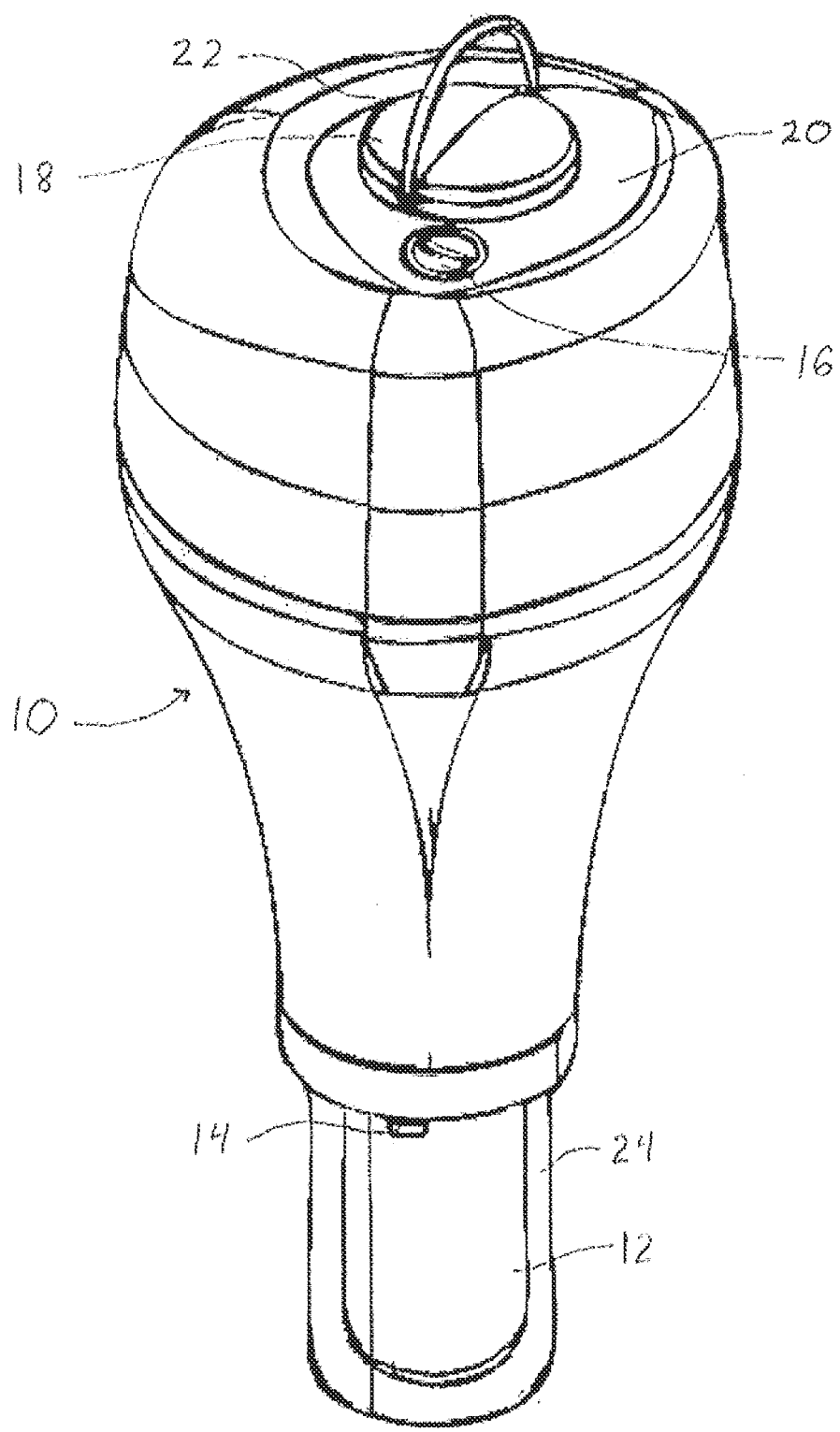
FIG. 13 is a perspective view of an embodiment of the water purification device.

With reference now to the FIG. 13, for purposes of illustration, one embodiment includes UV transparent cover 24. One preferred embodiment of a water purification device includes a cover 24 to protect the UV lamp 12 and that can also be sealed to the case 32 to assist in protecting the internal components from leakage of the liquid into the compartment. In all other respects all of the heretofore discussed combinations are possible with the addition of UV transparent cover 24 including liquid sensor 14, LEDs 20, timer, handle 22, etc.

Figure 14:
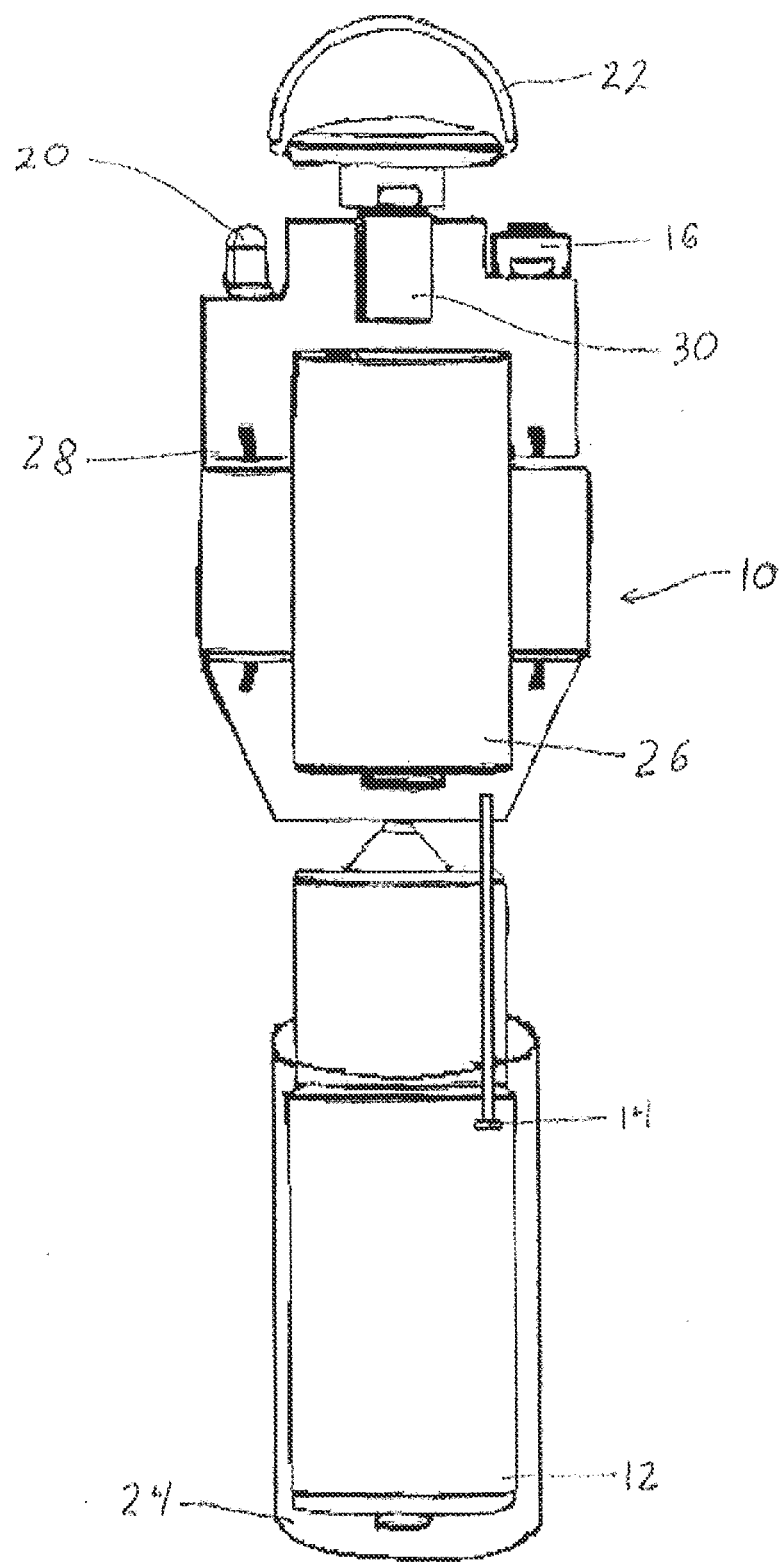
FIG. 14 is an inside view of an embodiment of the water purification device.

With reference now to the FIG. 14, for purposes of illustration, a number of internal features are shown. One preferred embodiment includes an auxiliary power jack 30 that allows the device to be powered from an external source or disconnected and run from an internal battery 26. Although preferred embodiments are described herein as using batteries to provide a power supply, a variety of alternative power sources may be used. For example, a human powered generator may be incorporated into the device or may be provided as an option that may be attachable to the device. In another alternative embodiment, a solar powered generator (e.g., photo-voltaic cells) may be used to provide a power source. These alternative power sources may be used alone or in combination with batteries. The human powered generator and the solar powered generator each has the advantage of providing a renewable power source that can be used anywhere. Other power sources capable of providing the necessary electrical current and voltage will be apparent to those of skill and are intended to be within the scope of the claims.

With further reference to the FIG. 14, an internal power source can include a battery 26. The battery may be rechargeable and the control circuit 28 can be configured to manage charging of said battery.

An external power source can be connected by way of leads with magnets fixed to their ends. The external power source so connected can be used to operate the device or to recharge an internal rechargeable battery 10 or power the device separately.

With reference now to the FIGS. 4, 5, and 6, for purposes of illustration, the operation of the device will now be described during use for disinfecting water. Before use, the circuit is initially in "off" condition such that the circuit to the UV lamp 12 is open and no current flows. After a container 34, such as but not limited to those shown in FIGS. 4, 5, and 6, is filled with water or another liquid, the user actuates the button or switch 16 to begin a sterilization cycle. In one preferred embodiment, button 16 is disposed at the top end of the device 10. A single pole push button switch may preferably be used for reducing system cost.

After the switch 16 is depressed, one preferred embodiment uses a micro-controller in the control circuit 28 which wakes from a low power mode and begins operating. During use, if the user desires to terminate the cycle for any reason, the button 16 may be pressed again during operation of the UV lamp 12. This will cause the sterilization cycle to terminate.

In one variation, the micro-controller is preferably configured to detect when the lamp has been struck (i.e., confirm the light source is emitting UV radiation) by monitoring the voltage pulses across the UV lamp 12. Shutting down is desirable when pulses are not detected since no low impedance path exists for the power supply. The shut-down feature prevents waste of energy, harm to the control circuit, and provides an opportunity to attempt to strike the UV lamp 12 again or warn the user of a failure to operate correctly.

Figure 15:
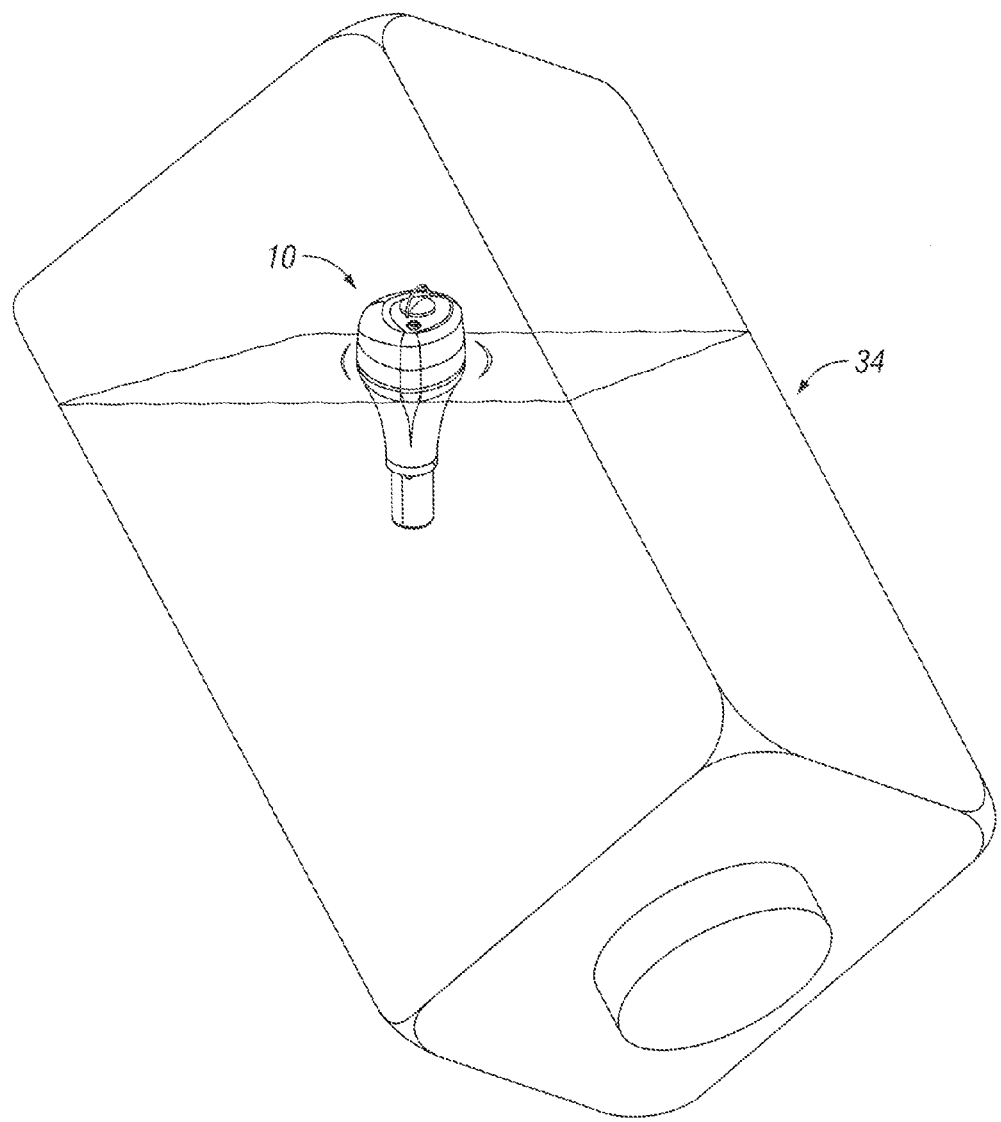
FIG. 15 is a perspective view of an embodiment of the water purification device.
Figure 16:
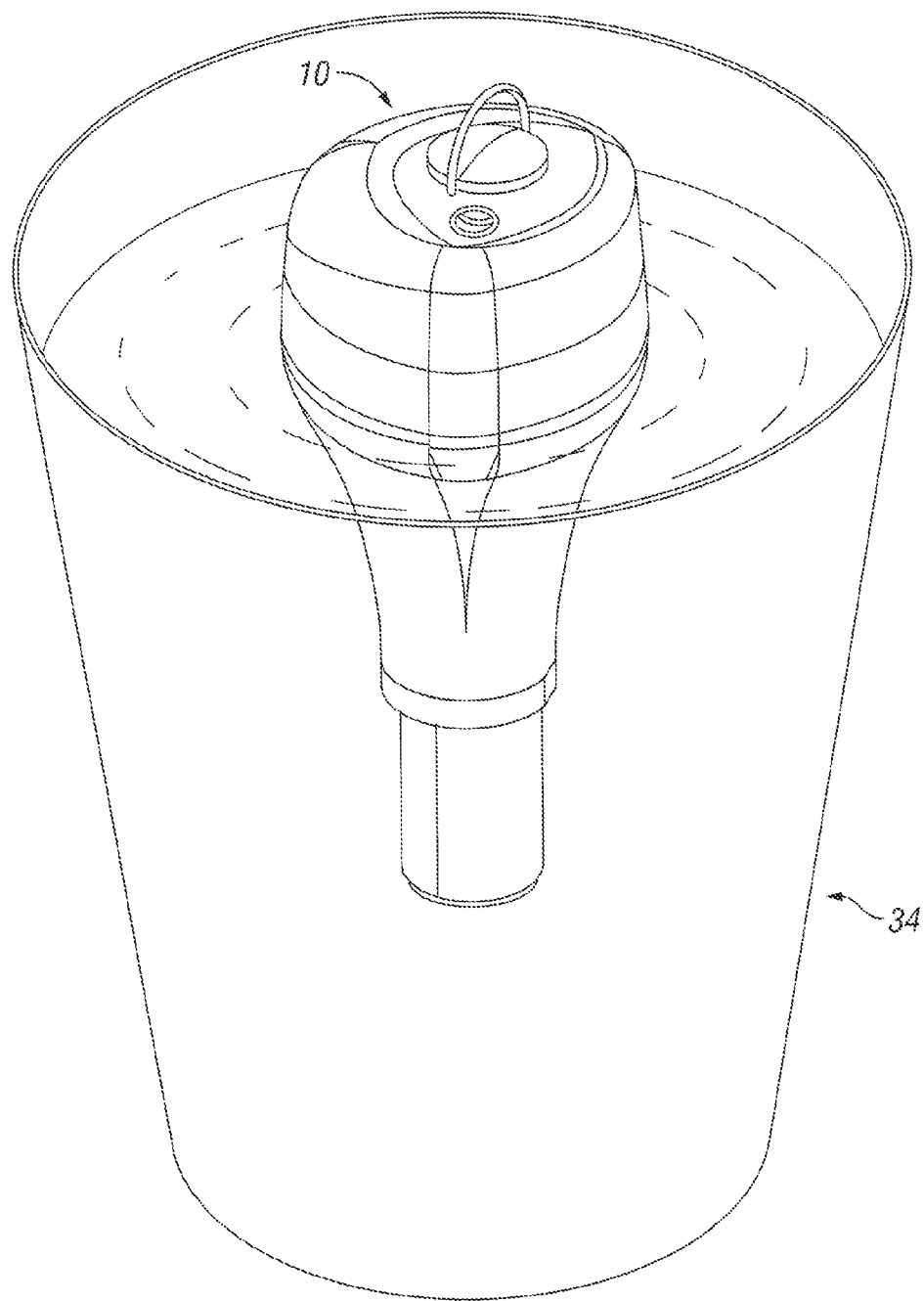
FIG. 16 is a perspective view of another embodiment of the water purification device.
Figure 17:
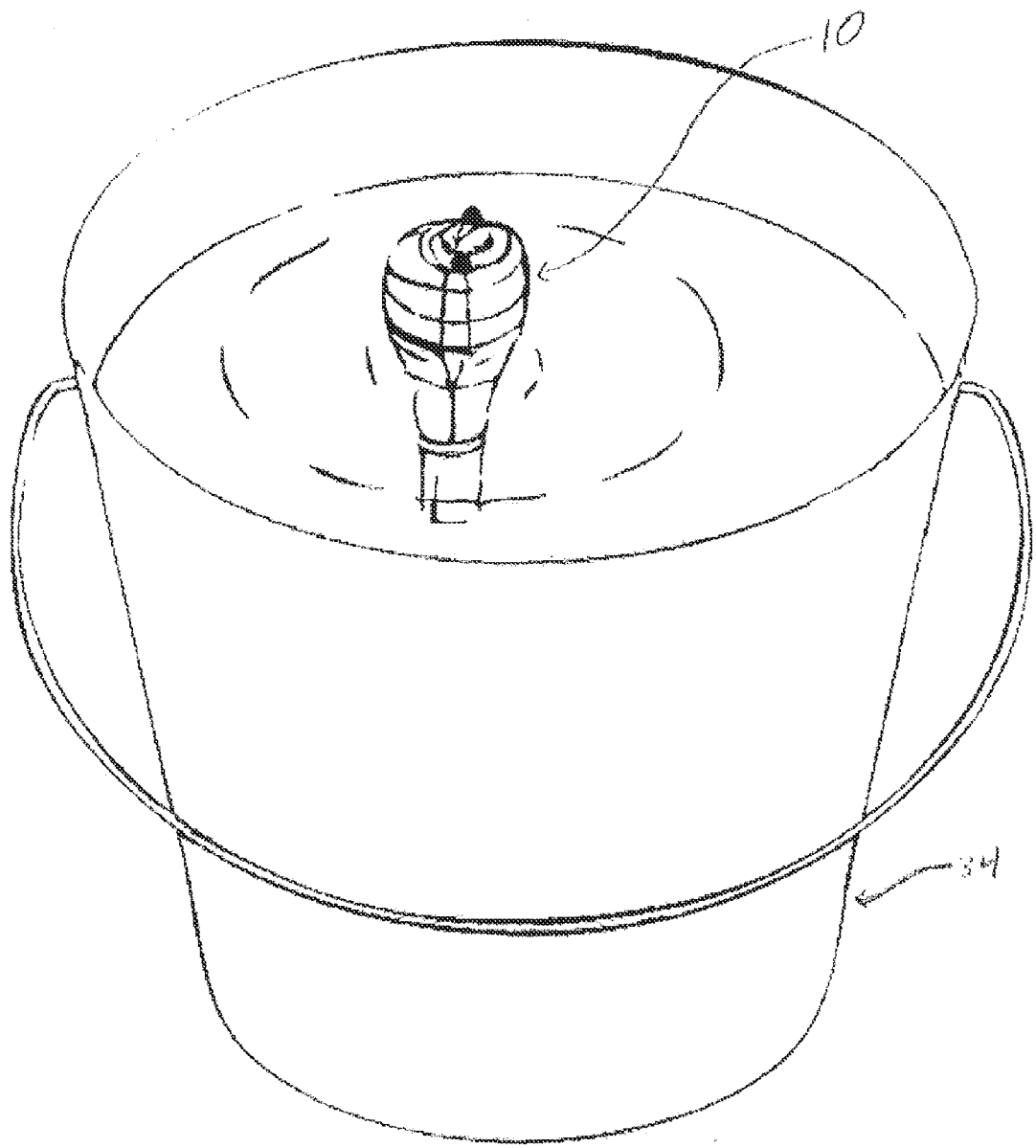
FIG. 17 is a perspective view of another embodiment of the water purification device.

In yet another variation, one or more LEDs 20 or other indicators may be included in the circuit to provide visual feedback to the user during operation. In one preferred embodiment, a visual indicator LED 20 is illuminated at the completion of the sterilization cycle to indicate whether the cycle was successful. For example, if the UV lamp 12 and circuit 28 are operating correctly, the cycle proceeds for a pre-selected period of time that is sufficient to be germicidal for clear liquids in the amount contained. If necessary or desired, the container 34 can be agitated or if equipped with a cover to retain the water such as in FIG. 15 can be turned over such that all parts of the container 34 and liquid contained therein are treated by the UV light.

In another embodiment, LED 20 may be white, a single color, or be capable of displaying in multiple different colors for the purpose of conveying different information. For example, a green LED 20 may be illuminated upon successful completion of the sterilization cycle. Conversely, if the sterilization cycle failed to complete for some reason, a red LED 20 may be illuminated to alert the user that the water is not safe to drink. In a one-color embodiment, for example, the light may blink if the cycle is not successfully completed and come on steady for a period of time if the cycle is successful.

In yet another preferred variation, one or more electrically connected pins used as a liquid sensor 14 are provided for detecting the level of the water in the container 34. In another preferred configuration, sensor 14 is in contact with the water being sterilized only when the water level is high enough to completely immerse the UV lamp. The primary purpose of the sensor 14 is to help prevent unnecessary exposure to UV radiation. Liquid sensor 14 can be used to prevent operation of the float device 10 until it senses that it is immersed in water for a significant period of time, for instance a few seconds. Thus it provides a safeguard that is also relatively impervious to false activation by a stray raindrop or some mist or splash.

This provides an additional level of safety which helps prevent striking the tube when the UV lamp 12 is not completely immersed. More particularly, when the water level is insufficient, the container 34 does not provide contact with the pin(s). In another variation, one or more pins may provide a temperature sensor. In this embodiment, the micro-controller may adjust the period of the disinfection cycle according to water temperature.

The UV water purification device 10 provides an efficient and easy to use device for treating water. The device 10 has a rugged construction and is small and lightweight such that the system may be easily carried to a remote location, such as during hiking or camping. The device 10 may be manufactured at a low cost, thereby making the system affordable to persons living in impoverished areas that lack access to adequate water treatment facilities.

Preferred embodiments of the present invention provide an improved portable UV water purification 10 device. In one preferred embodiment, the device is small enough to be carried easily and floated in the container 34 of liquid being treated.

A further preferred embodiment includes a small, easily grasped handle 22 on top of the device to facilitate removal of device 10 from liquid. Thus the user will readily be able to pluck the device 10 out of the liquid being treated.

A further preferred embodiment includes one or more switches 16 to control starting or stopping the treatment cycle. This or these switches 16 could also enable or disable other optional features such as flashlight or length of treatment cycle.

A further preferred embodiment has the device being sealed on all sides against penetration of liquid. If the container 34 is large enough that some of the liquid to be treated is out of the effective reach of the UV light, and the container 34 has a lid or other method of enclosing the liquid, the container 34 can be inverted and otherwise moved such that more of the container 34 and enclosed liquid can be treated. This and other embodiments also allow the user to fill the container 34, such that it is not necessary to remove the device between treatments.

The water purification device 10 is preferably provided with a power source 26, such as batteries, and electronic circuitry for controlling the radiation of UV light. A case 32 may contain the power source 26 and electronic circuitry.

In one variation, a timing function, preferably implemented in a micro-controller, is operatively connected to the control circuit 28. The timing functionality may be implemented in software in the micro-controller. The micro-controller may then control the length of the treatment cycle by means of a timing function.

In another variation, the method further includes an indicator lamp 20, preferably a LED, to indicate to the user status of the device when in use. The LED 20 could indicate that the device 10 has been started; stopped; experienced an error, such as low batteries or premature termination of the treatment cycle; or other device or operation status.

In another variation, the method further comprises sensing that the liquid is above a predetermined level before applying power to the UV lamp 12, or removes power from the UV lamp 12 if liquid is not detected within a predetermined period of time. This feature prevents the system from operating when the container 34 is not sufficiently full of a liquid. Preferably a sensor 14 or metal contact extends into the interior volume such that the liquid can be detected by the control circuit or micro-controller if present.

In another variation, the method further comprises a cover 24 which is transparent to UV to protect the lamp. The UV transparent cover is made of quartz or other special UV transparent glass or plastic.

In another variation, the method further comprises a lantern or flashlight feature, where preferably a white LED is powered from the same source and provides a secondary function to the liquid treatment while being housed in the same case 32.

In another variation, the method further comprises a charging circuit or a circuit and otherwise necessary connections that allows an internal rechargeable battery to be recharged. Said connections could be fixed to the charge source with leads, and leads may be affixed to the charging source with magnets attached at the lead ends.

Figure 18:
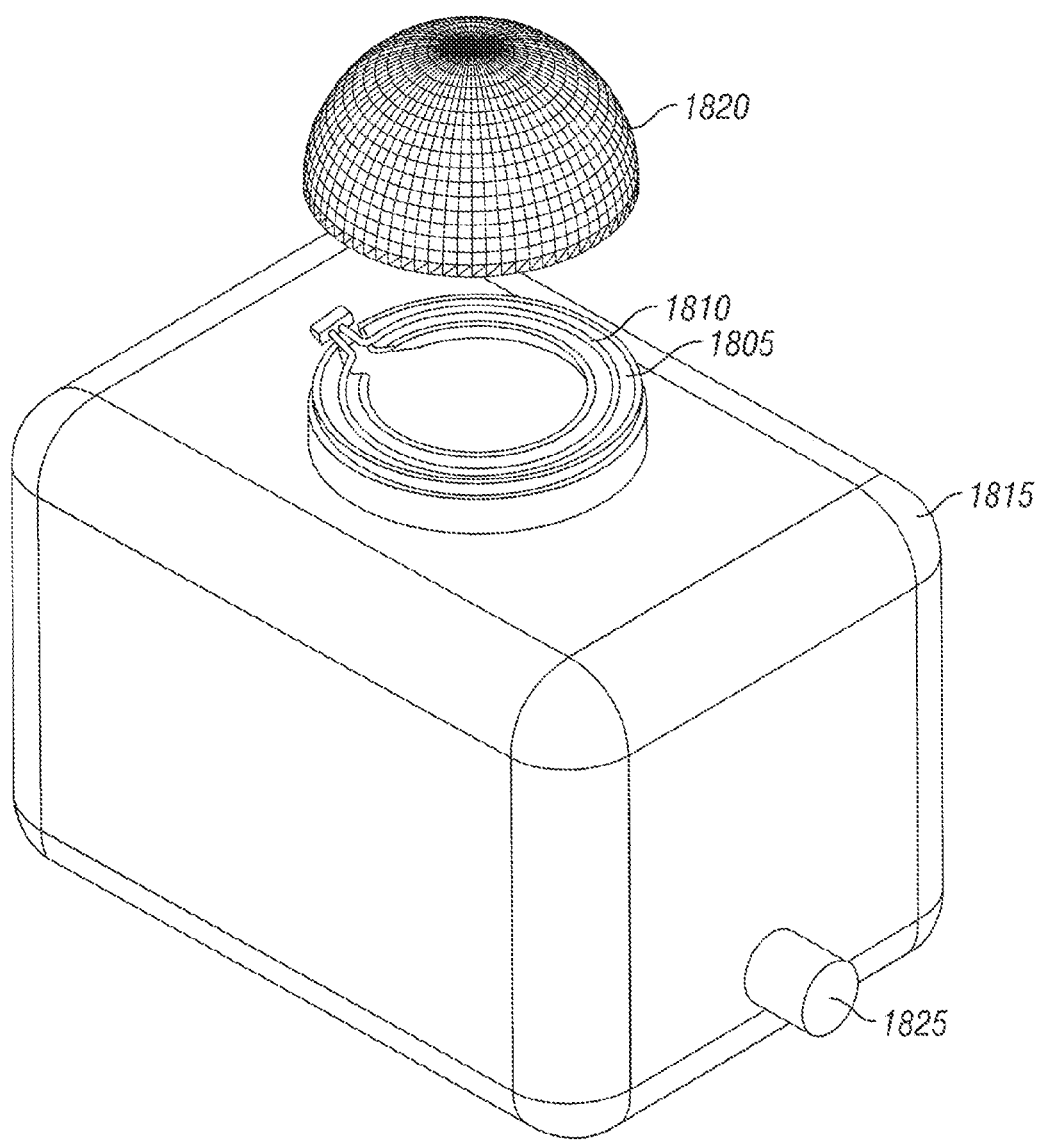
FIG. 18 is a perspective view of an embodiment of a water purification device.

FIG. 18 illustrates a perspective view of another embodiment of a purifying system. In one embodiment, a container 1815 has a trough 1805 exposed to a UV source 1810. A reflector 1820 is arranged so as to reflect UV light from the UV source 1810 towards water to facilitate purification. The reflector 1820 may be inverted or otherwise configured as appropriate to focus UV light into a container 1815. In one embodiment, the trough 1805 is half-toroidal with a water entry point and a water exit point. In this embodiment, the UV source 1810 and the reflector 1820 are configured to allow UV light to be reflected and concentrated both into the trough 1805 and the container 1815. The trough may comprise a transparent material in order to allow light from the UV source 1810 to pass through the trough 1805 and to pass on to the liquid in the container 1815. It is to be understood that trough 1805 may be configured to be an adaptor inserted into a cap or onto a container 1815. Container 1815 may comprise a spigot or valve 1825 configured to facilitate access to water in container 1815. The optional trough 1805, UV source 1810, and reflector 1820 may be configured to be mounted on any one of the sides of the container 1815, and the top or bottom of the container 1815. The UV source 1810 may be configured to be water proof, and in one embodiment may comprise a subpart of a cap to a container 1815. In one embodiment, the UV source 1810 reflector 1820 may be inverted in order to be attached to a bottom of a container 1815. In one embodiment, the cap (not shown) may be configured to operate like a valve or spigot to facilitate the entry of water into the water purification system.

Figure 19:
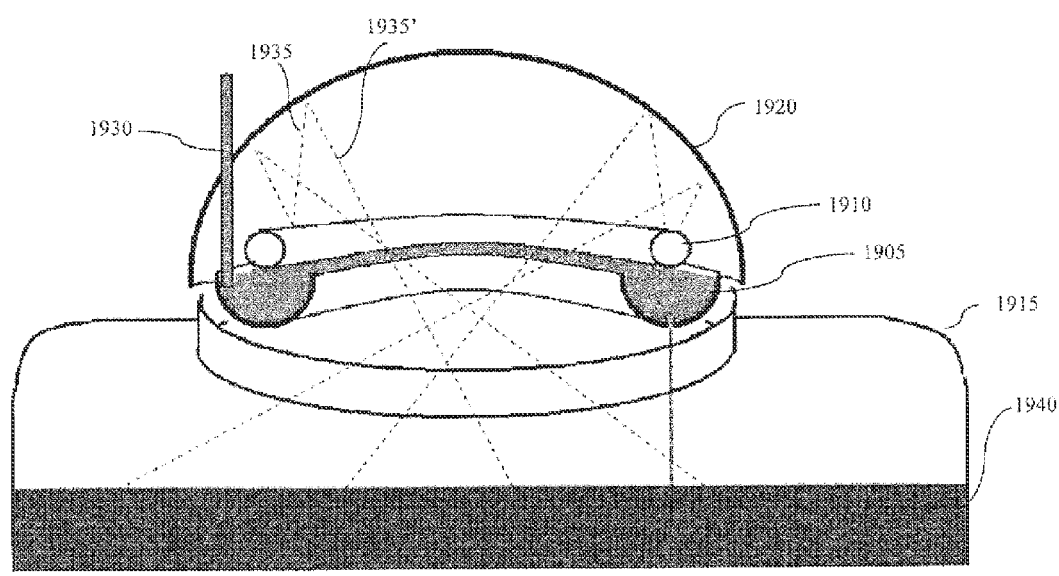
FIG. 19 illustrates a cross-section of one embodiment of a water purification device.

FIG. 19 illustrates a cross-section of an embodiment of a purifying system. The container 1915 is configured to hold water 1940. The system includes a trough 1905 configured to accept water via an inlet 1930, channel the water in the trough 1905 in relation to a UV source 1910, and to and outlet configured to transfer water from the trough 1905 into the container 1915. In one embodiment, trough 1905 and UV source 1910 are torodial and may arranged in proximity to a reflector 1920 to direct UV light (e.g., 1935) from UV source 1910, and reflect the UV light off of reflector 1920 (see, e.g., 1935') and into container 1915 in order to focus UV light onto water both in the trough 1905 and the container 1915. Of course, other shapes of troughs and UV sources are contemplated by the current disclosure.

In operation, water may be fed into a toroidal trough 1905 via an inlet 1930. A UV source 1910 may be arranged in proximity to trough 1905 in order to expose the water in the trough 1905 to UVC light. The trough 1905 may also have an outlet configured to feed purified water into a container 1915. In one embodiment, the outlet may be a hole in the trough 1905. In other embodiments, it may be a valve, among other things. A reflector 1920 may also be arranged in proximity with UV source 1910 in order to reflect UV light (e.g. 1935) off of the reflector 1920 and into the interior of the container 1915 (see also 1935'). In this embodiment, water may be exposed to UV light upon entering trough 1905 and then yet again while in container 1915. In another embodiment, reflector 1920 could be the bottom portion of a second container stacked on the first container 1910 (not shown). In another embodiment, the toroidal trough 1905, the UV source 1910, and the reflector 1920 may be combined in a "cap" assembly for installation on a container 1915.

Figure 20:
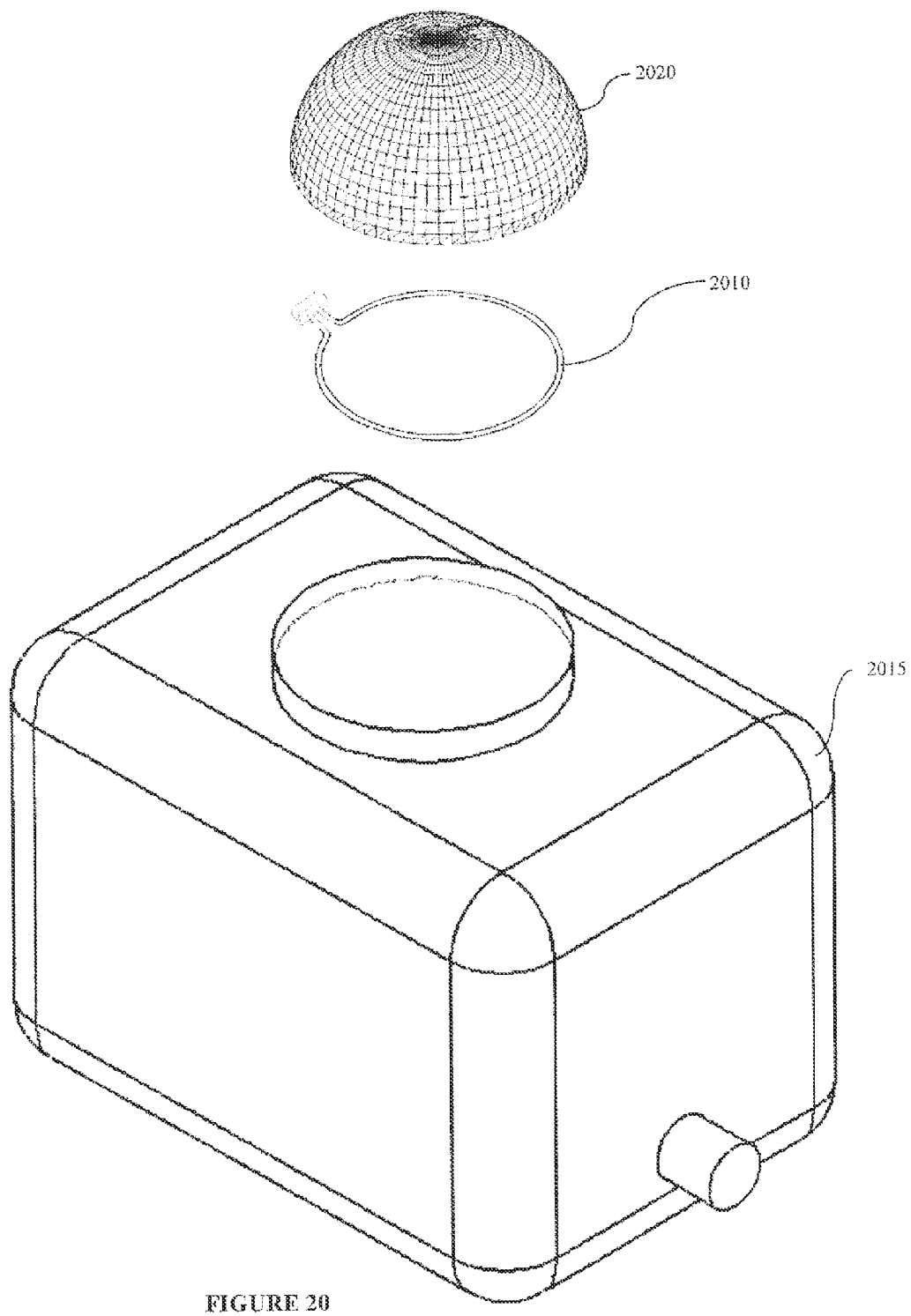
FIG. 20 is a perspective view of another embodiment of a water purification device.
Figure 21:
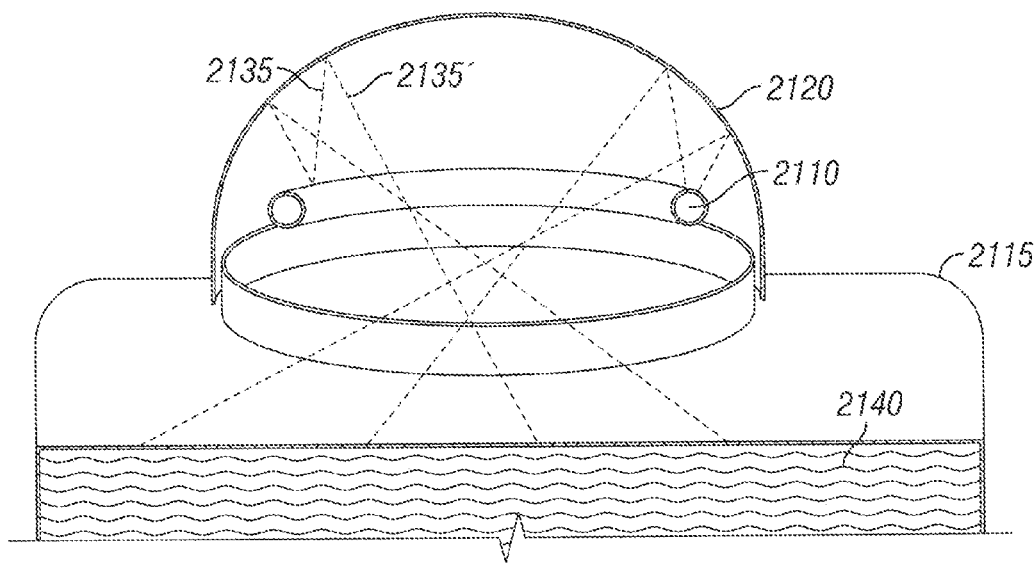
FIG. 21 is a cross-section of another embodiment of a water purification device.

FIGS. 20 and 21 illustrate embodiments of a water purification system that do not include a trough system. FIG. 20 is a perspective view of an embodiment of a water purification system. In this embodiment, a container 2015 is coupled with a UV source 2010 and a reflector 2020.

In operation, UV source 2010 may be used to transmit UV light and act as a germicide, among other things, and purify liquid stored in container 2015. Reflector 1820 may be combined with UV source 2010 in order to direct UV light and maximize UV exposure to the liquid stored in container 2015.

FIG. 21 illustrates a cross-section of a water purification system. FIG. 21 illustrates a container 2115 containing a liquid 2140 with a reflector 2120 and a UV source 2110. In one embodiment, the reflector 2120 and the UV source 2110 may comprise a cap for container 2115. In another embodiment, the reflector 2120 and the UV source 2110 may be integrated into a cap mechanism.

In use, UV source 2110 may be initialized and may provide light into the container 2115 and liquid 2140. As is illustrated, reflector 2120 may be configured to reflect or redirect light 2135 from the UV source 2110 and into the container 2115 (as illustrated by reflected light 2135').

Practically speaking, a water purification system with a trough, e.g., 1805, may be configured to maximize and focus UV exposure on a liquid as it flows past a UV source, e.g., 1810. However, it is to be understood that the embodiments described above in relation to FIGS. 20 and 21 may also be configured to effectively purify a liquid.

Figure 22:
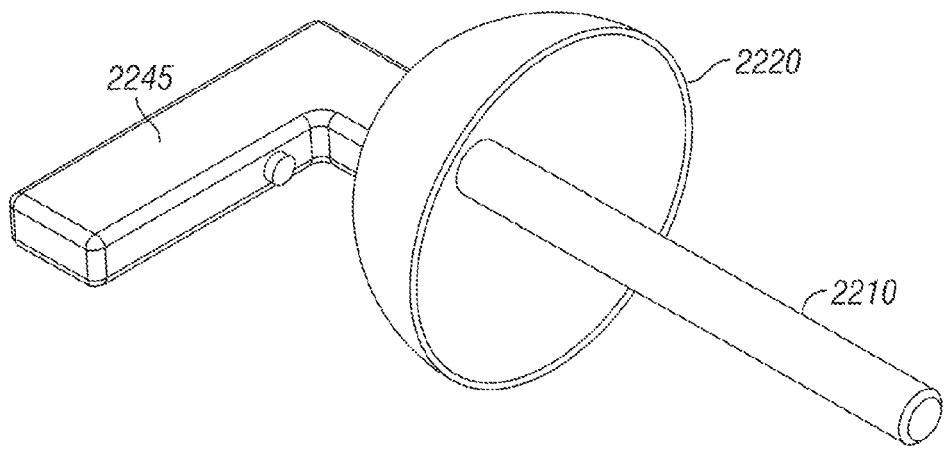
FIG. 22 is a perspective view of an embodiment of a water purification device.

FIG. 22 is a perspective view of another water purification system. The water purification system comprises a handle 2245 connected to a UV source 2210 and a reflector 2220. Handle 2245 may take a variety of forms and orientations. For instance, in one embodiment, handle 2245 may resemble a gun grip. However, handle 2245 may also be parallel to UV source 2210 with, in one embodiment, a hinge configured to change the orientation of the handle 2245 according to the user's preference. Handle 2245 may be in any suitable material including, among other things, hard plastic, woods, and metals. In one embodiment, reflector 2220 is a half sphere with a concave interior in which a UV source 2210 is connected. Reflector 2220 may comprise any suitable material configured to reflect UV light in a predetermined direction.

In one embodiment, the water purification system may use a spherical reflector 2220 and a UV source 2210 oriented perpendicular to the reflector 2220. Alternatively, the water purification system may use a cylindrical reflector 2220 and a UV source 2210 oriented horizontally with the reflector 2220. As would be readily understood by one of ordinary skill in the art, different reflector shapes have different light reflection properties and may be configured in conjunction with a UV source 2210 in order to achieve a desired level of light reflection.

In operation, a user may use the water purification system depicted in FIG. 22 by directing it towards water in a container. In one embodiment, the container may comprise a top-most opening towards which the user may direct UV light from a UV source 2210 and also reflected off of a reflector 2220. In one embodiment, it is not necessary for the user to place the UV source 2210 into the water. In another embodiment, however, the water purification system is designed such that UV source 2210 may be placed in contact with the water in the container. In one embodiment, the user directs the water purification system at an empty container, such as a bucket or jug, and exposes the container to UVC light. Water can then be put into the container, and the water purification system can be used to direct UVC light into the water.

Figure 23:
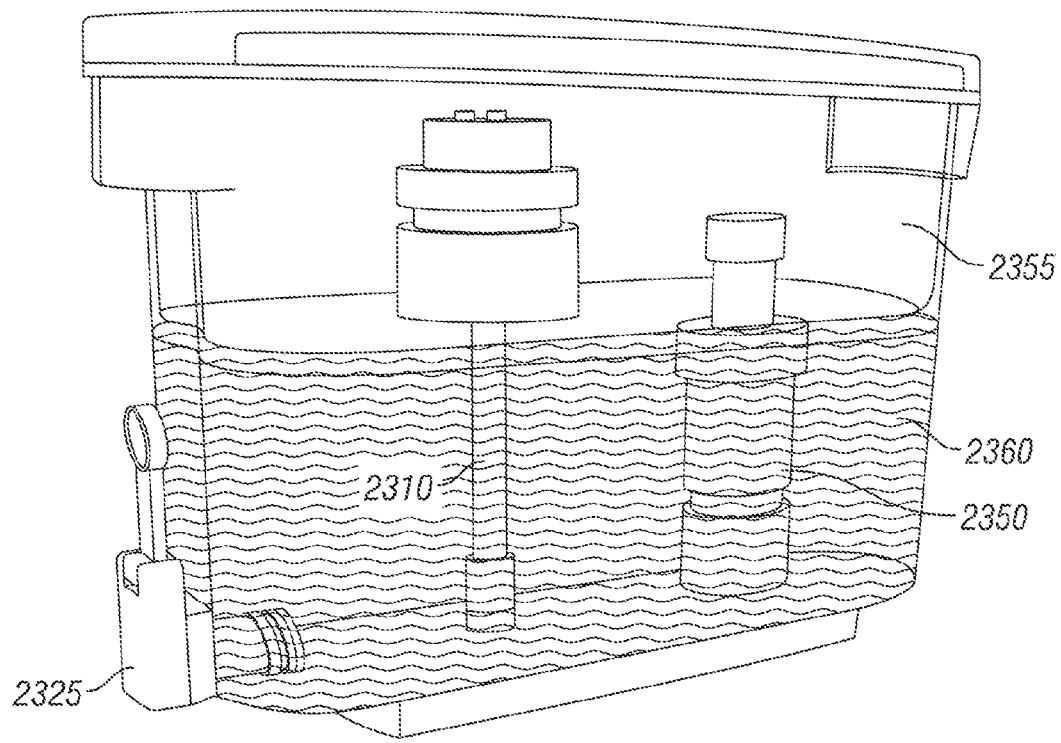
FIG. 23 is a perspective view of an embodiment of a water purification device.

FIG. 23 illustrates a water purification system comprising two containment chambers 2355 and 2360 connected via a filtration assembly 2350. The filtration assembly 2350 may comprise a charcoal-based filtration system, or any other suitable filtration system. The water purification system also comprises a UV source 2310 that may be optionally configured to be extended into both containment chambers 2355 and 2360. The water purification system may also comprise a spigot 2325.

In operation, water may be placed in the first containment chamber 2355. While in the first containment chamber 2355, the water may be purified by light emanating from UV source 2310. The first containment chamber 2355 may be connected to the second containment chamber 2360 via a filtration assembly 2350. The filtration assembly may be configured to filter water entering the second containment chamber 2360. Once in the second containment chamber 2360, the water may be further purified with light from the UV source 2310. The water filtration system may comprise a spigot 2325 which may be configured to allow access to water that has passed through the filtration assembly 2350 and been purified with UV light from UV source 2310. In one embodiment, the UV source 2310 could alternatively be in the spigot 2325 (not shown), or could be separate and actuated by the user or the spigot 2325 or a timer or water detect mechanism.

Figure 24:
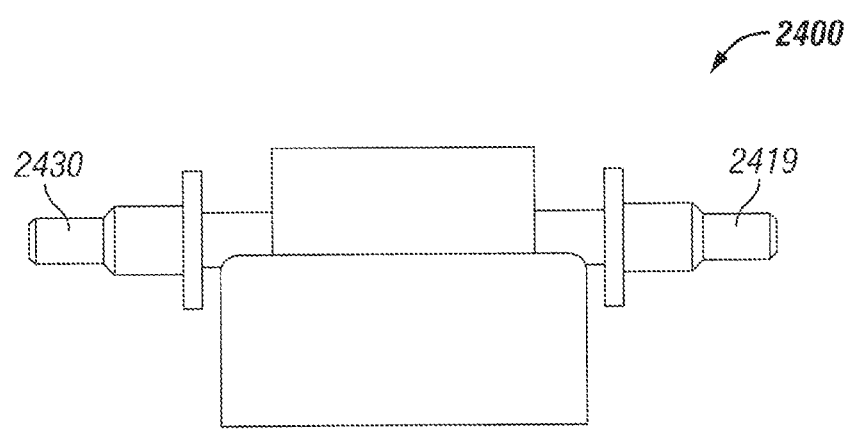
FIG. 24 is a perspective view of another embodiment of a water purification device.

FIG. 24 discloses one modular embodiment of the current disclosure configured to be used in a variety of uses and situations. Water purification system 2400 may comprise a plug or puck embodiment configured to be plugged into the cap of a containment chamber, or reservoir (not shown). Water purification system 2400 may comprise an input nozzle 2430 and an output nozzle 2419. Water purification system 2400 may comprise threading to facilitate attachment to a containment chamber or reservoir. Water purification system 2400 may comprise an integrated clasp (not shown) configured to attach the water purification system 2400 to, for instance, a lanyard attachment, among other things. Water purification system 2400 may also comprise a filtration system (not shown) configured to remove larger debris and particles from raw water prior to UV-based purification. Water purification system 2400 may also be configured with a switch or wire configured to facilitate activation of a UV bulb from a remote device, such as, for example, a mouth piece.

In operation, the water purification system 2400 may be affixed into a cap assembly such that input nozzle 2430 and output nozzle 2419 allow liquid to flow past a UV lamp also arranged in the cap assembly such that water can be treated in a continuous flow. In one embodiment, the water purification system 2400 may have a directional valve to regulate the flow of liquid. For instance, liquid may enter input nozzle 2430 and enter an attached containment chamber, such as a water bladder. The liquid can pass through a filter configured to remove larger debris and particulates and otherwise prepare the liquid for UV-based purification. The liquid stored in the containment chamber may then be forced towards the output nozzle 2419, prior to which it passes in proximity to a UV bulb configured to purify the liquid. In one embodiment, the UV bulb is housed in a reflective chamber. In another embodiment, the cap assembly could optionally be configured to have an input nozzle 2430 and output nozzle 2419 to facilitate the flow of liquid past the water purification system 2400, thus allowing the water purification system 2400 to function as a continuous flow device instead of being limited to a batch treatment unit.

In another embodiment, the water purification system 2400 may be configured such that a UV bulb is separate from the water purification system 2400 puck device. Thus, when the water purification system is affixed to a containment chamber, liquid flows in proximity to the UV lamp and then into the containment chamber. In one embodiment, a trough adapter, may be included in the water purification system 2400 such that the treated liquid might fall into the containment chamber after purification. In yet another embodiment, the UV bulb may be configured to purify water passing in proximity in a trough adapter, and also configured in conjunction with UV reflectors to emit light into the containment chamber as well.

In yet another embodiment, the water purification system 2400 comprises a switch or wire assembly configured to receive input signals from an external controller or some other external source. For instance, in one embodiment, water purification system 2400 comprises an output tube (not shown) connected to output nozzle 2419. The output tube comprises a supplemental wire assembly configured to couple with the water purification system 2400. In this embodiment, the output tube may comprise a mechanism configured to transmit a signal, via the supplemental wire assembly to the water purification system 2400 to initiate, for example, a purification cycle. More particularly, the water purification system 2400 may be coupled to a liquid containment bladder, and further coupled to a flexible output tube, or straw, configured to be inserted into a mouth. The flexible output tube may comprise a bite valve configured to signal the initiation of a purification cycle and push liquid out the output nozzle 2419 into the mouth of the user. Of course, the water purification system 2400 is configured to accept input related to a plurality of external events. Furthermore, it is contemplated that the water purification system 2400 may comprise a controller configured to signal or otherwise initiate different modes of operation. Thus, the water purification system 2400 may be configured to be used in a variety of environments such as, for instance, a counter-top purification embodiment or a personal liquid bladder embodiment, among others.

In some embodiments, the water purification system 2400 might have a same diameter as a cap assembly. It is anticipated that in these embodiments, it might be possible to prevent shading. In yet another embodiment, the water purification system 2400 may be configured to be any number of possible depths. Thus, the water purification system may be configured to extrude slightly into a containment chamber, or, on the other hand, may be configured to extrude significantly into the containment chamber. This, it may be possible to configured the water purification system 2400 to extrude no deeper than necessary and optimize UV light propagation through a liquid.

A different adapter implementation could leave the puck open to the side away from the lamp so that when it is affixed to the container it allows water to flow past the lamp and then into the container. A sort of "trough" adapter, such that the treated water falls into the container, but UV light and reflected UV light still arrive INTO the container to additionally retreat water already deposited there.

In one embodiment, the water purification system 2400 may be initiated to cycle for different periods of time to accommodate containment chambers of different sizes. For instance, in one embodiment, the containment chamber might be a liquid bladder. In another embodiment, the containment chamber may be a personal water bottle. In yet another embodiment, the containment chamber may be a counter-top water purification jug configured to hold multiple liters of liquid. Of course, a plurality of different configurations are contemplated by the current disclosure.

Figure 25:
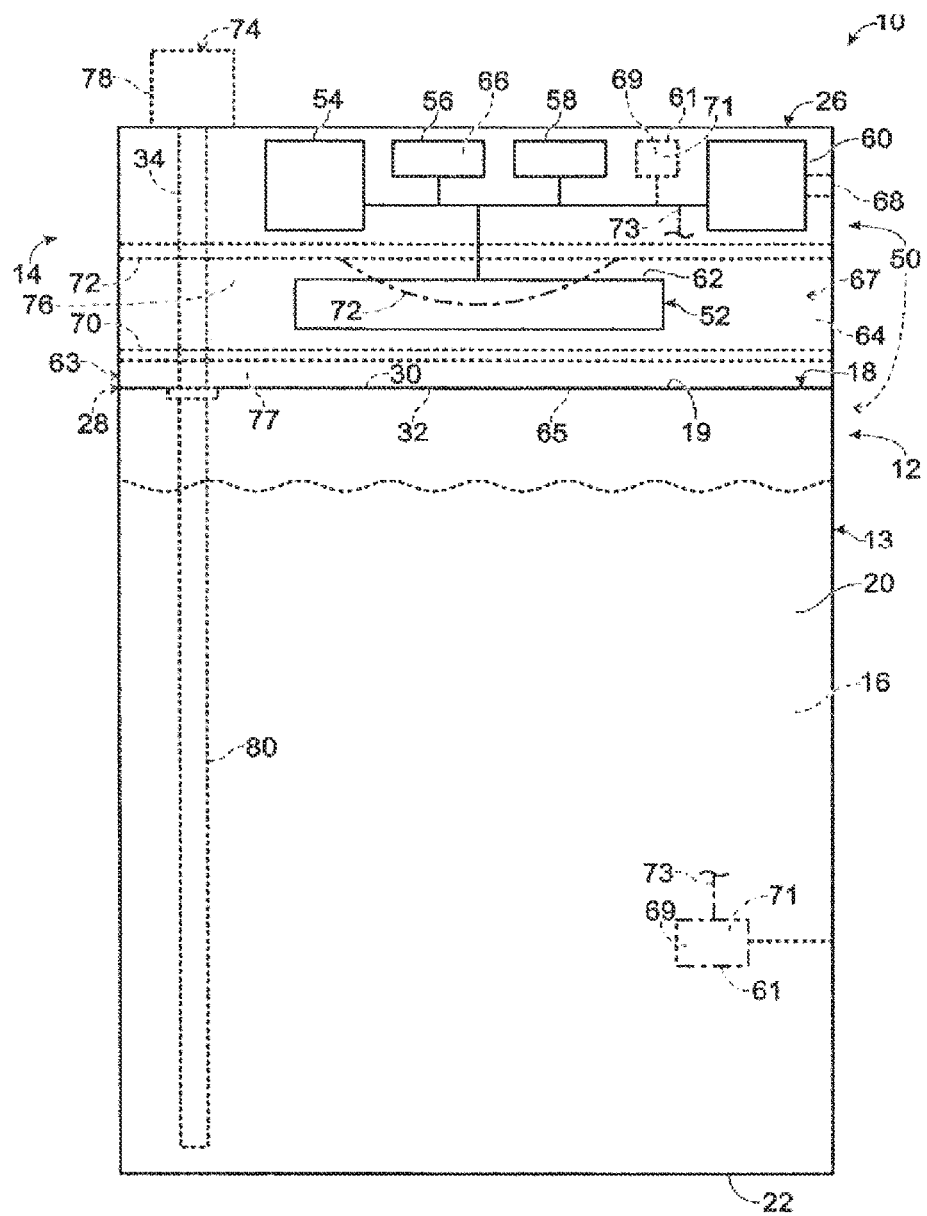
FIG. 25 is a schematic illustration of drink containers according to the present disclosure.

Drink containers according to the present disclosure are schematically illustrated in FIG. 25 and are indicated generally at 10. Drink containers 10 according to the present disclosure are designed to receive a volume of drink liquid (e.g., water), to selectively purify the volume of drink liquid, and to selectively dispense the volume of drink liquid to a user. Drink liquids other than water also may be received, purified, and dispensed by drink containers according to the present disclosure, including (but not limited to) sports drinks and other drink liquids, such as made by combining a concentrate or powder with water.

Drink containers 10 include a liquid container 12, a cap assembly 14 that includes at least a body 26, and a purification assembly 50 coupled to one of the liquid container and the body of the cap assembly. As discussed herein, the purification assembly is configured to selectively purify a volume of drink liquid, such as water, held in the liquid container, and thus enable safe consumption of the drink liquid by a user after purification of the drink liquid.

Liquid containers 12 according to the present disclosure are adapted to receive and hold or otherwise contain up to a predetermined volume of drink liquid 16 for selective purification and consumption by a user. Liquid containers 12 may be described as including a housing, or wall structure, 13 that defines the physical boundaries of the liquid container's internal compartment 20. Liquid containers 12 may include a neck 18 that defines an opening 19, through which drink liquid 16 may be selectively poured, or otherwise dispensed, into internal compartment 20 of the liquid container, and from which the drink liquid may be selectively dispensed from the internal compartment to a user, such as after the drink liquid is purified by purification assembly 50. It is within the scope of the present disclosure that neck 18 may (but is not required in all embodiments to) define the only opening through which drink liquid may be added to or removed from the liquid container. Additionally or alternatively, as discussed in more detail herein, it is within the scope of the present disclosure that when cap assembly 14 is operatively coupled to the liquid container, the selective dispensing of the drink liquid may be responsive to whether or not an optional mouthpiece assembly and/or valve of the cap assembly has been configured to a dispensing configuration, and in some embodiments, whether a mouthpiece portion of the mouthpiece assembly has been configured to an open configuration.

As used herein, "selective" and "selectively," when modifying an action, movement, configuration, or other activity of one or more components or characteristics of a drink container according to the present disclosure, means that the specified action, movement, configuration, or other activity is a direct or indirect result of user manipulation of an aspect of, or one or more components of, the drink container, and/or is a direct or indirect result of an action by another component of the drink container. Furthermore, as used herein, the terms "adapted" and "configured" mean that the corresponding component or element is designed and/or implemented to perform a particular function. Thus the use of the terms "adapted" and "configured" should not be construed to mean that the corresponding component or element is simply "capable" of performing or being modified or used to perform a given function, as opposed to being specifically designed or implemented to perform the function.

Liquid containers 12 may have any suitable shape and be formed from any suitable material or combination of materials to hold up to a predetermined volume of drink liquid. Illustrative, non-exclusive examples of suitable sizes, or capacities, of liquid containers 12 (i.e., volume of drink liquid 16 able to be received into a liquid container at one time) include 4 oz., 6 oz., 8 oz., 10 oz., 12 oz., 16 oz., 20 oz., 24 oz., 32 oz., 36 oz., 4-11 oz., 12-19 oz., 19-25 oz., 12-36 oz., 25-36 oz., and 10-70 oz. (with these illustrative examples referring to liquid (fluid) ounces of drink liquid that may be received at one time into an empty liquid container). It is within the scope of the present disclosure that liquid containers having different sizes, including sizes that are smaller than, larger than, or within the illustrative sizes and/or ranges presented above, may be used without departing from the scope of the present disclosure.

An illustrative, non-exclusive example of a material that may be used to construct liquid containers 12 according to the present disclosure includes the TRITAN™ copolyester polymer developed by Eastman Chemical Company. Other illustrative, non-exclusive examples of materials that may be suitable for construction of liquid containers according to the present disclosure include polycarbonate and metal, such as aluminum and stainless steel. Further illustrative, non-exclusive examples are disclosed in U.S. Pat. No. 7,533,783, the entire disclosure of which is hereby incorporated by reference. Liquid containers according to the present disclosure may be formed from a material, and/or may include an optional coating, that is not transmissive of ultraviolet (UV) light emitted by the purification assembly. In other words, liquid containers 12 may be constructed or otherwise formed or configured such that UV light emitted by purification assembly 50 is reflected by and/or otherwise does not pass through the walls, lower surface and/or other solid boundaries of the liquid container. As such, this emitted UV light may be contained within the internal compartment of the liquid container.

Liquid containers 12 may be (but are not required to be) rigid or at least semi-rigid, and may include a bottom surface 22 such that a liquid container may be generally self-supporting, or free-standing, when the bottom surface is placed upon a level surface. In such embodiments, drink containers 10 may be referred to as drink bottles. In some illustrative, non-exclusive embodiments, a liquid container 12 according to the present disclosure may be constructed of polyethylene or other material. Such an illustrative, non-exclusive example may permit opposing portions of the liquid container to be urged toward or even into contact with each other to reduce the volume of the liquid container and thereby aid in the dispensing of drink liquid 16 therefrom. In such an embodiment, the liquid container may be configured to return automatically to its prior configuration upon reduction of the pressure that was applied to urge the sides of the liquid container toward each other.

Cap assemblies 14 according to the present disclosure include at least a body 26, which additionally or alternatively may be referred to herein as a cap assembly body 26 and/or as a housing or cap assembly housing. Body 26 is adapted to be removably coupled to the neck 18 of a liquid container 12 to cover, or otherwise enclose, the opening 19 thereof, and therefore to permit selective and non-destructive removal and replacement (i.e., uncoupling and recoupling) of the cap assembly relative to the liquid container. For example, the cap assembly may be uncoupled from the liquid container to permit the liquid container to receive a volume of drink liquid, after which the cap assembly may be recoupled to the liquid container for purification of the drink liquid, as discussed herein, and for transport of drink container 10. Then, a user may selectively uncouple the cap assembly from the liquid container to selectively consume drink liquid from the liquid container.

Accordingly, drink containers according to the present disclosure may include a coupling assembly 28, with liquid container 12 including coupling structure 30 and cap assembly 14 including coupling structure 32. Coupling structures 30 and 32 are complimentarily configured to be selectively engaged to secure the liquid container and cap assembly together. In such an embodiment, neck 18 of the liquid container may include coupling structure 30, and body 26 of the cap assembly may include coupling structure 32. Coupling assembly 28 may be configured, or adapted, to provide a liquid-tight connection between the cap assembly and the liquid container. When such a connection is established between the cap assembly and the liquid container, the cap assembly may restrict, and in some embodiments prevent, liquid from being dispensed from the drink container. Illustrative, non-exclusive examples of coupling assembly 28 that may be incorporated into drink containers according to the present disclosure include (but are not limited to) threads, snap-fit arrangements, friction-fit arrangements, clasp arrangements, etc. Additionally or alternatively, the cap assembly may define a liquid passage 34, through which drink liquid may be selectively dispensed by a user when the cap assembly is coupled to the liquid container by the coupling assembly. Such embodiments are discussed in more detail herein.

As schematically illustrated in FIG. 25, drink containers 10 according to the present disclosure include a purification assembly 50 that is adapted to selectively purify drink liquid held in liquid container 12. In the illustrative, non-exclusive example schematically illustrated in FIG. 25, the purification assembly is illustrated as a component of, as embodied in, or as being coupled to, cap assembly 14. As schematically illustrated in dashed lines, it is also within the scope of the present disclosure, however, that the purification assembly 50, and/or component parts thereof, may additionally or alternatively be a component of, or be positioned on or within, or otherwise be partially or fully coupled to, the liquid container to form a liquid container assembly.

Purification assemblies 50 according to the present disclosure include an ultraviolet, or UV, light emitter 52, a controller 54, user controls 56, and a power supply 60. As schematically illustrated in FIG. 25, a purification assembly optionally may further include one or more of a user display 58, a detector 61, and/or an indicator 63, as discussed in more detail herein. FIG. 25 schematically illustrates the UV light emitter, the controller, the user controls, the power supply, and the optional user display and detector 61 as being operatively connected to each other; however, FIG. 25 is not interpreted as illustrating a wiring diagram associated with the purification assembly. Rather, the schematic illustration of purification assembly 50 graphically represents that the various components of the purification assembly may be connected to each other, may interact with each other, and/or otherwise collectively may form the purification assembly, or at least a portion thereof. For example, as an illustrative, non-exclusive example, the power supply may be adapted to power one or more of the UV light emitter, the controller, the user controls, the user display, and the detector; however, it is within the scope of the present disclosure that the power supply may be directly connected to the controller, which in turn controls and distributes the power to the various other components, for example.

UV light emitters 52 according to the present disclosure may take any suitable form and are configured to emit UV light of a wavelength that attacks the DNA of bacteria, viruses, and other microorganisms that may be found in water and/or that may be harmful if consumed by a person. Ultraviolet light having wavelengths in the range of 240-280 nanometers has proven effective, and UV light emitters 52 according to the present disclosure may be configured to emit UV light in the 240-280 nm range, including UV light having a wavelength of approximately 254 nm and UV light having a wavelength of approximately 260 nm. It is within the scope of the present disclosure that UV light emitters having different UV capabilities, including capabilities of emitting UV light with wavelengths that are shorter than, longer than, or within the illustrative wavelengths and/or range presented above, may be used without departing from the scope of the present disclosure. UV light having suitable wavelengths for the destruction of DNA of microorganisms may additionally or alternatively be referred to as UV light in the germicidal range, or spectrum, and/or UV light within, or at least overlapping, the ultraviolet C, or UV-C, range, or spectrum.

An illustrative, non-exclusive example of a UV light emitter 52 according to the present disclosure includes at least one UV bulb 62 adapted to emit UV light in the germicidal range. As schematically illustrated in FIG. 25, UV bulb 62 may be positioned within cap assembly 14 such that, when activated, the UV bulb emits light toward any drink liquid 16 held within internal compartment 20 of liquid container 12. The UV bulb may be positioned completely above the drink container, or at least above an uppermost level of drink liquid held by the drink container when the liquid container holds a predetermined volume of drink liquid, such as a predetermined capacity of the liquid container.

Additionally or alternatively, the UV bulb may be positioned, and the cap assembly and the liquid container may be shaped, or otherwise configured, so that an entire volume of drink liquid held within the drink container is within a line of sight of the UV bulb, for example, so that no portion of drink container 10 blocks, or otherwise creates a shadow on, any drink liquid held in the internal compartment of the liquid container.

Additionally or alternatively, a UV bulb according to the present disclosure may extend at least partially, or even completely, into the internal compartment of the drink liquid when the cap assembly is secured to the drink container. In some such embodiments, the UV bulb may contact the drink liquid when the cap assembly is secured to the drink container.

Additionally or alternatively, the UV bulb may be positioned and the cap assembly may be configured so that water is permitted to come into contact with one or more sides of the UV bulb when, for example, a user turns the drink container over and/or agitates the drink container with a volume of drink liquid held therein.

Additionally or alternatively, a cap assembly according to the present disclosure may include, or may be described as including, or defining, a recess 64 that generally faces the internal compartment of the liquid container and in which the UV bulb is at least partially, or even fully, positioned. Stated differently, when the cap assembly is coupled to the liquid container and the drink container is positioned in an upright orientation, in some embodiments, the UV bulb may not extend below, or beyond, a lower edge 65 of body 26 of the cap assembly, which may be described as being adjacent to the liquid container when the cap assembly is coupled to the liquid container. Additionally or alternatively, body 26 of the cap assembly may be described as including a lower portion 67 that defines the recess 64 and the lower edge 65 of the body.

Other configurations are also within the scope of the present disclosure, including, as mentioned, configurations in which the UV bulb is positioned on or within the liquid container.

In some embodiments, although not required, purification assemblies 50 according to the present disclosure may be configured so that UV bulb 62 may be selectively removed from the cap assembly so that a replacement UV bulb may be installed.

A UV bulb according to the present disclosure may be designed, engineered, or otherwise configured to be effective for use to purify drink liquid for a predetermined length of time, which also may be described as a predetermined length of actual use, predetermined number of purification cycles, etc., after which the effectiveness of the UV bulb in damaging the DNA of microorganisms may begin to decline and eventually may cease to be effective. Some UV bulbs according to the present disclosure may have characteristics that limit a number of cycles or a length, or period, of illumination time over its lifetime. Accordingly, controllers 54 according to the present disclosure may be configured, or programmed, to count, or otherwise track, the number of cycles and/or the total length of time a specific UV bulb has been activated. In such embodiments, the controller may control or restrict (or event prevent) the ability of a user to use the purification assembly after a predetermined number of cycles and/or length of time a UV bulb has been activated, such as based on an effectiveness of a UV light emitter, as discussed herein. As illustrative, non-exclusive examples, controller 54 may be configured to restrict activation of the UV light emitter upon the UV light emitter having been activated 1,000, 3,000, 5,000, 7,000, 9,000, 10,000, 12,000, 15,000, 17,000, or 20,000 cycles, between 5,000 and 20,000, between 7,500 and 12,500, or between 10,000 and 15,000 cycles, and/or at least 5,000, at least 7,000, at least 10,000, at least 12,000, at least 15,000, or at least 20,000 cycles. Additionally or alternatively, a controller may be configured to restrict activation of the UV light emitter after the emitter has been activated 200,000, 400,000, 600,000, 800,000, 1,000,000, 1,600,000, or 2,000,000 seconds, between 200,000 and 600,000, between 400,000 and 800,000, between 600,000 and 1,000,000 seconds, between 1,000,000 and 2,000,000 seconds, and/or at least 400,000, at least 800,000, at least 1,000,000, at least 1,600,000, or at least 2,000,000 seconds. Other numbers of cycles and lengths of time are also within the scope of the present disclosure, including numbers of cycles and lengths of time outside of or within the values and ranges enumerated herein.

Controller 54 may additionally or alternatively be configured to restrict, or prevent, use of the purification assembly (i.e., initiation of a purification cycle) if the battery or other power source contains insufficient power, or charge, to complete a purification cycle and/or if the battery or other power source has less than a threshold level of power, or charge. Other configurations are also within the scope of the present disclosure.

In some embodiments of purification assemblies 50 according to the present disclosure, the purification assembly (such as the UV emitter and/or UV bulb thereof) may be configured to only emit UV light (i.e., light in the ultraviolet spectrum) and/or to not emit light in the visible spectrum.

Alternatively, purification assemblies 50 (such as the UV light emitters and/or UV bulbs thereof) according to the present disclosure may be adapted to selectively emit light in the visible spectrum together with light in the germicidal spectrum. Accordingly, depending on the configuration of a drink container, cap assembly, and/or liquid container, a user may be able to visually observe when the UV light emitter is emitting UV light due to the simultaneous emission of visible light by the purification assembly (or UV light emitter or UV bulb thereof).

A controller 54 according to the present disclosure additionally or alternatively may configure a user display 58 when present, to indicate associated information. For example, the user display may be configured to display the number of cycles having occurred and/or remaining for a UV bulb. Additionally or alternatively, the user display may be configured to indicate that the UV bulb is no longer effective for its intended purpose of purifying drink liquid. Additionally or alternatively, the user display may indicate that the purification assembly is no longer operational and may not be used to purify drink liquid. Other configurations are also within the scope of the present disclosure.

An illustrative, non-exclusive example of a suitable UV bulb 62 is a GTL3 germicidal lamp. As an illustrative, non-exclusive example, a GTL3 germicidal lamp may be rated at 3 Watts, 0.3 Amps, and 10.5.+−0.2.5 Volts, with a UV output of 0.16 Watts and average life of approximately 3,000 hours. Other UV bulbs 62 also may be used without departing from the present disclosure, including cold cathode, mercury vapor, and fluorescent UV bulbs. As illustrative, non-exclusive examples, such bulbs may be configured to operate at approximately 3-4 Watts, 270 Volts, and/or 14 milli-Amps, although other operating parameters may be used and are within the scope of the present disclosure. Light emitting diodes (LEDs) that emit light in the germicidal spectrum are also within the scope of the term "UV bulb," as used herein, and UV light emitters according to the present disclosure may include one or more such UV LEDs. Examples of suitable LEDs include those developed by and available from Sensor Electronic Technology, Inc.

User controls 56 according to the present disclosure may take any suitable form, such that the controls are configured to permit a user to selectively activate the UV bulb and thereby purify a volume of water or other drink liquid contained in the drink container. For example, an illustrative, non-exclusive example of a user control that may be incorporated into purification assemblies 50 according to the present disclosure includes an on/off, or power, switch, or button, 66. For example, when button 66 is depressed, or otherwise activated by a user, the controller may be configured to activate the UV bulb for a predetermined period of time, such as a predetermined period of time that is effective for purifying a predetermined volume of drink liquid, such as based on the capacity of a particular liquid container 12 incorporated into a drink container 10 according to the present disclosure. The predetermined time that a UV bulb may be activated may be based at least in part on the time necessary to damage the DNA of a predetermined portion (e.g. >90%, >95%, >99%, >99.9%, and higher) of harmful microorganisms found in a typical volume of drink liquid to be purified. Illustrative, non-exclusive examples of predetermined times include times in the range of 45-120 seconds, including times of 45, 60, 75, 80, 90, 105, and 120 seconds. It is within the scope of the present disclosure that times greater than, less than, or within the illustrative range and times presented above, may be used without departing from the scope of the present disclosure.

Other controls also may be included, such as controls that are configured to enable a user to selectively navigate menus on user display 58, or to otherwise cause the user display to display information, such as to display the level of charge of power supply 60, the number of cycles having been performed by UV bulb 62, the number of cycles remaining for UV bulb 62, the ability to activate the UV bulb, etc. Other types and configurations of user controls also may be incorporated into purification assemblies and drink containers according to the present disclosure, and purification assemblies and drink containers are not limited to the specific user controls discussed herein.

As mentioned, user display 58 may be configured to display a variety of information to a user. For example, such information may include one or more of (i) the status of purification assembly 50 (e.g., on or off), (ii) the current state of charge of power supply 60, (iii) the current status of the power supply (e.g., whether the power supply is currently being charged), (iv) the time remaining until a full charge of the power supply (e.g., during recharging of a rechargeable power supply), (v) the number of cycles having been performed by UV bulb 62, (vi) the number of cycles remaining for UV bulb 62, (vii) the ability to activate the UV bulb, (viii) the time remaining during a purification cycle, (ix) the elapsed time of a purification cycle, (x) etc. An illustrative, non-exclusive example of a suitable user display for a purification assembly 50 according to the present disclosure is a liquid crystal display (LCD). As used herein a "cycle," such as a purification cycle and/or a cycle of a UV light emitter and/or a cycle of a UV bulb refers to a discrete, or defined, time period in which the purification assembly is actively emitting UV light in the germicidal spectrum.

Power supply 60 may take any suitable form and is configured to supply power at least to UV light emitter 52. Illustrative, non-exclusive examples of power supplies according to the present disclosure may include one or more of a battery or batteries, a rechargeable battery or batteries, and a solar cell or cells. Illustrative, non-exclusive examples of suitable rechargeable batteries include CR123 lithium batteries and ICR 17500 lithium-ion batteries.

When purification assembly 50 is configured to utilize rechargeable batteries, the purification assembly may additionally include a charging port 68 that is adapted to receive a charging probe, or plug, of a charging assembly. An illustrative, non-exclusive example of a suitable port may include a USB (universal serial bus) port, such as (but not limited to) a standard USB port, a mini-USB port, or a micro-USB port. When present, such a port may also be used to communicate with controller 54, for example, to program purification devices according to the present disclosure, to update software of purification devices according to the present disclosure, etc. When present, such a port also may be beneficial for recharging batteries of a power supply 60 from a portable electronic device, such as a laptop, phone, tablet, or similar device. That is, a recharging cord may be adapted to mate with port 68 on one end and may be adapted to mate with an appropriate port (e.g., a USB port) of an electronic device on the other end. Additionally or alternatively, a recharging cord may be adapted to mate with port 68 on one end and may be adapted to mate with an appropriate electrical socket on the other end, such as a standard North American 110 Volt socket or a standard European 220 Volt socket. Other configurations are also within the scope of the present disclosure. Additionally or alternatively, a recharging cord may include an international wall adapter that enables recharging of power supply 60 from more than one standard wall outlet.

Additionally or alternatively, optional charging port 68, when provided, together with controller 54 may permit and be configured for direct powering of the purification assembly, and thus the UV light emitter, from an external source, such as an electronic device, a solar panel, and/or an electric grid via a wall socket, without having to first recharge a battery or batteries. Additionally or alternatively, controller 54 may permit and be configured for simultaneous recharging of a battery or batteries and direct powering of the purification assembly from an external source.

As mentioned, a purification assembly according to the present disclosure may additionally or alternatively include an optional detector 61, such as a detector that is configured to detect one or more characteristics of a volume of drink liquid held in an associated liquid container. As an illustrative, non-exclusive example, a detector, when present, may detect, measure, and/or otherwise sense the UV-transmissivity of the drink liquid held in the liquid container. In such embodiments, the drink container may include one or more UV sensors 69 that are adapted to sense the UV-transmissivity of a volume of drink liquid held in the liquid container. Additionally or alternatively, an optional detector 61 according to the present disclosure may be adapted to detect, measure, and/or otherwise sense the germicidal content of the drink liquid held in the liquid container.

Accordingly, in embodiments that include a detector 61, including one or more of a UV sensor, the controller may be adapted (i) to select the length of time that the UV light emitter emits UV light, (ii) to selectively adjust the length of time that the UV light emitter emits UV light, (iii) to selectively increase the period of time that the UV light emitter emits UV light (iv) to select a power output of the UV light emitter, (v) to selectively adjust the power output of the UV light emitter, and/or (vi) to selectively increase the power output of the UV light emitter, based at least in part on the detected UV-transmissivity of the drink liquid and/or the germicidal content of the drink liquid.

In embodiments that include both a user display 58 and a detector 61, the user display may be configured to display information relating to the germicidal content and/or the UV-transmissivity of drink liquid held in the liquid container. In the context of germicidal content, this information may relate to the germicidal content of the drink liquid before and/or after the UV light emitter has emitted UV light in the germicidal spectrum to purify the drink liquid.

As schematically illustrated in FIG. 25, detectors 61 according to the present disclosure may be positioned within and/or may be coupled to the cap assembly 14. Additionally or alternatively, as schematically indicated in dash-dot lines in FIG. 25, a detector 61 may be positioned within and/or may be coupled to the liquid container 12. It is also within the scope of the present disclosure that a detector, while being coupled to, or otherwise a part of the cap assembly and purification assembly, may extend from the cap assembly into the liquid container (as schematically illustrated in dash-dot lines at 73) such as to a suitable position within the internal volume of the liquid container to effectively sense the UV-transmissivity and/or germicidal content of the drink liquid held in the liquid container.

Controllers 54 according to the present disclosure are configured to regulate or otherwise control operation of purification assemblies 50 of drink containers 10 according to the present disclosure. As discussed herein, this control may be implemented in one or more of a variety of suitable mechanisms or methods, such as to initiate operation, regulate operation, regulate duration, regulate intensity, discontinue operation, extend operation, and/or prevent operation of the purification assembly. A controller may take any suitable form and may include any suitable mechanism for actively controlling operation of, or aspects of, purification assemblies. For example, as an illustrative, non-exclusive example, a controller may include one or more of a computer chip and/or a circuit board with various components. A controller may include software and/or may be configured to be programmed with software. Additionally or alternatively, a controller may include storage media having executable instructions adapted to control the operation of, or aspects of, a purification assembly according to the present disclosure.

As discussed, controllers 54 according to the present disclosure may be configured to control such illustrative, non-exclusive aspects of purification assemblies 50 as (i) the distribution of power from the power supply to the various components of the purification assembly, (ii) the counting, or tracking, of the number of cycles a specific UV bulb has been activated, (iii) the counting, or tracking, of the length of time a specific UV bulb has been activated, (iv) the prevention of operation of the UV light emitter upon a predetermined number of cycles that a specific UV bulb has been activated and/or a predetermined length of time that a specific UV bulb has been activated, (v) the display of information on the user display, (vi) the charging of the power supply, (vii) the illumination of the UV bulb, (viii) the programming of the purification device, (ix) the updating of software associated with the purification device, (x) the detection of the UV-transmissivity of a volume of drink liquid held in the liquid container, (xi) the detection of the germicidal content of a volume of drink liquid held in the liquid container, (xii) etc. Other aspects of purification assemblies also may be controlled by controller 54, and controller 54 is not limited to being configured to perform the tasks enumerated herein.

Additionally or alternatively, a controller 54 according to the present disclosure may be adapted to restrict activation of the UV light emitter based at least in part on criteria associated with the effectiveness of the UV light emitter at a given moment in time, such as at a moment prior to a user initiating a purification cycle. As illustrative, non-exclusive examples, and as discussed herein, this criteria may include one or more of a state of charge of an associated power source, a power output of the UV light emitter, a germicidal content of the volume of drink liquid held in the liquid container, and/or a UV-transmissivity of the volume of drink liquid held in the liquid container. Other criteria associated with the effectiveness of the UV light emitter additionally or alternatively may be used by the controller to determine if restriction of the UV light emitter is appropriate in a given circumstance.

Still referring to FIG. 25, drink containers 10 according to the present disclosure may (but are not required to) include one or more of an optional UV-transmissive partition 70, an optional reflective surface 72, and an optional mouthpiece assembly 74.

UV-transmissive partition 70 additionally or alternatively may be referred to as a UV-transmissive shield and/or a UV-transmissive barrier 70. UV-transmissive partition 70, when provided, may be positioned between UV light emitter 52 and at least a substantial portion, if not all, of internal compartment 20 of liquid container 12 when cap assembly 14 is coupled to the liquid container. The UV-transmissive partition is constructed of a material that is configured to permit transmission of UV light in the germicidal range through the UV-transmissive partition. In some embodiments, the UV-transmissive partition is provided and configured to protect the UV light emitter from contact by a user or object. In some embodiments, the UV-transmissive partition is provided and configured to protect the UV light emitter from contact by drink liquid held in the liquid container.

In some embodiments, the UV-transmissive partition is constructed of a transparent, translucent, or otherwise UV-transmissive material through which UV light may pass, illustrative, non-exclusive examples of which include (but are not limited to quartz, soft glass, and polytetrafluoroethylene (PTFE, e.g., Teflon® material from E.I. du Pont De Nemours and Company). In some embodiments, the UV-transmissive partition may be mesh, or otherwise may include perforations, through which UV light in the germicidal spectrum may pass. Accordingly, in some such embodiments, the UV-transmissive partition may be constructed of a non-transparent material, a non-translucent material, and/or a material through which UV light may not pass, but which contains sufficient perforations or other apertures through which the UV light may pass.

Additionally or alternatively, the UV-transmissive partition may be configured to prevent drink liquid from the internal compartment of the liquid container from contacting the UV light emitter. Accordingly, the UV-transmissive partition may form a water-tight seal with body 26 of cap assembly 14. The cap assembly may additionally or alternatively include such illustrative, non-exclusive structure as a seal, an O-ring, an adhesive, etc. that forms a seal between the UV-transmissive partition and the body of the cap assembly.

Additionally or alternatively, the UV-transmissive partition may be configured to permit drink liquid from the internal compartment of the liquid container to contact the UV light emitter.

Additionally or alternatively, the UV-transmissive partition may be provided and configured to be concave, convex, or otherwise curved. This directing may include dispersing or concentrating the emitted UV light, such as depending upon such factors as the orientation of the UV bulb (or other UV light emitter), the UV purification assembly, the cap assembly, the liquid container, etc. In some embodiments, the UV-transmissive partition may be shaped, positioned, and/or otherwise optimized to direct UV light emitted by the UV light emitter to an entirety of the internal compartment of the liquid container, optionally including without any portion of the drink container blocking the UV light from illuminating all of any drink liquid held in the liquid container.

Optional reflective surface 72, when provided, may be positioned and configured to reflect light from the UV light emitter toward the internal compartment of the liquid container. Accordingly, when present, the optional reflective surface 72 may be positioned above the UV bulb, for example, in recess 64, when present, when the drink is container is in an upright orientation, as schematically illustrated in dashed lines in FIG. 25. Additionally or alternatively, the reflective surface may be positioned to reflect UV light, such as UV light that otherwise would not contact the drink liquid and/or certain portions thereof, and/or certain regions of the drink container or cap assembly, toward these portions of the drink liquid and/or these regions of the drink container or cap assembly. The reflective surface, when present, may be shaped to focus, spread, and/or otherwise direct the reflected UV light in an optimum configuration to ensure illumination of the entirety of the internal compartment of the liquid container in which drink liquid is held. Stated differently, the curvature of the reflective surface may be optimized to reflect light from the UV light emitter toward an entirety of the internal compartment. As illustrative, non-exclusive examples, the reflective surface may be parabolic, or at least generally parabolic, or arcuate. Additionally or alternatively, the reflective surface may be at least partially spherical. In FIG. 25, reflective surface 72 is optionally illustrated in a dash-dot line as having a convex configuration and extending at least partially into the region of the UV emitter 52, such as in an illustrative, non-exclusive example of a circular or semi-circular UV bulb 62; however, other configurations are also within the scope of the present disclosure, including (but not limited to) concave and flat configurations.

Reflective surface 72 may be defined by a layer of reflective material, such as (but not limited to) aluminum, stainless steel, biaxially-oriented polyethylene terephthalate (boPET, e.g., MYLAR® film), and other metals and non-metals. When provided, the reflective surface may have a greater reflectivity than the material from which body 26 of the cap assembly is constructed, and thereby reflect more of and absorb less of UV light in the germicidal range than if the reflective surface were not included.

As mentioned, some drink containers 10 according to the present disclosure may include a purification assembly 50 with an indicator 63, as schematically indicated in FIG. 25. Indicator 63, when present, may be adapted to indicate to a user when the UV light emitter is emitting UV light. The indicator may be adapted to emit a visual indication. For example, in some embodiments, the indicator may include a visible-light-transmissive portion 77 that is configured to become illuminated when the UV light emitter is emitting light in the visible spectrum (and into contact with portion 77. In some embodiments, the visible-light-transmissive portion may be described as a window. As mentioned, some UV light emitters and UV bulbs according to the present disclosure may be adapted to emit light in both of the germicidal spectrum and the visible spectrum. As illustrative, non-exclusive examples, one or more portions of the cap assembly and/or the liquid container may include a transparent portion, or window, and/or a translucent portion, or window. In examples that include a translucent portion, the translucent portion may be described as being illuminated, or as glowing, when the UV light emitter is emitting both UV light and visible light.

In some embodiments, the lower portion 67 of the cap assembly body 26 may include the indicator 63, or at least the visible-light-transmissive portion 77 of the indicator. For example, the visible-light-transmissive portion may define a ring around the cap assembly, and adjacent to opaque portions of the cap assembly, such that it becomes illuminated, or glows, when the UV light emitter is emitting light in the visible spectrum. Additionally or alternatively, the liquid container may include a visible-transmissive portion, such as a ring, adjacent to opaque portions of the liquid container, such that it becomes illuminated, or glows, when the UV light emitter is emitting light in the visible spectrum.

Optional mouthpiece assembly 74, when present, may provide structure for a user to selectively dispense drink liquid from the drink container without removal of the cap assembly. That is, in some embodiments, the selective dispensing of drink liquid from the drink container may be responsive to whether or not an optional mouthpiece assembly of the cap assembly has been configured to a dispensing configuration, and in some embodiments, whether a mouthpiece portion 78 of the mouthpiece assembly has been configured to an open configuration. When a mouthpiece assembly is provided, the cap assembly defines liquid passage 34, through which drink liquid may be selectively dispensed by a user. Illustrative, non-exclusive examples of suitable mouthpiece assemblies, and associated components, are disclosed in U.S. Pat. No. 7,533,783 and U.S. Patent Application Publication No. 2010/0181329, the disclosures of which are hereby incorporated by reference. In some embodiments, when an optional mouthpiece assembly 74 is present, an optional straw 80 may be provided and operatively coupled to the liquid passage 34 and extend into the liquid container, as schematically illustrated in FIG. 25. As indicated herein, it is also within the scope of the present disclosure that the cap assembly may not include a mouthpiece assembly, drink spout, or other mechanism for selectively dispensing drink liquid through the cap assembly.

Turning now to FIGS. 2-9, illustrative, non-exclusive examples of drink containers 10 according to the present disclosure and various component parts thereof are illustrated. Where appropriate, the reference numerals from the schematic illustration of FIG. 25 are used to designate corresponding parts of drink containers 10 according to the present disclosure; however, the examples of FIGS. 2-9 are non-exclusive and are not intended to limit the present disclosure to the illustrated embodiments. That is, neither drink containers 10, nor various component parts thereof, are limited to the specific embodiments disclosed and illustrated in FIGS. 2-9. Accordingly, drink containers 10 according to the present disclosure may incorporate any number of the various aspects, configurations, characteristics, properties, etc. illustrated in the embodiments of FIGS. 2-9, in the embodiments of FIG. 25, as well as variations thereof and without requiring the inclusion of all such aspects, configurations, characteristics, properties, etc. For the purpose of brevity, each previously discussed component part, or variant thereof, may not be discussed again with respect to FIGS. 2-9; however, it is within the scope of the present disclosure that the previously discussed features, materials, variants, etc. may be utilized with the illustrated embodiments of FIGS. 2-9. Similarly, it is also within the scope of the present disclosure that all of the component parts, and portions thereof, that are illustrated in FIGS. 2-9 are not required to all embodiments according to the present disclosure.

Figure 26:
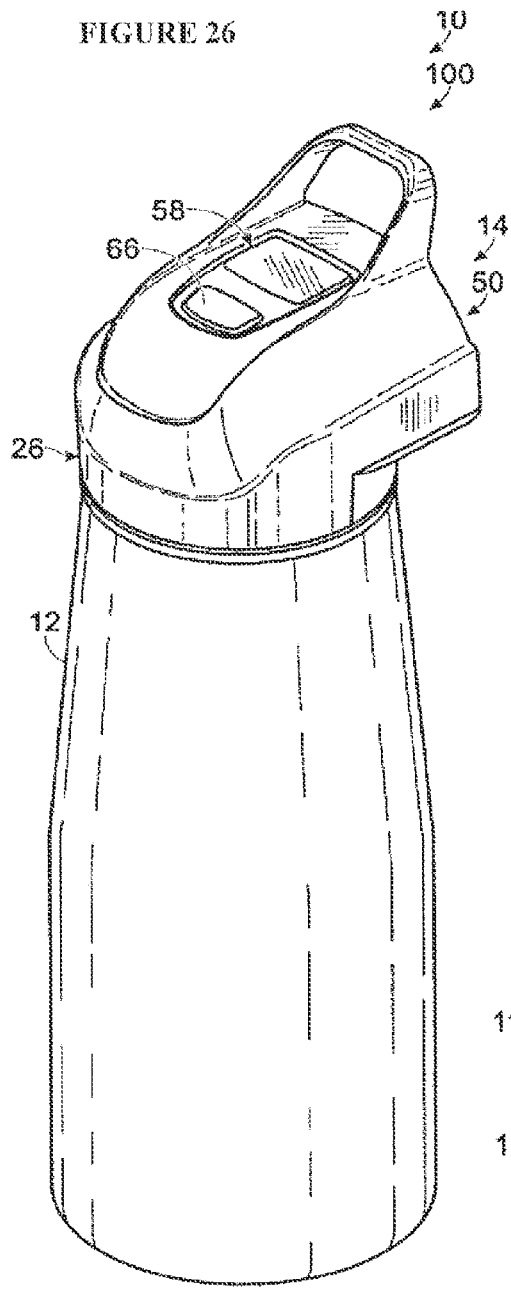
FIG. 26 is an isometric view of an illustrative, non-exclusive example of a drink container according to the present disclosure.

An illustrative, non-exclusive example of a drink container 10 according to the present disclosure is illustrated in FIG. 26 and is indicated generally at 100. The cap assembly 14 of drink container 100 is illustrated in more detail in FIGS. 3-6. Drink container 100 includes a liquid container 12 and a cap assembly 14 with a purification assembly 50. That is, the purification assembly of drink container 100 is a component of the cap assembly and may be described as being coupled to body 26 of the cap assembly. This coupled configuration may, but is not required to, include permanent or otherwise integral assembly between the purification assembly and the cap assembly.

Figure 27:
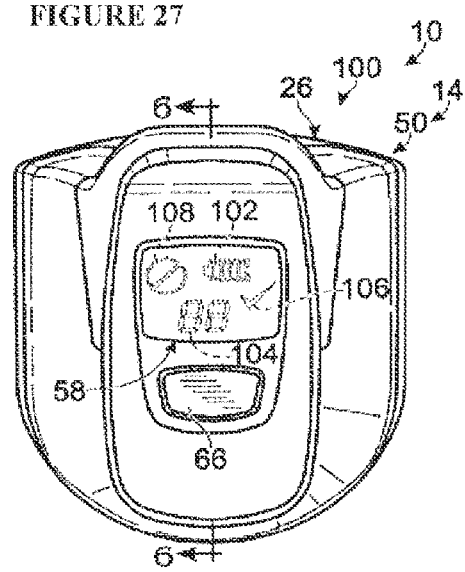
FIG. 27 is a top plan view of the cap assembly of the drink container of FIG. 26.

As illustrated in FIG. 27, the purification assembly of drink container 100 includes a user display 58 and an on/off button 66. As illustrated, the user display is configured to display such illustrative, non-exclusive information as battery charge 102, elapsed or remaining time 104 of a purification cycle, a check mark (or another symbol, text, or indicia) 106 to indicate to a user that a purification cycle is complete, and a crossed circle (or another symbol, text, or indicia) 108 to indicate to a user that a purification cycle did not properly purify the drink liquid or otherwise complete a purification cycle. As discussed herein, other information also may be displayed by a user display 58 according to the present disclosure.

Figure 28:
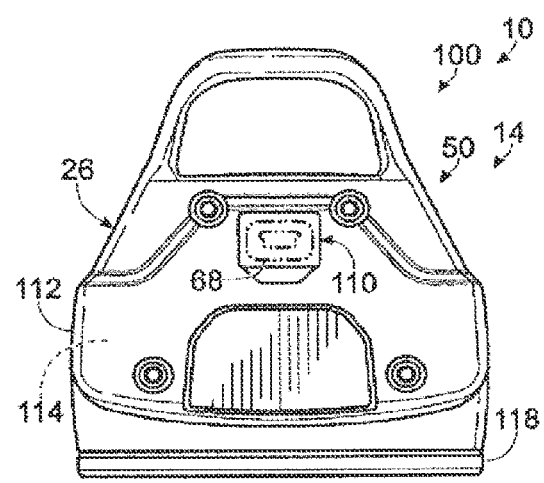
FIG. 28 is a rear elevation view of the cap assembly of the drink container of FIG. 26.
Figure 29:
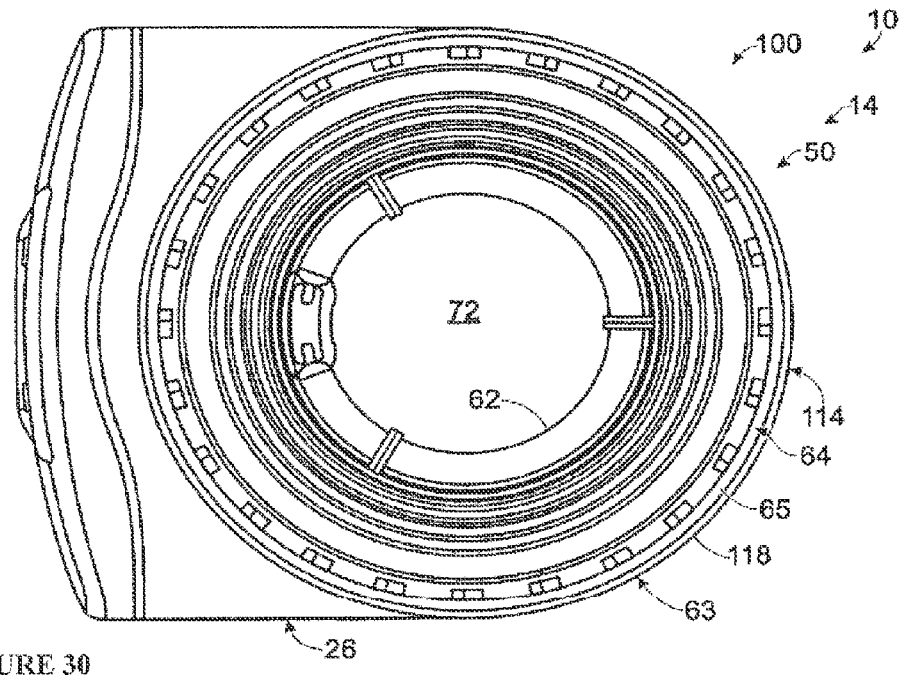
FIG. 29 is a bottom plan view of the cap assembly of the drink container of FIG. 26.

As seen in FIG. 28, the cap assembly of drink container 100 includes a removable protective cover 110 that is configured to selectively cover a charging port 68, in the form of a mini-USB port, such as when the charging port is not being used. Protective cover 110 thus may be described as being configured to restrict liquids from entering the charging port when the protective cover is in a closed configuration.

Turning now to FIGS. 5-6, it can be seen that drink container 100 is an example of a drink container 10 in which the body of the cap assembly defines a recess 64 with a UV bulb 62 positioned therein. The illustrative, non-exclusive example of the UV bulb is circular, and does not extend below, or beyond, the lower edge 65 of the body of the cap assembly. Other shapes and configurations of UV bulbs are also within the scope of the present disclosure, including (but not limited to) U-shaped bulbs.

Figure 30:
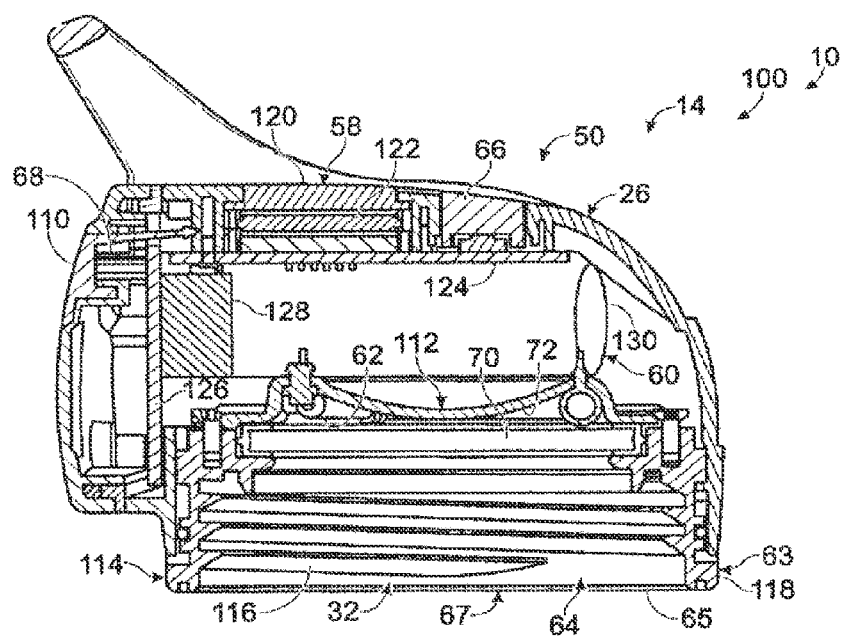
FIG. 30 is a side cross-sectional view of the cap assembly of the drink container of FIG. 26, taken along the line 6-6 in FIG. 27.
Figure 31:
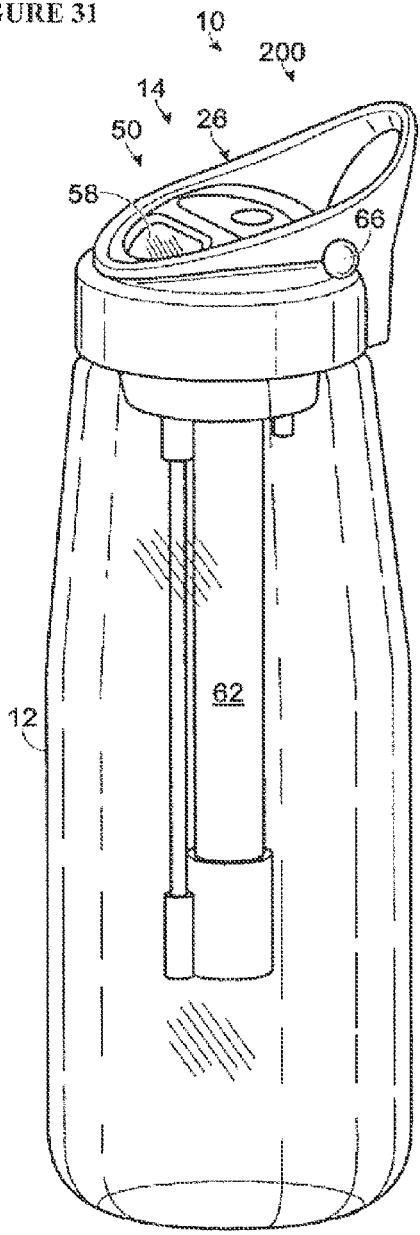
FIG. 31 is an isometric view of another illustrative, non-exclusive example of a drink container according to the present disclosure.

As perhaps best seen in FIG. 30, the cap assembly of drink container 100 includes a UV-transmissive partition 70 that is constructed of quartz and that forms a water-tight seal with the body of the cap assembly. Accordingly, the UV-transmissive partition restricts liquid from an associated liquid container from directly contacting the UV bulb.

The cap assembly of drink container 100 further includes a reflector 112 that defines optional reflective surface 72. Reflector 112 is constructed of aluminum and is configured in a partially spherical shape to direct light from the UV bulb to the internal compartment of the associated liquid container.

The cap assembly of drink container 100 further includes a threaded insert, or threaded portion, 114 that defines coupling structure 32. That is, the coupling structure 32 of the cap assembly of drink container 100 includes threads 116 that are configured to mate with corresponding threads of a liquid container. In the illustrative, non-exclusive example of drink container 100, the threaded insert is constructed of a translucent material and defines the lower portion 67 of the cap assembly's body, with a lower most portion 118 defining an outer ring of the cap assembly that is visible when the cap assembly is coupled to a liquid container. Accordingly, drink container 100 is an example of a drink container 10 that includes an indicator 63 that defines an illuminated, or glowing, ring around the cap assembly when the UV light emitter is emitting light in the visible spectrum. Other configurations of indicators, including indicators that do not define an illuminated ring are also within the scope of the present disclosure and are not limited to being defined by a threaded insert of a cap assembly.

Still referring to FIG. 30, the user display 58 of drink container 100 includes a transparent protective window 120 positioned over a liquid crystal display (LCD) 122. The purification assembly 50 of drink container 100 also includes a printed circuit board (PCB) 124 associated with the user display, and a PCB 126 associated with a transformer 128. Schematically illustrated in FIG. 30 is one of two batteries 130 that serve as the power source 60 of the purification assembly.

Another illustrative, non-exclusive example of a drink container 10 according to the present disclosure is illustrated in FIGS. 7-8, and is indicated generally at 200. Drink container 200 is another example of a drink container 10 in which the purification assembly is integral to the cap assembly 14 of the drink container; however, in contrast to drink container 100 illustrated in FIGS. 2-6, the purification assembly of drink container 200 includes a UV bulb 62 that extends into the internal compartment of the liquid container. Accordingly, the UV bulb of drink container 200 is positioned and configured to extend into the drink liquid that is held in the liquid container.

Figure 32:
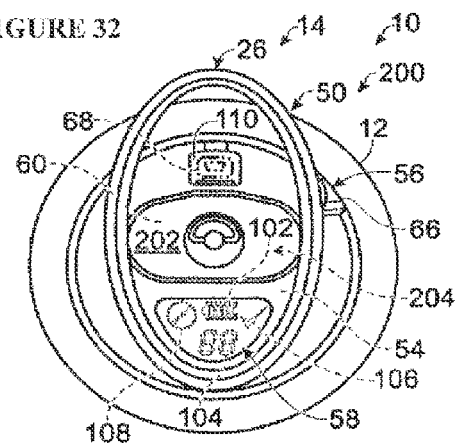
FIG. 32 is a top plan view of the drink container of FIG. 31.

As seen in FIG. 32, and similar to drink container 100, the cap assembly of drink container 200 includes a user display 58 and an on/off button 66. The user display of drink container 200 is configured to display information as to battery charge 102, elapsed or remaining time 104 of a purification cycle, a check mark 106 to indicate to a user that a purification cycle is complete, and a crossed circle 108 to indicate to a user that a purification cycle did not properly purify the drink liquid and/or complete a purification cycle. As discussed, other symbols, text, indicia, etc. may be used in place of the illustrative, non-exclusive indicators depicted in FIG. 32 (and elsewhere herein).

The cap assembly 14 of drink container 200 also includes a protective cover 110 that covers charging port 68 and that is configured to restrict liquids from entering the charging port when the protective cover is in a closed configuration. The cap assembly of drink container 200 also includes a water-tight cover 202 to a battery compartment 204, in which a power supply 60 in the form of rechargeable or other batteries is selectively positioned.

Figure 33:
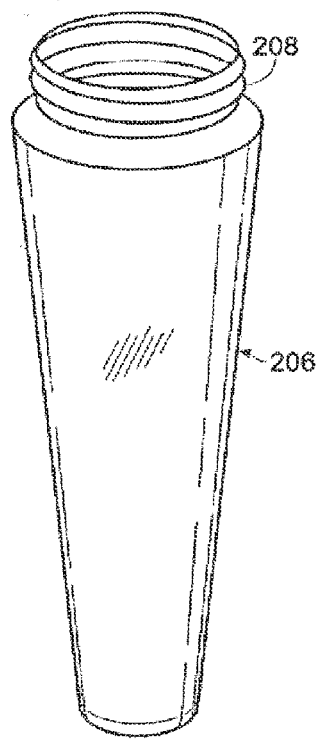
FIG. 33 is an isometric view of an optional protective sheath that may be used with the cap assembly of the drink container of FIG. 31.

FIG. 33 illustrates an optional protective sheath 206 that is adapted to mate with the cap assembly 14 of drink container 200 and to enclose the UV bulb therein. Accordingly, when the purification assembly of drink container 200 is not being used to purify a volume of drink liquid, such as after a user has purified a volume of drink liquid, cap assembly 14 of drink container 200 may be coupled to sheath 206 so that UV bulb 62 is housed, or stored therein. As illustrated, the protective sheath includes threads 208 that are adapted to mate with the corresponding threads of the cap assembly. Additionally, when an optional sheath is provided, an optional auxiliary cap also may be provided, such as to be coupled to the neck of the liquid container and thereby close the opening of the liquid container 12 when the cap assembly is being stored with the protective sheath. Such optional accessories may be used with other cap assemblies and/or drink containers according to the present disclosure, including drink containers 100 according to the present disclosure. In the context of a drink container 100, because the purification assembly includes a UV bulb that is positioned within a recess of the cap assembly's body and that does not extend beyond the lower edge of the cap assembly body, an optional protective sheath simply may be a threaded cover that is adapted to mate with the threads of the cap assembly of drink container 100. That is, an optional sheath for a drink container 100 according to the present disclosure may more appropriately be described as a cap assembly cover.

Figure 34:
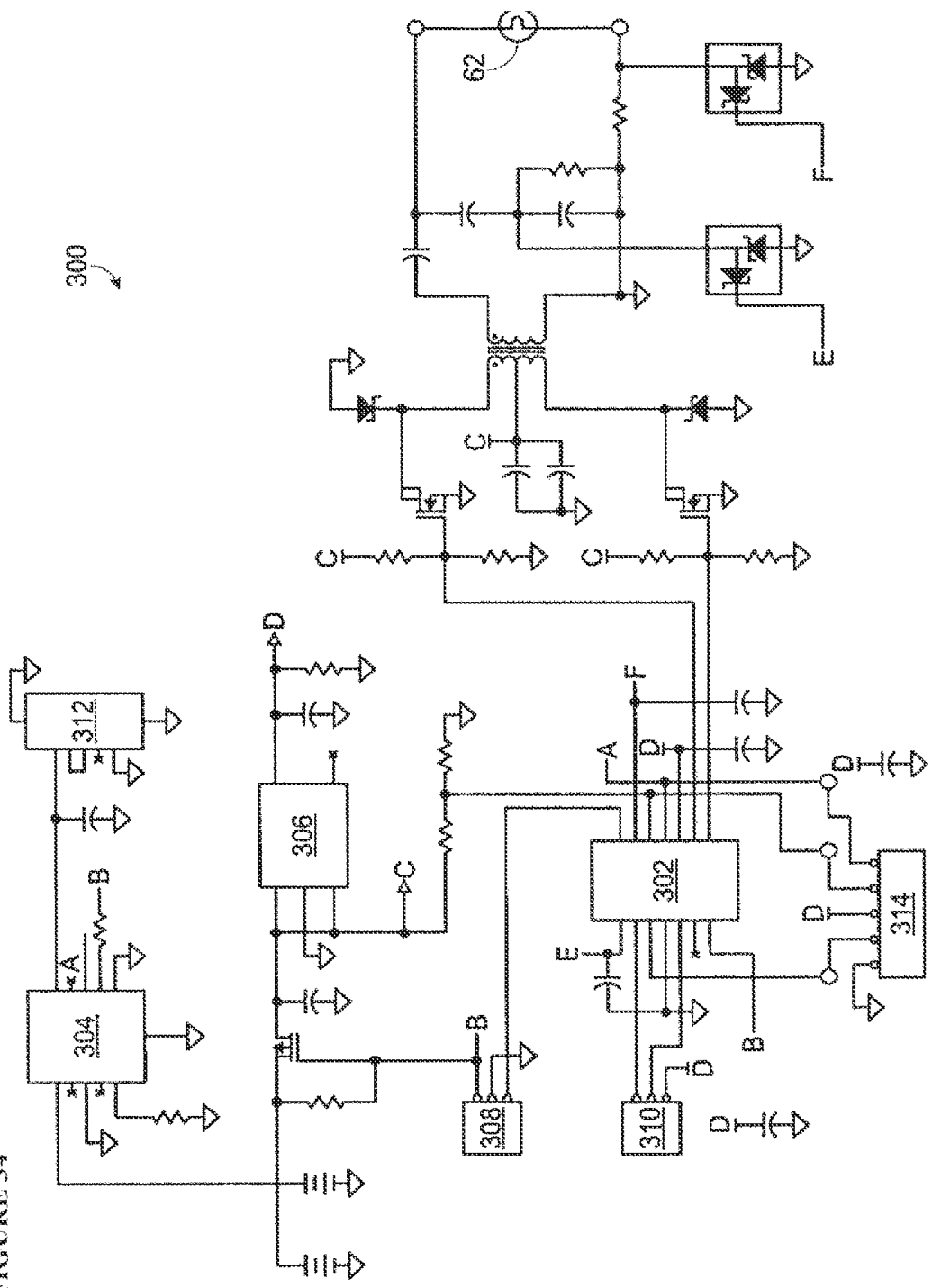
FIG. 34 is a wiring diagram schematically illustrating an illustrative, non-exclusive example of a purification assembly of a drink container according to the present disclosure.

Finally, turning to FIG. 34, an illustrative, non-exclusive example of a wiring diagram 300 that may be suitable for purification assemblies 50 and drink containers 10 according to the present disclosure is schematically presented. Diagram 300 may additionally or alternatively be described as a lamp driver circuit 300, such as corresponding to a UV bulb 62 according to the present disclosure.

As indicated, lamp driver circuit 300 includes a main microprocessor 302 for controlling operation of the purification assembly, a battery charging microprocessor 304 for controlling efficient and safe charging of the associated batteries, a low dropout voltage regulator 306 for maintaining stability of the circuit's voltage, connectors 308, 310 for interfacing with an associated user display 58 according to the present disclosure, a connector 312 associated with a charging port 68 according to the present disclosure, and a connector 314 for taking test measurements of the circuit. In the illustrated diagram, connections between respective positions in the circuit are schematically represented with letters A-F, respectively. Other lamp driver circuits are also within the scope of the present disclosure, and drink containers 10 and purification assemblies 50 according to the present disclosure are not limited to using the illustrated circuit of FIG. 34.

The following lettered paragraphs represent illustrative, non-exclusive ways of describing inventions according to the present disclosure.

A A drink container, comprising:
a liquid container having a neck with an opening and having an internal compartment sized to hold a volume of drink liquid;
a cap assembly removably coupled to the neck of the liquid container and adapted to restrict dispensing of drink liquid from the internal compartment of the liquid container through the opening, wherein the cap assembly includes a body, wherein the body includes a lower portion that defines a lower edge that is adjacent to the liquid container; and
a purification assembly coupled to one of the liquid container and the body of the cap assembly, wherein the purification assembly includes an ultraviolet (UV) light emitter adapted to selectively emit UV light in the germicidal spectrum for a predetermined period of time and to thereby purify a volume of drink liquid held in the internal compartment of the liquid container.

A1 The drink container of paragraph A, wherein the purification assembly is coupled to the body of the cap assembly.

A1.1 The drink container of paragraph A1, wherein the lower portion of the cap assembly defines a recess facing the internal compartment of the liquid container when the cap assembly is coupled to the neck of the liquid container, wherein the UV light emitter includes a UV bulb positioned within the recess.

A1.1.1 The drink container of paragraph A1.1, wherein the UV bulb does not extend into the drink liquid when a predetermined volume of drink liquid is held in the internal compartment of the liquid container, wherein the predetermined volume is equal to a predetermined liquid capacity of the liquid container.

A1.1.2 The drink container of any of paragraphs A1.1-A1.1.1, wherein the UV bulb does not extend beyond the lower edge of the body of the cap assembly.

A1.2 The drink container of any of paragraphs A1-A1.1.2, wherein the cap assembly further includes a reflective surface positioned to reflect light from the UV light emitter toward the internal compartment of the liquid container.

A1.2.1 The drink container of paragraph A1.2, wherein the reflective surface is configured to reflect light from the UV light emitter toward an entirety of the internal compartment of the liquid container.

A1.2.2 The drink container of any of paragraphs A1.2-A1.2.1, wherein the lower portion of the cap assembly defines a recess facing the internal compartment of the liquid container when the cap assembly is coupled to the neck of the liquid container, wherein the UV light emitter includes a UV bulb positioned within the recess, and wherein the UV bulb is positioned between the reflective surface and the lower edge.

A1.2.3 The drink container of any of paragraphs A1.2 A1.2.2, wherein a curvature of the reflective surface is optimized to reflect light from the UV light emitter toward an entirety of the internal compartment.

A1.2.4 The drink container of any of paragraphs A1.2-A1.2.2, wherein the reflective surface is at least one of partially parabolic and partially spherical.

A1.3 The drink container of any of paragraphs A1-A1.2.4, wherein the cap assembly further includes a UV-transmissive partition positioned between the UV light emitter and at least a substantial portion of the internal compartment of the liquid container when the cap assembly is coupled to the neck of the liquid container.

A1.3.1 The drink container of paragraph A1.3, wherein the UV-transmissive partition includes one or more of quartz, soft glass, polytetrafluoroethylene, and/or other UV-transmissive material.

A1.3.2 The drink container of any of paragraphs A1.3-A1.3.1, wherein the UV-transmissive partition forms a watertight seal with the body of the cap assembly and prevents drink liquid from the internal compartment of the liquid container from contacting the UV light emitter.

A1.3.3 The drink container of any of paragraphs A1.3 A1.3.2, wherein the UV-transmissive partition is concave, convex, or otherwise curved.

A1.3.4 The drink container of any of paragraphs A1.3 A1.3.2, wherein the UV-transmissive partition is concave, convex, or otherwise curved, and UV light emitted by the UV light emitter may propagate to an entirety of the internal compartment of the liquid container without any portion of the drink container blocking the UV light from illuminating all of any drink liquid held in the internal compartment.

A1.3.5 The drink container of any of paragraphs A1.3 A1.3.2, wherein the UV-transmissive partition is configured to direct, diffuse, and/or spread UV light emitted by the UV light emitter to an entirety of the internal compartment of the liquid container.

A1.3.6 The drink container of any of paragraphs A1.3-A1.3.2, wherein the UV-transmissive partition is configured to direct, diffuse, and/or spread UV light emitted by the UV light emitter to an entirety of the internal compartment of the liquid container without any portion of the drink container blocking the UV light from illuminating all of any drink liquid held in the internal compartment.

A1.3.7 The drink container of any of paragraphs A1.3-A1.3.2, wherein the UV-transmissive partition is optimized to direct UV light emitted by the UV light emitter to an entirety of the internal compartment of the liquid container.

A1.3.8 The drink container of any of paragraphs A1.3-A1.3.2, wherein the UV-transmissive partition is optimized to direct UV light emitted by the UV light emitter to an entirety of the internal compartment of the liquid container without any portion of the drink container blocking the UV light from illuminating all of any drink liquid held in the internal compartment.

A1.3.9 The drink container of any of paragraphs A1.3-A1.3.8, wherein the UV-transmissive partition is configured to permit drink liquid from the internal compartment of the liquid container to contact the UV light emitter.

A2 The drink container of any of paragraphs A-A1.3.9, wherein the drink container is configured such that the UV light emitter selectively emits the UV light to the entirety of the internal compartment of the liquid container.

A3 The drink container of any of paragraphs A-A2, wherein the drink container is configured such that the UV light emitter selectively emits the UV light to the entirety of the internal compartment of the liquid container without any portion of the drink container blocking the UV light from illuminating all of any drink liquid held in the internal compartment.

A4 The drink container of any of paragraphs A-A2, further comprising:

an indicator adapted to indicate to a user when the UV light emitter is emitting UV light.

A4.1 The drink container of paragraph A4, wherein the UV light emitter is further adapted to selectively emit light in the visible spectrum for the predetermined period of time, and wherein the indicator includes a visible-light-transmissive portion that is configured to become illuminated when the UV light emitter is emitting light in the visible spectrum.

A4.1.1 The drink container of paragraph A4.1, wherein the visible-light-transmissive portion includes a transparent portion.

A4.1.2 The drink container of paragraph A4.1.1, wherein the visible-light-transmissive portion includes a translucent portion.

A4.2 The drink container of any of paragraphs A4-A4.1.2, wherein the liquid container includes the indicator.

A4.3 The drink container of any of paragraphs A4.1.2, wherein the cap assembly includes the indicator.

A4.3.1 The drink container of paragraph A4.3, wherein the lower portion of the body of the cap assembly includes the indicator, wherein at least a portion of the lower portion defines an illuminated ring around the cap assembly when the UV light emitter is emitting light in the visible spectrum.

A4.3.1.1 The drink container of paragraph A4.3.1, wherein the cap assembly includes a threaded insert that includes threads adapted to mate with corresponding threads of the liquid container, wherein the threaded insert includes the lower portion of the body of the cap assembly.

A5 The drink container of any of paragraphs A-A4.3.1.1, wherein the purification assembly includes a controller adapted to control operation of the UV light emitter.

A5.1 The drink container of paragraph A5, wherein the controller is adapted to track the number of cycles that the UV light emitter has been selectively activated.

A5.1.1 The drink container of paragraph A5.1, wherein the controller is further adapted to restrict activation of the UV light emitter upon the UV light emitter having been activated a predetermined number of cycles.

A5.1.1.1 The drink container of paragraph A5.1.1, wherein the predetermined number of cycles is at least 5,000 cycles.

A5.1.1.2 The drink container of paragraph A5.1.1, wherein the predetermined number of cycles is at least 10,000 cycles.

A5.1.1.3 The drink container of paragraph A5.1.1, wherein the predetermined number of cycles is at least 15,000 cycles.

A5.1.1.4 The drink container of paragraph A5.1.1, wherein the predetermined number of cycles is at least 20,000 cycles.

A5.2 The drink container of any of paragraphs A5-A5.1.1.4, wherein the controller is adapted to track the length of time that the UV light emitter has emitted UV light.

A5.2.1 The drink container of paragraph A5.2, wherein the controller is further adapted to restrict activation of the UV light emitter upon the UV light emitter having emitted UV light for a predetermined length of time.

A5.2.1.1 The drink container of paragraph A5.2.1, wherein the predetermined length of time is at least 400,000 seconds.

A5.2.1.2 The drink container of paragraph A5.2.1, wherein the predetermined length of time is at least 800,000 seconds.

A5.2.1.3 The drink container of paragraph A5.2.1, wherein the predetermined length of time is at least 1,600,000 seconds.

A5.3 The drink container of any of paragraphs A5-A5.2.1.3, wherein the controller is adapted to restrict activation of the UV light emitter based at least in part on criteria associated with the effectiveness of the UV light emitter at a given moment in time.

A5.3.1 The drink container of paragraph A5.3, wherein the criteria includes one or more of a state of charge of an associated power source, a power output of the UV light emitter, a germicidal content of the volume of drink liquid held in the internal compartment of the liquid container, and a UV-transmissivity of the volume of drink liquid held in the internal compartment of the liquid container.

A5.4 The drink container of any of paragraphs A5-A5.3.1, wherein the purification assembly includes a power source.

A5.4.1 The drink container of paragraph A5.4, wherein the controller is adapted determine a potential output of the power source and to restrict activation of the UV light emitter if the power source does not have sufficient output to activate the UV light emitter for the predetermined period of time to purify the volume of drink liquid held in the internal compartment of the liquid container.

A5.4.2 The drink container of any of paragraphs A5.4-A5.4.1, wherein the power source includes one or more rechargeable batteries.

A6 The drink container of any of paragraphs A-A5.4.2, wherein the purification assembly includes a user control positioned to receive input from a user of the drink container and configured to permit a user to selectively activate the UV light emitter.

A7 The drink container of any of paragraphs A-A6, wherein the purification assembly includes a user display positioned to display information to a user of the drink container.

A8 The drink container of any of paragraphs A-A7, wherein the purification assembly includes one or more rechargeable batteries and a charging port adapted to receive a charging cord.

A8.1 The drink container of paragraph A8, wherein the charging port includes a USB port.

A9 The drink container of any of paragraphs A-A8.1, wherein the purification assembly is adapted to measure and/or detect a UV-transmissivity of the volume of drink liquid held in the internal compartment of the liquid container.

A9.1 The drink container of paragraph A9, wherein the drink container further comprises:

a UV sensor adapted to sense the UV-transmissivity of the volume of drink liquid held in the internal compartment of the liquid container.

A9.1.1 The drink container of paragraph A9.1, wherein the UV sensor is positioned within the liquid container.

A9.1.2 The drink container of any of paragraphs A9.1-A9.1.1, wherein the UV sensor is coupled to the cap assembly.

A9.1.3 The drink container of any of paragraphs A9.1-A9.1.1, wherein the UV sensor is coupled to the liquid container.

A9.2 The drink container of any of paragraphs A9-A9.1.3, wherein the purification assembly is further adapted to select the predetermined period of time based at least in part on the UV-transmissivity of the volume of drink liquid held in the internal compartment of the liquid container.

A9.3 The drink container of any of paragraphs A9-A9.2, wherein the purification assembly is further adapted to select a power output of the UV light emitter based at least in part on the UV-transmissivity of the volume of drink liquid held in the internal compartment of the liquid container.

A9.4 The drink container of any of paragraphs A9-A9.3, wherein the purification assembly is further adapted to selectively adjust the power output of the UV light emitter based at least in part on the UV-transmissivity of the volume of drink liquid held in the internal compartment of the liquid container.

A9.5 The drink container of any of paragraphs A9-A9.4, wherein the purification assembly is further adapted to selectively increase the power output of the UV light emitter based at least in part on the UV-transmissivity of the volume of drink liquid held in the internal compartment of the liquid container.

A9.6 The drink container of any of paragraphs A9-A9.5, wherein the purification assembly is further adapted to selectively adjust the predetermined period of time based at least in part on the UV-transmissivity of the volume of drink liquid held in the internal compartment of the liquid container.

A9.7 The drink container of any of paragraphs A9-A9.6, wherein the purification assembly is further adapted to selectively increase the predetermined period of time based at least in part on the UV-transmissivity of the volume of drink liquid held in the internal compartment of the liquid container.

A10 The drink container of any of paragraphs A-A9.7, wherein the purification assembly is adapted to measure and/or detect a germicidal content of the volume of drink liquid held in the internal compartment of the liquid container.

A10.1 The drink container of paragraph A10, wherein the drink container further comprises: a sensor adapted to sense the germicidal content of the volume of drink liquid held in the internal compartment of the liquid container.

A10.1.1 The drink container of paragraph A10.1, wherein the sensor is positioned within the liquid container.

A10.1.2 The drink container of any of paragraphs A10.1-A10.1.1, wherein the sensor is coupled to the cap assembly.

A10.1.3 The drink container of any of paragraphs A10.1-A10.1.1, wherein the sensor is coupled to liquid container.

A10.2 The drink container of any of paragraphs A10-A10.1.3, wherein the purification assembly is further adapted to select the predetermined period of time based at least in part on the germicidal content of the volume of drink liquid held in the internal compartment of the liquid container.

A10.3 The drink container of any of paragraphs A10-A10.2, wherein the purification assembly is further adapted to select a power output of the UV light emitter based at least in part on the germicidal content of the volume of drink liquid held in the internal compartment of the liquid container.

A10.4 The drink container of any of paragraphs A10-A10.3, wherein the purification assembly is further adapted to selectively adjust the power output of the UV light emitter based at least in part on the germicidal content of the volume of drink liquid held in the internal compartment of the liquid container.

A10.5 The drink container of any of paragraphs A10-A10.4, wherein the purification assembly is further adapted to selectively increase the power output of the UV light emitter based at least in part on the germicidal content of the volume of drink liquid held in the internal compartment of the liquid container.

A10.6 The drink container of any of paragraphs A10-A10.5, wherein the purification assembly is further adapted to selectively adjust the predetermined period of time based at least in part on the germicidal content of the volume of drink liquid held in the internal compartment of the liquid container.

A10.7 The drink container of any of paragraphs A10-A10.6, wherein the purification assembly is further adapted to selectively increase the predetermined period of time based at least in part on the germicidal content of the volume of drink liquid held in the internal compartment of the liquid container.

A10.8 The drink container of any of paragraphs A10-A10.7, wherein the purification assembly includes a user display positioned to display information to a user of the drink container, wherein the information relates to the germicidal content of the drink liquid held in the internal compartment of the liquid container before and/or after the UV light emitter has emitted UV light in the germicidal spectrum for the predetermined period of time.

A11 The drink container of any of paragraphs A-A10.8, wherein the cap assembly defines a liquid passage, through which drink liquid may be selectively dispensed from the liquid container.

A11.1 The drink container of paragraph A11, wherein the cap assembly further includes a mouthpiece in fluid communication with the liquid passage, wherein the mouthpiece is configured to selectively dispense the drink liquid without removal of the cap assembly from the liquid container.

A11.1.1 The drink container of paragraph A11.1, wherein the mouthpiece includes a bite-actuated mouthpiece.

B A drink container, comprising:
a liquid container having a neck with an opening and having an internal compartment sized to hold a volume of drink liquid;
a cap assembly removably coupled to the neck of the liquid container and adapted to restrict dispensing of drink liquid from the internal compartment of the liquid container, wherein the cap assembly includes a body; and
means for purifying drink liquid held in the internal compartment of the liquid container.

B1 The drink container of paragraph B, wherein the body defines a recess facing the internal compartment of the liquid container when the cap assembly is coupled to the liquid container, wherein the means for purifying includes a UV bulb positioned within the recess, wherein the UV bulb is adapted to selectively emit UV light in the germicidal spectrum for a predetermined period of time and to thereby purify a volume of drink liquid held in the internal compartment of the liquid container.

B2 The drink container of any of paragraphs B-B1, wherein the means for purifying includes the purification assembly of any of paragraphs A-A10.8.

B3 The drink container of any of paragraphs B-B2, further comprising any of the structure of any of paragraphs A-A11.1.1.

C A cap assembly, comprising:
a body configured to be removably coupled to a liquid container and adapted to restrict dispensing of drink liquid from an internal compartment of the liquid container; and
a purification assembly as described in any of paragraphs A-B3.

D A method of purifying a volume of drink liquid held in the drink container of any of paragraphs A-C.

In the event that any of the references that are incorporated by reference herein define a term in a manner or are otherwise inconsistent with either the non-incorporated disclosure of the present application or with any of the other incorporated references, the non-incorporated disclosure of the present application shall control and the term or terms as used therein only control with respect to the patent document in which the term or terms are defined.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

INDUSTRIAL APPLICABILITY

The drink containers of the present disclosure are applicable to the hydration fields, and are specifically applicable to portable drink containers from which users may selectively drink potable drink liquid.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A drink container, comprising:
a liquid container having a neck with an opening and having an internal compartment sized to hold a volume of drink liquid;
a cover assembly arranged in proximity to the neck of the liquid container, wherein the cover assembly includes a body, wherein the body includes a lower portion that defines a lower edge that is adjacent to the liquid container, and wherein the lower portion defines a recess facing the internal compartment of the liquid container when the cover assembly is in proximity to the neck of the liquid container;
a purification assembly arranged in relation to the body of the cover assembly, wherein the purification assembly includes an ultraviolet (UV) bulb positioned within the recess, wherein the UV bulb is adapted to selectively emit UV light in the germicidal spectrum for a predetermined period of time and to thereby purify a volume of drink liquid held in the internal compartment of the liquid container, the UV bulb having an at least partially circular configuration; and
wherein the cover assembly further includes a convex spherical reflector positioned to reflect light from the UV bulb toward the internal compartment of the liquid container, the UV bulb being positioned around the perimeter of the spherical reflector, a portion of the spherical reflector extending into a region within the circular configuration of the UV bulb and wherein the spherical reflector is configured to reflect light from the UV bulb toward an entirety of the internal compartment of the liquid container.

2. The drink container of claim 1, wherein the UV bulb does not extend into the drink liquid when a predetermined volume of drink liquid is held in the internal compartment of the liquid container, wherein the predetermined volume is equal to a predetermined liquid capacity of the liquid container.

3. The drink container of claim 1, wherein the UV bulb does not extend beyond the lower edge of the body of the cover assembly.

4. The drink container of claim 1, wherein the cover assembly further includes a UV-transmissive partition positioned between the UV bulb and at least a substantial portion of the internal compartment of the liquid container when the cover assembly is arranged in proximity to the neck of the liquid container.

5. The drink container of claim 2, wherein the UV bulb is arranged in relation to the cap assembly to be optionally immersed in the predetermined volume of drink liquid if the liquid container is inclined or is inverted.

6. The drink container of claim 1, wherein the purification assembly is configured to track at least one of (a) a total number of purification cycles, and (b) the total duration of light emission from the UV bulb, and further wherein the purification assembly is configured to prevent utilization of the UV bulb beyond a predetermined lifespan related to at least one of (a) and (b).

7. The drink container of claim 1, wherein the drink container is configured such that the UV bulb selectively emits UV light to the entirety of the internal compartment of the liquid container.

8. The drink container of claim 1, wherein the drink container is configured such that the UV bulb selectively emits UV light to the entirety of the internal compartment of the liquid container without any portion of the drink container blocking the UV light from illuminating all of any drink liquid held in the internal compartment.

9. The drink container of claim 1, wherein the purification assembly is configured to detect a power level of a power source prior to initiating a purification cycle, and compare the power level with a minimum threshold to complete a purification cycle.

10. The drink container of claim 1, wherein the purification assembly is configured to determine an output level of the UV bulb and prevent utilization of the UV bulb if the output level is below a predetermined threshold.

11. The drink container of claim 1, wherein the cover assembly is configured to support a plurality of user-selectable UV emission values to facilitate the purification of different volumes of liquid drink and/or different liquid drink transmissivities.

12. The drink container of claim 1, wherein the purification assembly includes a controller adapted to track the number of cycles that the UV bulb has been selectively activated, and wherein the controller is further adapted to restrict activation of the UV bulb upon the UV bulb having been activated a predetermined number of cycles.

13. The drink container of claim 1, wherein the purification assembly includes a controller adapted to restrict activation of the UV bulb based at least in part on criteria associated with the effectiveness of the UV bulb at a given moment in time.

14. The drink container of claim 13, wherein the criteria includes one or more of a state of charge of an associated power source, a power output of the UV bulb, and a UV-transmissivity of the volume of drink liquid held in the internal compartment of the liquid container.

15. The drink container of claim 1, wherein the purification assembly includes a power source and a controller adapted determine a potential output of the power source and to restrict activation of the UV bulb if the power source does not have sufficient output to activate the UV bulb for the predetermined period of time to purify the volume of drink liquid held in the internal compartment of the liquid container.

16. The drink container of claim 1, wherein the purification assembly is adapted to detect a UV-transmissivity of the volume of drink liquid held in the internal compartment of the liquid container and based at least in part on the UV-transmissivity to select at least one of (i) the predetermined period of time and (ii) a power output of the UV bulb.

17. The drink container of claim 1, wherein the purification assembly is configured to support a plurality of user-selectable UV emission ranges based on a volume of drink liquid in the liquid container.

18. The drink container of claim 1, wherein the purification assembly is adapted to detect at least one of (a) a UV-transmissivity of a drink liquid and (b) a volume of a drink liquid, and wherein the purification assembly is configured to determine a duration of UV emission and a power level of UV emission based on (a) or (b).

19. The drink container of claim 1, wherein the cover assembly comprises a translucent portion configured to allow a user visually confirm operation of the purification assembly, and further wherein the cover assembly comprises a lamp configured to emit visible light including, but not limited to, fluorescent light.

20. A drink container, comprising:
a liquid container having a neck with an opening and having an internal compartment sized to hold a volume of drink liquid;
a cover assembly arranged in proximity to the neck of the liquid container, wherein the cover assembly includes a body, wherein the body includes a lower portion that defines a lower edge that is adjacent to the liquid container;
a purification assembly arranged in proximity to one of the liquid container and the body of the cover assembly, wherein the purification assembly includes an ultraviolet (UV) light emitter adapted to selectively emit UV light in the germicidal spectrum and light in the visible spectrum for a predetermined period of time and to thereby purify a volume of drink liquid held in the internal compartment of the liquid container, the UV light emitter having an at least partially circular configuration; and further wherein the cover assembly comprises a lamp configured to emit visible light including, but not limited to, fluorescent light when the UV light emitter is in operation; and
wherein the cover assembly further includes a convex spherical reflector positioned to reflect light from the UV light emitter toward the internal compartment of the liquid container, the UV light emitter being positioned around the perimeter of the spherical reflector, a portion of the spherical reflector extending into a region within the circular configuration of the UV light emitter, and wherein the spherical reflector is configured to reflect light from the UV light emitter toward an entirety of the internal compartment of the liquid container.

21. The drink container of claim 20, wherein the drink container is configured to accept an external power source to recharge an integrated power source connected to the purification assembly.

22. The drink container of claim 20, wherein the drink container is configured to accept an external power source to provide power to the purification assembly.

23. A drink container, comprising:
a liquid container having a neck with an opening and having an internal compartment sized to hold a volume of drink liquid;
a cover assembly arranged in proximity to the neck of the liquid container, wherein the cover assembly includes a body that defines a recess facing the internal compartment of the liquid container when the cover assembly is in proximity to the liquid container; and
means for purifying drink liquid held in the internal compartment of the liquid container, wherein the means for purifying includes a UV bulb positioned within the recess, wherein the UV bulb is adapted to selectively emit UV light in the germicidal spectrum for a predetermined period of time and to thereby purify a volume of drink liquid held in the internal compartment of the liquid container, the UV bulb having an at least partially circular configuration; and wherein the cover assembly further includes a convex spherical reflector positioned to reflect light from the UV bulb toward the internal compartment of the liquid container, the UV bulb being positioned around the perimeter of the spherical reflector, a portion of the spherical reflector extending into a region within the circular configuration of the UV bulb, and wherein the spherical reflector is configured to reflect light from the UV bulb toward an entirety of the internal compartment of the liquid container.

24. The drink container of claim 23, wherein the body of the cover assembly includes a lower portion that defines a lower edge and the recess, and wherein the UV bulb does not extend beyond the lower edge of the body of the cover assembly.

* * * * *